United States Patent
Evseroff et al.

(10) Patent No.: US 11,442,997 B2
(45) Date of Patent: *Sep. 13, 2022

(54) SYSTEM AND METHOD ASSOCIATED WITH AN INSULAR DIGITAL CONTENT DISTRIBUTION PLATFORM THAT GENERATES DISCRETE EPOCHS OF CONTENT BASED ON DETERMINATION OF A GERMANE ZIP-SPAN POLYGON REGION

(71) Applicant: NEIGHBORCOM, LLC, New York, NY (US)

(72) Inventors: Paul Evseroff, New York, NY (US); Adam Feinberg, Fair Lawn, NJ (US)

(73) Assignee: NEIGHBORCOM, LLC, New York, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/025,339

(22) Filed: Sep. 18, 2020

(65) Prior Publication Data
US 2021/0004410 A1 Jan. 7, 2021

Related U.S. Application Data

(63) Continuation of application No. 16/816,974, filed on Mar. 12, 2020, now Pat. No. 10,831,832.
(Continued)

(51) Int. Cl.
*G06F 16/909* (2019.01)
*H04W 4/021* (2018.01)
*G06F 16/9537* (2019.01)

(52) U.S. Cl.
CPC ........ *G06F 16/909* (2019.01); *G06F 16/9537* (2019.01); *H04W 4/022* (2013.01)

(58) Field of Classification Search
CPC ... G06F 16/9537; G06F 16/909; H04W 4/022
(Continued)

(56) References Cited

U.S. PATENT DOCUMENTS 9,442,905 B1 * 9/2016 Kawaguchi ........... G06F 16/951
10,135,932 B1 * 11/2018 Liu ........................ H04L 67/75
(Continued)

FOREIGN PATENT DOCUMENTS

WO   2009064996 A2   5/2009
WO   WO-2009064996 A2 *  5/2009  ............. G06Q 10/00
(Continued)

OTHER PUBLICATIONS

International Search Report and Written Opinion issued in International Application No. PCT/US2020/022385 dated Jun. 4, 2020.

*Primary Examiner* — Giovanna B Colan
(74) *Attorney, Agent, or Firm* — Hoffmann & Baron, LLP

(57) ABSTRACT

A digital content distribution system associated with disseminating discrete epochs of digital content based at least on creation of a zip span polygon region is disclosed. The system receives zip code information associated with a bounded geographical region of interest and a zip spanning distance related to the bounded geographical region of interest. The system determines longitude information values and latitude information values associated with coordinate boundary values of a portion of the zip code information based on the zip spanning distance. The system further determines at least one neighboring geographical region contiguous with the geographical region of interest using the longitude and latitude information values. A zip span polygon region is created that includes at least a portion of an initial zip span region associated with the geographical region of interest using boundary point information of the at least one neighboring geographical region, in order to disseminate the discrete epochs of the digital content in the
(Continued)

digital content distribution system.
Corresponding methods and a computer-readable device are further disclosed.

36 Claims, 25 Drawing Sheets

Related U.S. Application Data

(60) Provisional application No. 62/832,539, filed on Apr. 11, 2019.

(58) Field of Classification Search
USPC .................................. 707/724, 749, 742, 755
See application file for complete search history.

(56) References Cited

U.S. PATENT DOCUMENTS

| | | |
|---|---|---|
| 2015/0120455 A1 | 4/2015 | McDevitt et al. |
| 2016/0014219 A1 | 1/2016 | Harris et al. |
| 2016/0019592 A1* | 1/2016 | Muttineni ............. H04W 4/029 705/14.58 |
| 2016/0188602 A1* | 6/2016 | Glover ................ G06F 16/9537 707/749 |
| 2016/0378848 A1* | 12/2016 | Basovnik ................ G06F 16/29 707/742 |
| 2018/0276859 A1* | 9/2018 | Park ...................... G06T 11/203 |
| 2020/0389429 A1* | 12/2020 | Shribman ............. H04L 63/164 |

FOREIGN PATENT DOCUMENTS

| | | | |
|---|---|---|---|
| WO | 2012174650 A1 | 12/2012 | |
| WO | WO-2012174650 A1 * | 12/2012 | ......... G06Q 30/0277 |

* cited by examiner

SYSTEM AND METHOD ASSOCIATED WITH AN INSULAR DIGITAL CONTENT DISTRIBUTION PLATFORM THAT GENERATES DISCRETE EPOCHS OF CONTENT BASED ON DETERMINATION OF A GERMANE ZIP-SPAN POLYGON REGION

CROSS-REFERENCE TO RELATED APPLICATION(S)

The present application is a continuation of U.S. application Ser. No. 16/816,974, filed on Mar. 12, 2020, which claims the benefit of and priority to U.S. Provisional Application No. 62/832,539, filed on Apr. 11, 2019, the contents of which are incorporated by reference herein, in their entirety for all purposes.

FIELD OF THE DISCLOSURE

The present disclosure relates to a system and method associated with delivery of tailored digital content based on discrete point of origination based analysis that defines a geographical area of interest bounded by a germane zip-span polygon region. A related insular self-contained search engine and related digital distribution platform are also disclosed. Even more particularly, the present invention relates to a novel system and method for implementation of an insular digital content distribution platform that generates discrete epochs of refined digital content based on determination of a germane zip-span polygon region and/or refined zip-span polygon region associated with uniquely delineated geographical boundaries.

BACKGROUND

The search engines that operate on the Internet, are generally biased to the extent that advertisers or potential business partners receive limited exposure. Searchers are generally blasted with unrelated advertisements that are usually promoted by search engine optimization (SEO) companies that are generally in the practice of increasing the quantity and/or quality of traffic to an owner's website through organic search engine results. Search engine optimization is a methodology of strategies, techniques and tactics used to increase the number of visitors to a website by obtaining a high-ranking placement in the search results page of a search engine (SERP)—including by providers, such as Google®, Bing®, Yahoo® and other search engines. Search engine optimization (SEO) is the process of affecting the online visibility of a website or a web page or web content in a web search engine's unpaid results—often referred to as "natural", "organic", or "earned" results.

Search engines such as for example, Google®, crawls your website, identifying design and content elements in order to determine what type of topics the website covers and also how user-friendly the website is. This process is generally referred to as crawling. This process may help the search engine deliver more relevant and useful search results to its users.

By improving the SEO of a website, a business is generally working to facilitate search engines in order to understand and index the content of that business. The better that an owner's website ranking or weighting appears to the search engines, the more likely they will be to display your website or post to relevant search engine users when users search for keywords that are relevant to an owner's product or service offering. However, usage of keywords to gauge relevancy to an owner's product(s) or service offering(s) may ultimately not provide the most optimal and/or targeted set of search results to a user.

Therefore, it is desirable to implement a system and method that includes zip span and/or geographical based delivery of targeted digital content delivery implemented in an insular, self-contained search platform that does not require external links to other sites and/or does not require individual websites to optimize themselves or employ SEO technologies or strategies, which effectively assists users in identifying a business and/or service provider they are seeking or searching for and, further based on zip code and/or point of origination defined geographical regions that are determined by the system, and thereby providing relevant search results tailored towards a uniquely determined zip span polygon region and/or specific zip code(s) or international postal codes, rather than results biased by known Internet search engine ranking systems and/or SEOs.

Hence, it is further desirable to implement a novel searching platform that allows business owners, advertisers, service providers, professionals, and/or merchants to control the content of their advertisements, and also permits them to hyper target specific zip codes or geographical regions where they desire to promote their business(es) without unnecessary expenditures over targeting efforts.

It is further desirable that such digital content distribution platform uniquely connects the searchers/customers who are looking for a specific type of service/product(s) and the relevant service provider(s)/business(es) conducting business and/or advertising on the platform by specific zip code and/or geographical region of interest that is defined by an insular based engine that performs point of origination based searches by implementation of a novel zip span region analysis. The platform allows commercial businesses or individuals to promote their service/products using cutting edge, high quality/high definition and/or professional grade digital based-content. Example applications include video/audio messaging to the platform, content provider(s)/content creator(s) effecting delivery of content to the platform, advertisements to the platform, educational digital streams, or other content (including amateur or professional grade content) that allow individuals to promote their goods/services/products using digital, video, audio, and/or image-based content (and/or other contemplated content) delivery to the platform including educational content, professional grade digital content, image-based promotional content for products/services and further, targeting specific zip codes or unique zip span polygon regions to market, educate, and/or promote goods/services. Example industry applications include medical services, retail, restaurants, automotive, educational services, tutoring services, other kinds of beneficial and/or constructive services or providers thereof, associated with a particular community or region.

Hence it is further desirable to implement a system and method associated with an insular based search engine that is self-sufficient, self-contained and is not biased by any search engine providers. SEO analytics, crawlers and/or website layout. Hence, various types of users (for example, an advertiser, service provider, professional, educator, business owner or a consumer), can either conduct(s) searches or deliver professional grade digital-based content. In an embodiment, relevant digital information is prioritized completely based on a searcher's specific targeted and insular based searches (and not skewed by any third party SEO biases, rankings, paying for rankings, and/or unwanted interruptions by third party advertisements or other Internet content). Any content that is delivered to the searchers and/or users of the platform, is prioritized based solely on the user's/searcher's specific search strings, keywords, and/or other category data structure, and is also based on geographical proximity to the locations of interest of the searcher/user of the platform including the advertisers that desire to target specific zip code(s), postal codes and/or region(s). Proximity to the searcher(s) geographical location of interest is accomplished by implementation of proprietary algorithms that accomplish the determination of uniquely bounded zip-span polygon regions associated with a desired set of zip span values for implementation of by the digital content distribution platform and/or the self-contained insular search platform.

Hence, it is further desirable to implement a system and method associated with an insular based search engine and related digital content distribution platform that geo-targets digital content within the insular-based platform. The extent of usage can be small-scale non-commercial business or large-scale commercial business, medical services, educational services, with no limits with opportunities to deliver tailored and unique digital content associated with for example, professional grade services, educational services, medical services, automotive, retail, restaurant venues and/or other commerce whether small-scale or large in a self-sufficient, self-contained platform environment. Delivery of such search results and/or other implementations of the platform, would not be impacted by any search engine providers, SEO analytics and/or crawlers.

It is further desirable to implement an insular digital content distribution platform created to solve the known localized Internet search problems associated with many local cable and broadcast TV advertisers in the United States and internationally around the world. Such disclosed system and method, would enable merchants, advertisers, service providers, etc. to target and refine at any target level, whether professional, amateur or other level, the online distribution of their existing commercial spots, digital content, video content, educational content, of any length, in zip span geographical regions of interest (as determined by a novel zip span polygon analysis) extending to areas in the United States and by international country postal or other related geographical codes, all within the confines of the platform. The disclosed system and method will in effect, reinforce the delivery of quality and targeted results for the goods and services that is provided by the service provider or merchant in a certain geographical locality or even a more widespread region. In addition, the platform will generate an expansion of commerce and business with the ability to reach potential customers otherwise unaware that such offerings, businesses, services, etc. exist in certain geographical region of interest, thereby eliminating unrelated, unqualified, geographically undesirable or irrelevant and/or not specifically requested (or of any interest) to the searcher, that known search engines currently generate.

SUMMARY

In accordance with an embodiment or aspect, the present technology is directed to a digital content distribution system associated with disseminating discrete epochs of digital content based at least on creation of a zip span polygon region. The present technology is also directed to a method of disseminating discrete epochs of digital content in a digital content distribution platform based at least on creation of a zip span polygon region. The system and method comprises a zip span polygon engine including a processing device.

In accordance with an embodiment or aspect, disclosed is the system and method that comprises the processing device perform operations that include receiving zip code information associated with a bounded geographical region of interest and receiving a zip spanning distance related to the bounded geographical region of interest. The system and method further comprises determining longitude information values and latitude information values associated with coordinate boundary values of a portion of the zip code information based on the zip spanning distance. The system and method further comprises determining at least one neighboring geographical region contiguous with the geographical region of interest using the longitude and latitude information values. The system and method yet further comprises creating a zip span polygon region that includes at least a portion of an initial zip span region associated with the bounded geographical region of interest using boundary point information of the at least one neighboring geographical region, in order to disseminate the discrete epochs of the digital content in the digital content distribution system or digital content distribution platform.

In yet a further disclosed embodiment, the system and method further comprises creating an expanded zip span polygon region based on the zip spanning distance along the perimeter of the initial zip span region. The system and method includes additional embodiments, which are provided herein below respectively. The system and method further includes that the expanded zip span polygon region further comprises one or more of an entirety of a zip code region associated with the neighboring geographical region. The system and method yet further includes that the expanded zip span polygon region further comprises one or more of at least a portion of a zip code region associated with the neighboring geographical region. The system and method yet further includes creating the zip span polygon region that further comprises iteratively identifying boundary point information associated with the at least one neighboring geographical region.

The system and method yet further includes creating the zip span polygon region that further comprises iteratively determining whether the boundary point information of the at least one neighboring geographical region intersects a boundary point of the initial zip span polygon region. The system and method yet further includes that creating the zip span polygon region further comprises determining whether the at least one neighboring geographical region is incorporated in the expanded zip span polygon region based on a partial area analysis of the at least one neighboring geographical region being above the threshold value. The system and method yet further comprises the processing device generate discrete epochs of digital content based at least on the expanded zip span polygon region.

The system and method yet further comprises the zip span polygon region being expanded to create an extended zip span polygon region. The system and method yet further comprises generating discrete epochs of germane digital content based on categorical entry of germane data of interest. The system and method yet further comprises that creating the zip span polygon region is further based on comparison of a total area of the at least one neighboring geographical region with respect to an intersecting partial area of the at least one neighboring geographical region being above a threshold value. The system and method yet further comprises that the threshold value is greater than or equal to a 20% value. The system and method yet further comprises that the expanded zip span polygon region is based on determination of boundary point information and bearing information associated with the at least one neighboring geographical region.

The system and method yet further comprises creating the zip span polygon region that is further based on determination of an area of a spherical polygon region using spherical excess information. The system and method yet further comprises determining the zip span polygon region that is further based on boundary point analysis of at least two geographical polygon regions. The system and method yet further comprises an insular search engine platform that performs searches based on the created zip span polygon region. The system and method yet further comprises identifying at least one neighboring geographical region that is non-contiguous with the initial zip span polygon region; and expanding the boundary of the zip span polygon region to subsume the at least one neighboring geographical region based on a partial area analysis of the non-contiguous region.

In accordance with yet another disclosed embodiment, a computer readable device is disclosed storing instructions that, when executed by a processing device, performs various operations. The operations include receiving zip code information associated with a bounded geographical region of interest and receiving a zip spanning distance related to the bounded geographical region of interest. Further disclosed operations include determining longitude information values and latitude information values associated with coordinate boundary values of a portion of the zip code information based on the zip spanning distance. Yet further disclosed operations include determining at least one neighboring geographical region contiguous with the geographical region of interest using the longitude and latitude information values. Yet further disclosed operations include creating a zip span polygon region that includes at least a portion of an initial zip span region associated with the bounded geographical region of interest using boundary point information of the at least one neighboring geographical region, in order to disseminate the discrete epochs of the digital content in the digital content distribution platform.

In yet another disclosed embodiment, a method associated with using a digital content distribution platform that disseminates discrete epochs of digital content based at least on creation of a zip span polygon region is disclosed. The method associated with using the digital content distribution platform comprises a zip span polygon engine including a computing device.

In accordance with an embodiment or aspect, disclosed is the method associated with using the digital content distribution platform that comprises the computing device perform various operations. The operations include receiving zip code information associated with a bounded geographical region of interest and receiving a zip spanning distance related to the bounded geographical region of interest. Further disclosed operations include determining longitude information values and latitude information values associated with coordinate boundary values of a portion of the zip code information based on the zip spanning distance. Yet further disclosed operations include determining at least one neighboring geographical region contiguous with the geographical region of interest using the longitude and latitude information values. Yet further disclosed operations include creating a zip span polygon region that includes at least a portion of an initial zip span region associated with the geographical region of interest in order to disseminate the discrete epochs of the digital content in the digital content distribution platform.

These and other purposes, goals and advantages of the present application will become apparent from the following detailed description read in connection with the accompanying drawings.

BRIEF DESCRIPTION OF THE DRAWINGS

The patent or patent application file contains at least one drawing executed in color. Copies of this patent application or patent application publication with color drawing(s) will be provided by the U.S. Patent and Trademark Office upon request and payment of the necessary fee. Some embodiments or aspects are illustrated by way of example and not limitation in the figures of the accompanying drawings in which.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

A system and method associated with delivery of tailored digital content based on discrete point of origination based analysis that defines a geographical area bounded by a zip-span polygon region using an insular self-contained search engine and related content distribution platform or system. Even more particularly, the present invention relates to a novel system and method for implementation of an insular digital content distribution platform or system that generates discrete epochs of refined and/or germane content based on determination of a zip-span polygon region of interest, including an extended zip-span polygon region, or in alternate embodiment(s) otherwise refined zip-span polygon region, all based on a neighboring zip span analysis, wherein the zip-span polygon region is associated with uniquely delineated geographical boundaries.

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

Figure 1:
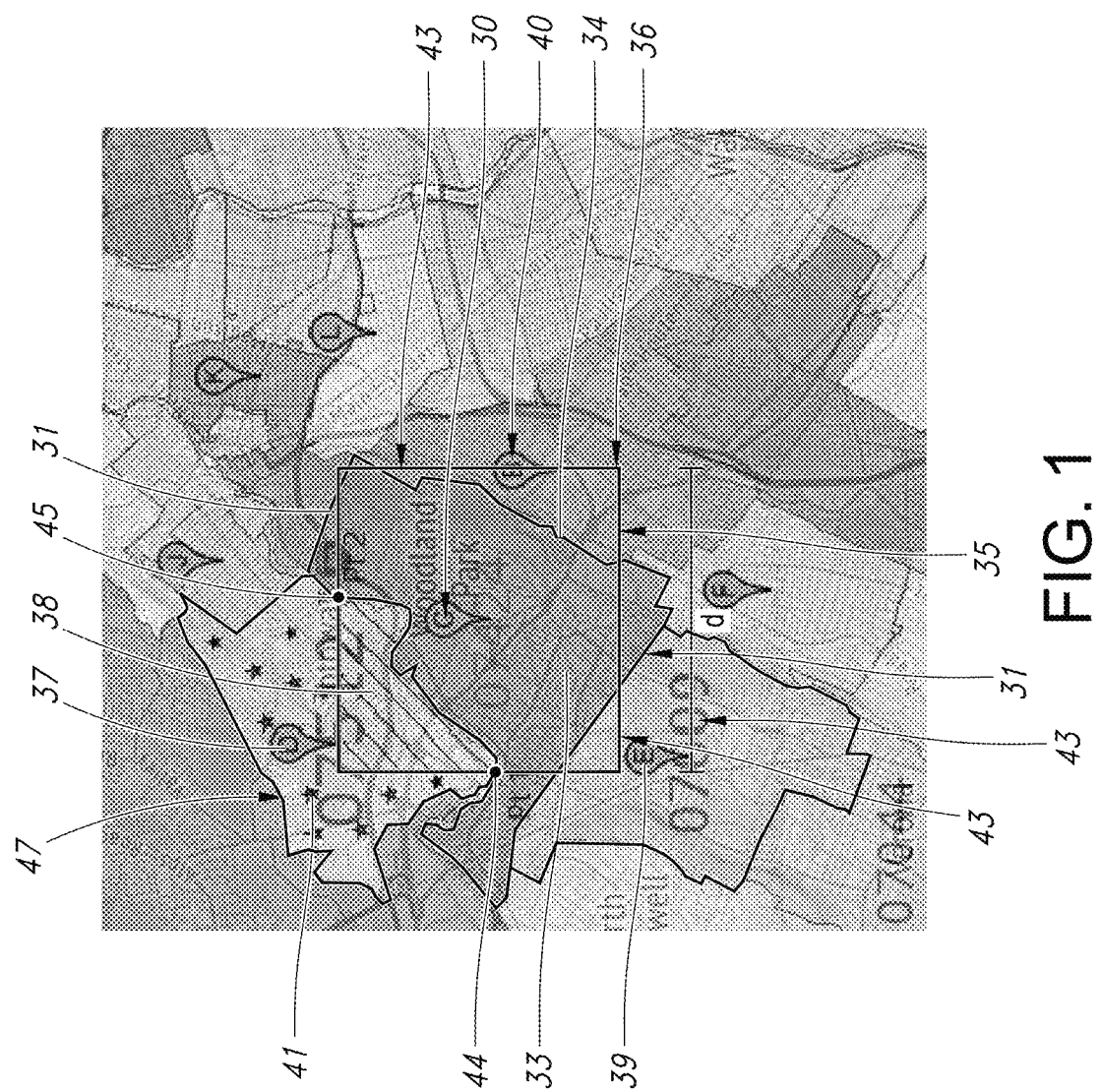
FIG. 1 is a diagram illustrating an example zip span geographical region polygon associated with a point of origination related a zip code of interest, in accordance with an embodiment of the disclosed system and method.
Figure 2:
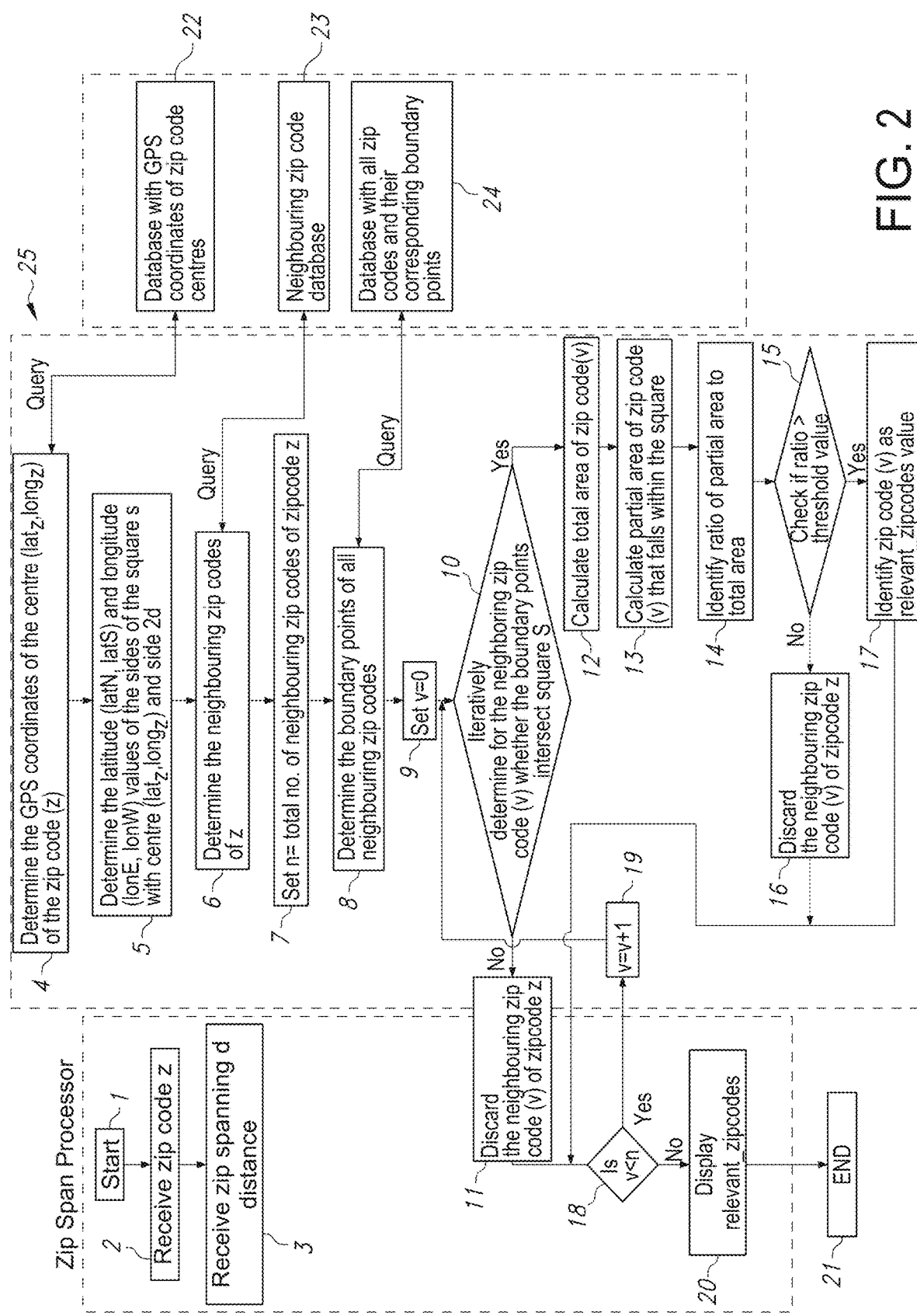
FIG. 2 a flowchart illustrating the zip spanning process associated with determining a zip span region that defines a discrete geographical region, in accordance with an embodiment of the disclosed system and method.

FIG. 2 is a flowchart illustrating the zip spanning process associated with defining a zip span region as shown for example in FIG. 1, which is related to a discrete geographical region associated with a point of origination, in accordance with an embodiment of the disclosed system and method.

Referring to example FIG. 1, shown is a diagram of a zip span region associated with a point of origination zip code on a geographical map, shown for example as center point C 30, center of zip code geographical region 33 (i.e. the topographical and/or geographical region related to postal zip code 07424). Examples of topographical features associated with a geographical region can encompass for example, mountains, hills, valleys, lakes, oceans, rivers, cities, dams, and roads. In addition, features such as the elevation or height of mountains, depths of valleys, and other objects or features are recorded as part of topography. It is usually recorded in reference to sea level (the surface of the ocean). Hence, the determination of the zip code geographical region 33 can encompass the topographical features associated with a discrete geographical region.

The zip span processor or processing device determines the zip span region related to a discrete geographical region in accordance with the embodiment described herein below with respect to the process described in connection with FIG. 2. Point D 37 and Point B 40 in FIG. 1, are considered the centers of two zip codes that adjoin the zip code geographical region (and/or topographical features associated with such zip code geographical region) (for example shown in FIG. 1 as zip code geographical region 33 (i.e. defined by the geographical area boundaries 31 of postal zip code 07424 in the shown example). It is noted that other delineating boundaries are contemplated that can define a zip code region such as a uniquely tailored user-defined zip code database that does not necessarily follow the boundaries defined by the United States postal zip code boundaries, for example international postal codes or other related geographically-based codes.

In particular, the zip span processor determines which discrete geographical and/or topographical feature(s) points fall within the boundaries of a defined zip span region. In the example embodiment, these points are bounded by and defined by the boundaries of a unique zip span polygon 35 shown in the example embodiment, as a square 36 polygon defined by four (4) equal sides d 43, in FIG. 1. The zip span square polygon 35 defines a region that encompasses any neighboring zip codes that adjoin the original zip code z (for example 07424) on any of its boundary points. The point of origination of zip span polygon 35 is shown as point C 30 on FIG. 1. The shaded area of square polygon 35 defined by boundary lines 31 and shown as shaded portion 38 is an area of a neighboring zip code of original zip code 07424, that is within the boundaries of zip span polygon 35. This shaded region 38 is identified by the zip span processor and then compared to a certain predetermined threshold value (i.e. for example 5%, 10%, 35%, 50%; 65%; 75%, etc. or predetermined percentage values that are user or system defined as being equal to and/or above a predetermined threshold value). The system determines that the geographical points (and/or topographical points) of shaded area 38 does not match or included in any of the geographical points and/or topographical feature points associated with original zip code geographical region 33 defined by the boundaries of U.S. postal zip code 07424, shown in FIG. 1.

In accordance with an embodiment of the disclosed system and method, the zip span processor determines if the coverage of the area value of the shaded region 38 as compared to the coverage of the area of the entire zip code 07512, is equal to and/or above the predetermined threshold value (for example, there is a coverage of 50% or more of shaded region 38 as compared to the entire area of zip code region 41, as defined by the boundary lines of zip code 07512, then the zip span processor will also incorporate the geographical region defined by the boundaries of zip code 07512 (i.e. zip code region 41) into an extended zip span region.

Hence, in such example, the zip span region is expanded beyond the boundary lines of original zip span polygon region 35 (to include for example, the geographical region shown as shaded region 38 and extends to starred region 41). Therefore, the zip span processor incorporates such geographical points associated with starred region 41 within the expanded zip span region 43 (shown in the example as starred geographical area 41 and zip span polygon square 35). Hence, the expanded zip span region 43 is extended beyond the zip span square 35 boundary lines and is expanded to include the boundary lines of zip code 07512 (shown as starred region 41). In certain embodiments, the zip span region may be condensed or abridged in size depending on whether the system calculates and/or determines a reduction of the boundary lines and/or exclusion of a particular neighboring zip code is appropriate therein.

Referring to FIG. 2, in an example implementation of the zip span process, the disclosed process 25 commences at step 1. The system receives the zip code (z) associated with a particular geographical location of interest and/or associated with a geographical point of origination, in step 1. The zip span distance (referred to as distance d) in miles or another unit of length such as meters, kilometers, yards, feet, etc., is also received by the zip span processor in step 2. Next, the system determines in step 3, the center GPS coordinates of the particular zip code (z) associated with a point of origination C 30 as shown in FIG. 1, for example, by querying a database of zip codes in step 22 and/or their center points stored for example, in the zip span application server or database.

Figure 3:
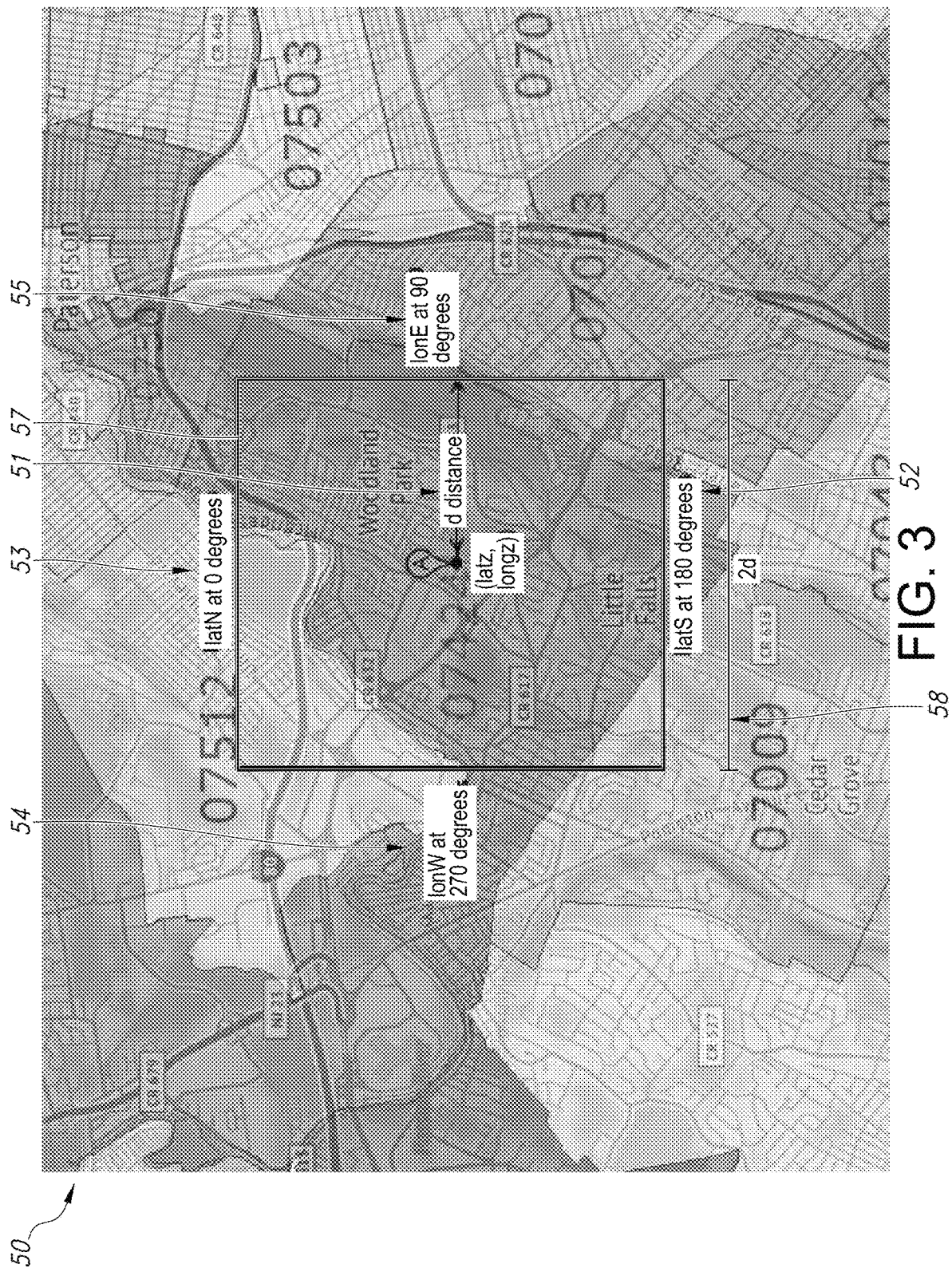
FIG. 3 is a diagram illustrating an example zip span geographical region polygon associated with a point of origination and respective longitudinal and latitude points related to a zip span distance and related polygon, in accordance with an embodiment of the disclosed system and method.

The system proceeds in step 22 to transmit the center coordinates ($lat_z$, $long_z$) of zip code (z) for further processing in step 5. Next in step 5, the system determines, by determining the value of the sides d 43 of the square 36. In certain embodiments, the four sides d 43 of the square 36, (for example shown as side d 43 in FIG. 1) are identified using at least two latitudes values (latN, latS) (53, 52) in the North and South; and two longitude values (lonE, lonW) (55, 54) on the West and East of the center of the zip code z as shown in FIG. 3. Furthermore, in an example implementation in FIG. 3, latN is located at bearing 0 degrees (53), latS is located at bearing 180 degrees (52), lonE is at bearing 90 degrees (55) and lonW is at bearing 270 degrees (54) as shown in FIG. 3. The value of a side of the zip span polygon region 35 (for example square 57 in FIG. 3) is determined as side 2d (58). The center point A is defined by values ($lat_z$, $long_z$) as shown in FIG. 3.

In an example embodiment, the calculations of LatN, LatS, lonE, and lonW, in certain embodiments are based on the formulas defined in one or more of equations (1)-(4) provided herein below:

The value of variable latN is defined by Equation(1) provided herein below as:

$$latN = \text{rad 2deg}(\text{Math}.a\,\sin(\text{Math}.\sin(\text{Lat\_radian})\\*\text{Math}.\cos(d/er) + \text{Math}.\cos(\text{Lat\_radian})*\text{Math}.\sin(d/er)*\text{Math}.\cos(\text{deg2 rad}(0))))$$

The value of variable latS is defined by Equation (2) provided herein below as:

$$latS = \text{rad 2deg}(\text{Math}.a\,\sin(\text{Math}.\sin(\text{Lat\_radian})*\text{Math}.\cos(d/er) + \text{Math}.\cos(\text{Lat\_radian})*\text{Math}.\sin(d/er)*\text{Math}.\cos(\text{deg2 rad}(180))))$$

The value of variable lonE is defined by Equation (3) provided herein below as:

$$lonE = \text{rad 2deg}(\text{Lon\_radian} + \text{Math}.a\,\tan 2(\text{Math}.\sin(\text{deg2 rad}(90))*\text{Math}.\sin(d/er)*\text{Math}.\cos(\text{Lat\_radian}), \text{Math}.\cos(d/er) - \text{Math}.\sin(\text{Lat\_radian})*\text{Math}.\sin(latN\_\text{radian})))$$

The value of variable lonW is defined by Equation (4) provided below as:

$$lonW = \text{rad 2deg}(\text{Lon\_radian} + \text{Math}.a\,\tan 2(\text{Math}.\sin(\text{deg2 rad}(270))*\text{Math}.\sin(d/er)*\text{Math}.\cos(\text{Lat\_radian}), \text{Math}.\cos(d/er) - \text{Math}.\sin(\text{Lat\_radian})*\text{Math}.\sin(latN\_\text{radian})))$$

wherein er is the Earth's radius; Lat_radian is $lat_z$ in radians; and Lon_radian is $long_z$ in radians.

Turning back to FIG. 2, the system next proceeds in the determination of the zip span region 35 by proceeding to step 6 to identify using for example, a neighboring zip code database 23, also stored in the insular application server (for example, an insular server as part of the insular server architecture or infrastructure), all the neighboring zip codes of z. In certain embodiments the system iteratively calculates using an (x,y) coordinate point comparison of the values of neighboring points to the original zip code z (for example 07424), and determines if they are indeed considered neighboring zip codes of the original zip code z (for example 07424).

In an example embodiment, the system in step 6 using for example, a neighboring zip code database 23 identifies a set of listing of neighboring zip codes for original zip code z. The system next iteratively processes for each of the respective boundary points of the neighboring zip codes of z, by initially setting a value of variable n equal to the total number of neighboring zip codes identified of zip code z, in step 6. Generally, a neighboring zip code of original zip code z, is defined as adjoining at least one of the boundary lines of the original zip code z (for example zip codes 07009; 070512; and also zip code 40 with center point B; zip code shown with center point F; zip code shown with center point K, each shown in FIG. 1, with zip code 07424 being the original zip code z received by the system for determination of the respective zip span region). In certain embodiments, this data can be identified and retrieved from a third database of boundary points 24, also stored for example, on the insular application server.

The system proceeds in step 7 to identify the total number of neighboring zip code of z that have been identified, setting n=the total value of the identified neighboring zip codes in step 6. Next, in step 8, the zip span processor iteratively determines for each of the respective boundary points of n number of neighboring zip codes of original zip code z (for example U.S. zip code 07424), the respective boundary points of all the neighboring zip codes. The system in certain embodiments, may query a database containing all zip codes and their corresponding boundary points, as shown in step 24. This step 24 transmits each of the boundary points of all n number of neighboring zip codes identified in step 8 for the respective iterative processing in step 10 of each such boundary points associated with each of the n number of neighboring zip codes of original zip code z (for example 07424).

Next, a counter v is set to the initial value of zero (0) in step 9, in order to iteratively process each of the identified neighboring zip codes (v) of original zip code z in step 10. Specifically, the system iteratively checks if the boundary points identified for neighboring zip code (v) lies within the boundaries (and hence, any of the points of zip code (v) (for example, (x,y,z) coordinates points of zip code (v) match any of the (x,y,z) coordinate points of the original zip code z). However, the system further determines in the example, those boundary points that fall within the perimeter of the region defined by square, then such neighboring zip code (v), will be determined to be located within the boundary lines of the square region 36 portion of the zip code geographical region 33 defined by boundary lines of original zip code z.

If none of the boundary points of zip code (v) are considered to match and/or considered to be within the square 36 region bounding the geographical region of original zip code (z), then the system will discard the particular neighboring zip code (v) of original zip code z in step 11 as not considered a relevant neighboring zip code (z) value. Next, the zip span processor determines in step 18, if the value of counter v is less than n number of neighboring zip codes (defined by equation v<n). If the system determines in step 18 that counter v<n number of neighboring zip codes, the system next proceeds to increment the counter v=v+1 in step 19 and then proceeds to process the next neighboring zip code(v+) in step 10, with the counter being incremented by one (1) value in step 19.

Hence, for each of the n number of neighboring zip codes, the system iteratively processes each neighboring zip code (v) by incrementing the counter v by v=v+1 in step 19. If for the neighboring zip code$_{v+1}$, it is determined that the boundary points fall within square 36 (which bounds the zip code geographical region 33 of original zip code z), the zip span processor has identified that the one or more boundary points (identified as for example, (x,y) or (x,y,z) coordinates) of the particular neighboring zip code v, are bounded or circumscribed by the boundary lines that define the zip span polygon region 35 associated with the original zip code z.

As an example, as shown in FIG. 1, if any of the respective boundary points are within the defining boundary lines, sides d of square 36, then the system proceeds to determine in step 12 the total area of the neighboring zip code v. This determination of the area of zip code v can be accomplished by implementing for example, a ray-casting algorithm as described in greater detail as described in connection with FIGS. 14-15 herein below.

Figure 14:
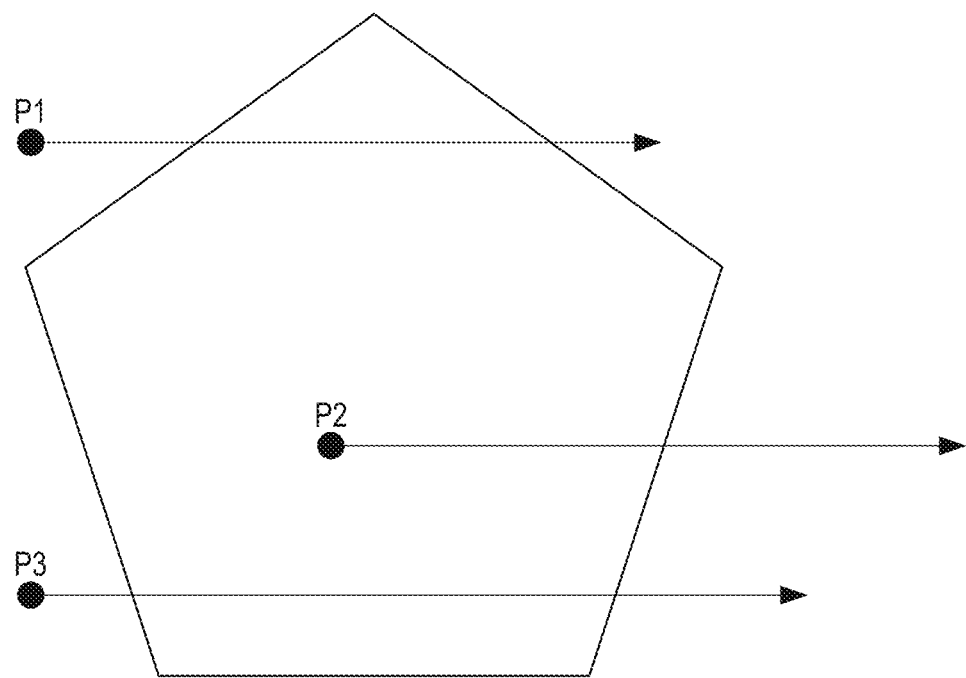
FIG. 14 is an illustration of a polygon and intersecting rays associated with a ray-casting algorithm used to determine whether boundary points intersect a zip span polygon region, also as further described herein below with respect to FIGS. 15-16, in accordance with an embodiment of the disclosed system and method.
Figure 15:
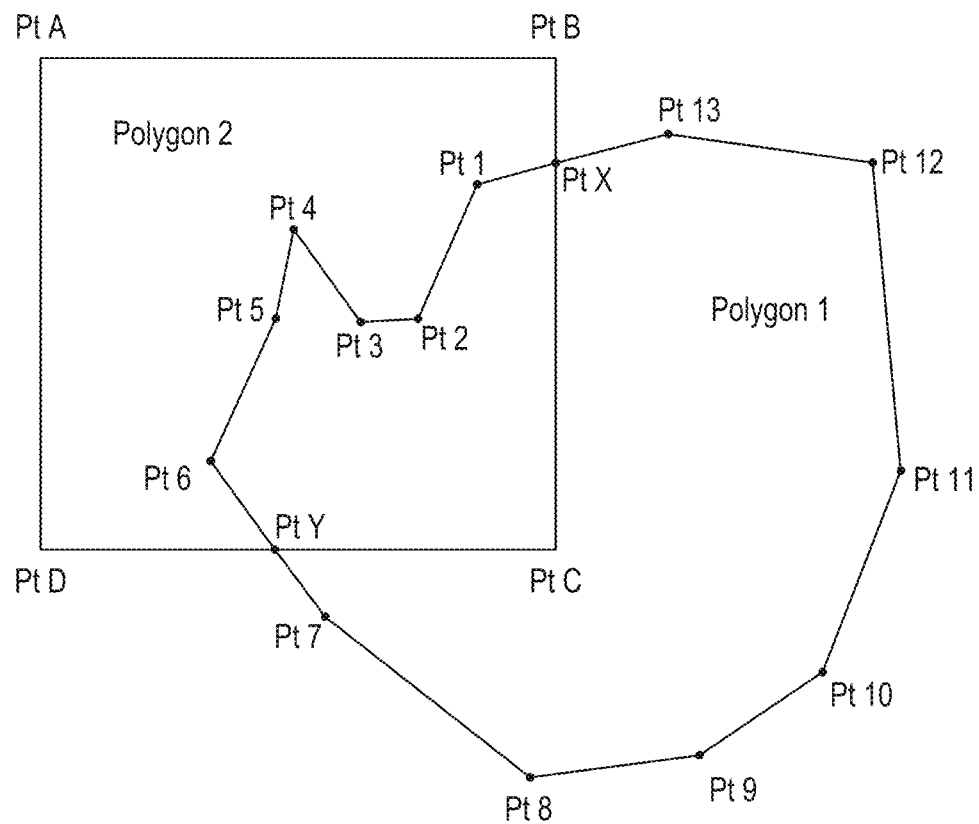
FIG. 15 is an illustration of intersecting polygons 1 and 2 used in order to determine whether any of the boundary points of a first zip span region intersect or fall within the zip span square or extended boundary of a second zip span region, in accordance with an embodiment of the disclosed system and method.
Figure 16:
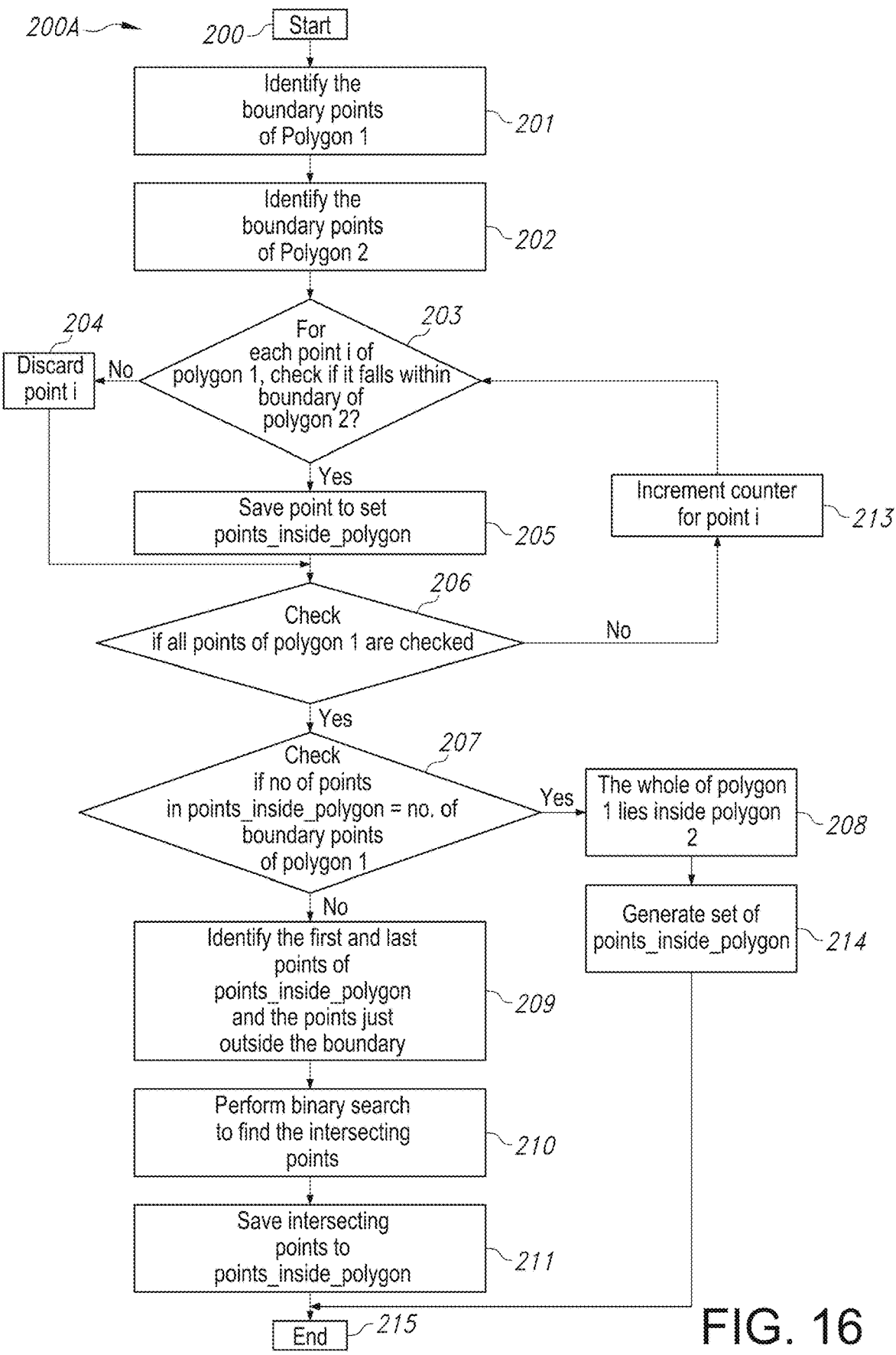
FIG. 16 provides a flowchart illustration of the method associated with determining points inside the zip span extended boundary or zip span polygon region using a polygon analysis, in accordance with an embodiment of the disclosed system and method.

FIGS. 14-15 describe the determination of respective points that are bounded by the zip span polygon region 35, for example square 36 shown in FIG. 1. FIG. 16 described in greater detail herein below, provides an overview of an exemplary workflow for determining the points falling inside the square 36 shown with side d.

In step 10, the system determines for each of the v number of neighboring zip codes of set n of total zip codes, whether the boundary points are bounded by square 36 (and/or the area delineated by zip span polygon region 35), with the counter v being incremented by one (1) for iterative processing of total number n of neighboring zip codes. If any of the boundary points of neighboring zip codes v are not bounded by zip span polygon region 35, then the system discards the neighboring zip code v of zip code z in step 11.

Figure 12A:
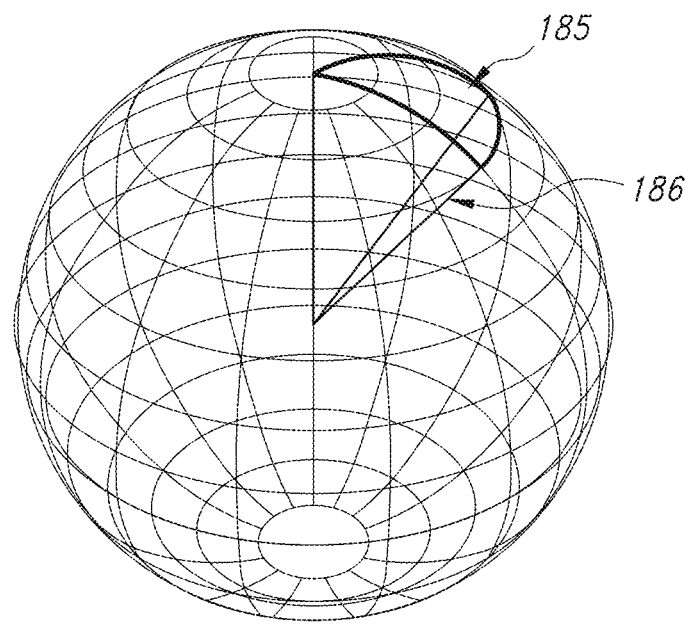
FIG. 12A provides a diagram of an exemplary spherical excess of a spherical triangle used in the determination of respective zip span polygon regions, in accordance with an embodiment of the disclosed system and method.

In step 12, if the boundary point of the neighboring zip code v is bounded by the perimeter of the zip span polygon region 35 as determined in step 10, then the total area of the zip code is calculated, as further described in connection with FIGS. 12a and 12b, which provides an overview of the workflow associated with calculating respective area. The respective boundary points of the neighboring zip code (v) is used as the input for the workflow as described in connection with FIG. 13. The result of the workflow shown in FIG. 13 is the area of the neighboring zip code (v) which is determine in step 12 of FIG. 2, which is described in greater detail herein below in connection with FIG. 13

Next, the example method proceeds to determine in step 13, the partial area of the neighboring zip code (v) (shown for example, as shaded region 38, with diagonal lines shown in FIG. 1) that is bounded by the perimeter of zip span polygon region 35 (shown for example, in FIG. 1 as square 36). The partial area of the neighboring zip code v (shown for example, as shaded region 38 in FIG. 1) is calculated using the discrete boundary points that fall within the perimeter (sides d) of the square 36, as applied to FIGS. 12(a)-12(b) and the workflow of FIG. 13 discussed in greater detail herein below. The result of the workflow FIG. 13 is the partial area of the neighboring zip code v (step 13 of FIG. 2), in which the input thereto is the partial boundary points of such neighboring zip code v.

In step 14, the system determines the ratio of the partial area calculated in step 13, to the total calculated area in step 12 of neighboring zip code z. The ratio of this partial area compared to the total area is identified and next used in the determination of step 15. Specifically, in step 15, the system checks if the ratio of the partial area to the total area of zip code v is larger than a pre-determined or system or user-definable threshold value (for example, 5%, 10%, 35%, 50%, 65%, 70%, 75% or greater). If so, the system proceeds in step 17 to identify zip code v as a relevant_zipcode value (which relevant_zipcode value is integrated with and becomes a part of the expanded zip span region 41). This process is iteratively repeated as the system proceeds to step 19 to increment the counter v=v+1, if in step 18, it is determined that v<n, and the system next proceeds to step 10 for the iterative neighboring zip code analysis.

In step 15, if the ratio as compared to the threshold value is less than the threshold value, then the system proceeds to step 16 to discard the particular neighboring zip code value (v). If the ratio is less than threshold, the particular neighboring zip code(v) is discarded in step 16. As described in the foregoing, if the ratio is greater than the threshold value in step 15, then the neighboring zip code (v) is identified and integrated with the set relevant_zipcodes in step 17. This process is iteratively repeated for all the neighboring zip codes v that are associated with boundary points that lie within the boundary lines (and/or perimeter) of zip span polygon region 35 (for example, square 36 in FIG. 1) until it is determined in step 18 that v>n, at which point the system ends the process and displays and/or transmits the relevant_zipcodes in step 20 to a display device, zip span processor, digital content distribution device, additional software module, other hardware device, microprocessor, computing device and/or processor, for distribution of particularized digital content or other processing thereof, based on the relevant_zipcodes determination in step 20.

Hence, in step 20, the relevant set of relevant_zipcodes is generated and can be displayed to the user as an extended zip span region 41 or set of relevant_zipcodes for subsequent searching of relevant information and/or distribution of particularized digital content associated with such extended zip span starred region 41. The discrete process 25 shown in FIG. 2 ends at step 21.

Referring to FIG. 1, as an example implementation of the process described in connection FIG. 2, if the zip span processor receives a zip code of interest 07424 from a user of the system, with a center point of origination C 30, the system determines the center points of the two zip codes that adjoin the original zip code of interest, shown as U.S. Postal zip code 07424 (or other regional and/or international postal codes).

The system determines a square 36 with the side d based on a zip span distance received by the system (for example, 5 miles, 10 miles, or other distance in for example, meters or km). The center of the zip code 07424 is identified as the point of origination C 30 associated with the original zip code of interest, 07424. The zip span processor determines all the neighboring zip codes (v) using a neighbor analysis of original zip code of interest 07424. In particular, the system determines neighboring zip codes of the original zip code of interest, whose boundary points line within the boundary lines defined by the perimeter of the zip span polygon region 35 (i.e. the perimeter of square 36 as shown in FIG. 1).

Using the process defined by FIG. 2, if it is determined that any of the boundary points ((x,y,z) coordinate points associated with the geographical region of neighboring zip code (v)) lies within the square 36, then such zip code is deemed relevant to the zip span region analysis and further determination is made as to whether that zip code will be identified as part of an expanded zip span region 41. Referring to FIG. 1, U.S. postal zip code 07512 is identified as a neighboring zip code (v) of interest. The square 36, intersects the common boundary of neighboring zip codes, i.e., zip code 07424 and zip code 07512 at point 1 (44) and point 2 (45). The application determines the area of the zip code 07512 bounded by the zip span polygon region 35 boundary lines and the boundary of original zip code 07424. This region is shown as the diagonal lines 38.

The system next compares this partial area 38 area to the total area of zip code 07512 and if it is greater than a threshold value (for example 5%, 10%, 35%, 50%, 65%, 75%, 80% or other user-definable value and/or other predetermined threshold value), the system then incorporates the entire geographical region associated with the zip code 07512 (including the designation in (x,y,z) coordinate points of any particularized areas reachable by humans such as mountains, oceans, ponds, lakes, cliffs, ridges, valleys, rivers and/or other topographical features associated with such area), shown as the full area including the diagonal lines 38 and stars 41, and now integrated by the system into the extended zip span region. The threshold value is either predetermined by the system or may be input into the system for example, via the user device. This process is repeated for all neighboring zip codes (v) located near or in the neighborhood of original zip code 07424, that lie within the perimeter or boundary lines of the zip span polygon region 35 defined in FIG. 1 as square 36. At the end of the process, the system determines all zip codes associated with an area within the square 36 that is greater than a predetermined or system received threshold value.

The above-described geographical figures, processes and/or methodologies associated with FIGS. 1-3 for the disclosed zip span region system and method, are contemplated to be performed in certain embodiments, by the computing system (300) described herein below in FIG. 19, and in greater detail herein below with reference to example system FIGS. 20-23.

Shown below is an example pseudo code that is used to determine the zip span polygon region and an expanded zip span region 41 in accordance with example FIG. 2 process.

```
initialize content_location_zip_code to zero
initialize zip_spanning_radius to zero
input the content_location_zip_code
input the zip_spanning_radius
The system next SELECTs all zip codes from the neighboring zip code or
postal code (including any
international postal code) DATABASE
initialize zip codes to an empty array
loop through each zip code in the zip code list (in the initialized array)
SELECT boundary_points (lat, lon) for the current zip codes from the
neighboring zip code or postal code
(including any international postal code) DATABASE
loop through each lat, lon set of the current zip code
```

-continued

```
    Call if_point_is_inside_polygon(arguments: lat, lon)
        if if_point_is_inside_polygon
            perform Push(current zip, zipcodes)
            Exit from the loop
end loop
end loop
initialize relevant_zipcodes to an empty array
loop through each zip in the zipcodes list
SELECT boundary_points (lat, lon) for the current zip codes from the zip code
DATABASE
compute the total area of the zip code
Call calculate_area(arguments: boundary_points)
compute the lat, lon points for the partial area of the zip code which comes within
the zip span boundary
is calculated
partial_area_boundary_points = Call get_partial_area_boundary_points
(arguments:current zip)
Call calculate_area(arguments: partial_area_boundary_points)
Set the ratio to the partial_area divided by total zip code area
if ratio greater than or equal to threshold
        perform Push (current zip, relevant_zipcodes)
end loop
Process the relevant_zipcodes
```

Common Functions are described herein below for implementation of the example process of FIG. 2:

A) Method to check-if-lat-long-point-is-within-a-set-of-polygons.

```
if_point_is_inside_polygon(parameters:lat,lng)
SELECT center_lat and center_lon for the content_location_zip_code from the zip code
DATABASE
// Obtain the latitude for the zip_spanning_radius, at bearings of 0 and 180 from the
center_lat and
center_lon; and the longitude for bearings of 90 and 270 degrees at the zip_spanning_radius.
//
//Set R equal to the earth's radius//
  lat_north = to_degrees(asin(sin(to_radians(center_lat)) * cos(zip_spanning_radius / R) +
cos(to_radians(center_lat)) * sin(zip_spanning_radius / R) * cos(to_radians(0))))
  lat_south = to_degrees(asin(sin(to_radians(center_lat)) * cos(zip_spanning_radius / R) +
cos(to_radians(center_lat)) * sin(zip_spanning_radius / R) * cos(to_radians(180))));
  lon_east = to_degrees(to_radians(center_lon) + atan2(sin(to_radians(90)) * sin(zip_spanning_radius
/ R)
* cos(to_radians(center_lat)), cos(zip_spanning_radius / R) - sin(to_radians(center_lat)) *
sin(to_radians(lat_north))));
  lon_west = to_degrees(to_radians(center_lon) + atan2(sin(to_radians(270)) *
sin(zip_spanning_radius /
R) * cos(to_radians(center_lat)), cos(zip_spanning_radius / R) - sin(to_radians(center_lat)) *
sin(to_radians(lat_north))))
//The latitude is preceded by a minus sign ( - ) if it is south of the equator (a positive
number implies
north), and the longitude is preceded by a minus sign if it is west of the prime meridian (a positive
number implies east)//;
//The database is then queried for all points that fall within the four coordinates. In an example
embodiment, northernmost latitudes and easternmost longitudes are always maximum values,
anywhere
in the world.//
if lat <= lat_north AND lat >= lat_south AND lng<= lon_east AND lng>= lon_west
    return true
  else
    Return false
```

B) Method to Calculate the Partial Area Boundary Points.

```
get_partial_area_boundary_points(parameters:zip code)
  set fall_in_boundary_points as empty array
  SELECT boundary_points (lat,lon) for the zip code from the DATABASE
  loop through each lat,lon set of the zip code
    Call if_point_is_inside_polygon(arguments: lat,lon)
    if if_point_is_inside_polygon
        perform Push(current lat,lon, fall_in_boundary_points)
    //In some cases the complete zip code will fall within the radius.//
    If number of points fall_in_boundary_points equals the total number of
```

-continued

```
boundary_points
then return the fall_in_boundary_points
else
    Identify the common intersecting points.
    Identify the first and last points in the fall_in_boundary_points
    draw a polyline from the first point to the nearest point which is outside the
    radius.
    Calculate the midpoint of the polyline.
    Set mid_point = Call get_mid_point(arguments: lat1,lon1,lat2,lon2)
    Call if_point_is_inside_polygon(arguments: mid_point.lat,mid_point.lon)
    if if_point_is_inside_polygon
        Set this as the first point in the fall_in_boundary_points
    Else
        Set the mid_point as the start point of the polyline
        //Binary search//
        Repeat this step until the if_point_is_inside_polygon returns true
        repeat the above same steps for the last points in the
    fall_in_boundary_points
```

C) Method to Find the Midpoint of a Polyline

```
get_mid_point (parameters:lat1,lon1,lat2,lon2)
set dLon = to_radians (lon2 – lon1);
//convert to radians
lat1 = to_radians(lat1);
lat2 = to_radians(lat2);
lon1 = to_radians(lon1);
set Bx = Math.cos(lat2) * Math.cos(dLon);
set By = Math.cos(lat2) * Math.sin(dLon);
set lat3 = Math.atan2(Math.sin(lat1) + Math.sin(lat2),
    Math.sqrt((Math.cos(lat1) + Bx) * (Math.cos(lat1)
    + Bx) + By * By));
set lon3 = lon1 + Math.atan2(By, Math.cos(lat1) + Bx);
return {lat: to_degrees(lat3), lng: to_degrees(lon3)}
```

D) Method to Convert Numeric Degrees to Radians.
to_radians(parameters:value)
return value*Math.PI/180

E) Method to Convert Radians to Numeric (Signed) Degrees.
to_degrees(parameters:value)
return value*180/Math.PI F) Method to Check if Another Point is Equal to One Point.
equals(parameters:point1,point2)
if (point1.lat !=point2.lat) return false;
if (point1.lon !=point2.lon) return false;
return true;

G) Method to Return the (Initial) Bearing from Point1 to Point2.
bearing_to(parameters:point1,point2)
set φ1=Call to radians(arguments: point1.lat), φ2=Call to_radians(arguments: point2.lat)
set Δλ=Call to radians(arguments: (point2.lon-point1.lon))
set y=Math.sin(Δλ)*Math.cos(φ2)
set x=Math.cos(φ1)*Math.sin(φ2)−Math.sin(φ1)*Math.cos(φ2)*Math.cos(Δλ)
set θ=Math.a tan 2(y, x)
return (Call to degrees(arguments: θ)+360) % 360

H) Method to Return Final Bearing Arriving at Destination Point from Point1; the Final Bearing Will Differ from the Initial Bearing by Varying Degrees According to Distance and Latitude.
final_bearing_to (parameters:point1,point2)
return (Call bearing to(arguments: point2,point1)+180) % 360

I) Method to Calculate the Area of a Spherical Polygon where the Sides of the Polygon are Great Circle Arcs Joining the Vertices.

```
calculate_area(parameters:polygon)
loop through the each lat,lon set of the polygon
    set R the earth's radius
    // close polygon so that last point equals first point//
    set closed = Call equals(arguments: polygon[0],
    polygon[polygon.length−1])
    if (!closed) perform Push(polygon[0], polygon)
    set nVertices = polygon.length − 1
    initialize S to zero
    initialize counter to zero
    while counter is less than or equal to nVertices
        set φ1 = Call to_radians(arguments: polygon[counter].lat)
        set φ2 = Call to_radians(arguments: polygon[counter+1].lat)
        set tmp = polygon[counter+1].lon − polygon[counter].lon
        set Δλ = Call to_radians(arguments: tmp)
        set E = 2 * Math.atan2(Math.tan(Δλ/2) *
        (Math.tan(φ1/2)+Math.tan(φ2/2)), 1 +
        Math.tan(φ1/2)*Math.tan(φ2/2))
        set S += E
        add one to counter
Endwhile
set A = Math.abs(S * R*R) // area in units of R//
return A.
```

Figure 4:
FIG. 4 is a diagram illustrating an example zip span geographical region polygon associated with a point of origination and respective expansion of the zip span region polygon boundary points, longitudinal and latitude points related to a zip span distance and related polygon, in accordance with an embodiment of the disclosed system and method.

Referring to FIG. 4, shown is an example embodiment of implementation of system received zip code of interest as 07424. Point C 63 is the center point of zip code 07424 and Points D, J, K, L, B, F, E are the centers of some of the neighboring zip codes that adjoin the boundary lines of the geographical region defined by zip code 07424. The zip span distance is set in the example embodiment as 5 miles. In the example embodiment, the system determines an extended or expanded zip span region 61 based on a magnified zip code 07424. The boundary lines of the expanded zip span region 61 are an exploded version of the boundary lines of original zip code of interest 07424. Hence, the boundary line of the expanded zip span region essentially mimics the boundary lines and hence, the shape of the geographical region defined by U.S. postal zip code 07424. This expanded zip span region 61 is essentially set at, for example, an equi-distant zip span distance from the original boundary lines of U.S. postal zip code 07424.

The system first identifies the boundary points of 07424 using for example, the boundary point database stored in the application server. It is determined that for each of the boundary points for the zip code 07424, a new expanded corresponding point is calculated at the zip span distance received by the system. In the example of FIG. 4, all the boundary points are at a latitude value of +5 miles and a longitude value of +5 miles. The corresponding new expanded corresponding point of every point of the expanded zip span region 61 is determined by the zip span processor and can be visually traced to form a new boundary which is exactly or approximately a zip span distance (for example, 5 miles) from the original boundary points of the original zip code of interest (for example U.S. postal code 07424).

If the center(s) of the adjoining zip code(s) fall(s) within this new extended or extrapolated boundary, then those zip codes are integrated within and incorporated into the expanded zip span region 61 in FIG. 4.

In the example shown of determination of zip span region in FIG. 4, zip codes with respective point B and point F as center points, are deemed to be included in the zip span region 61, while zip code 07009 would not be included in the final zip span region because center point E does not fall within the new extrapolated boundary shown of zip span region 61. The process of determining which respective neighboring zip codes are integrated into the final zip span region is described in connection with the exemplary method of FIG. 5.

Figure 5:
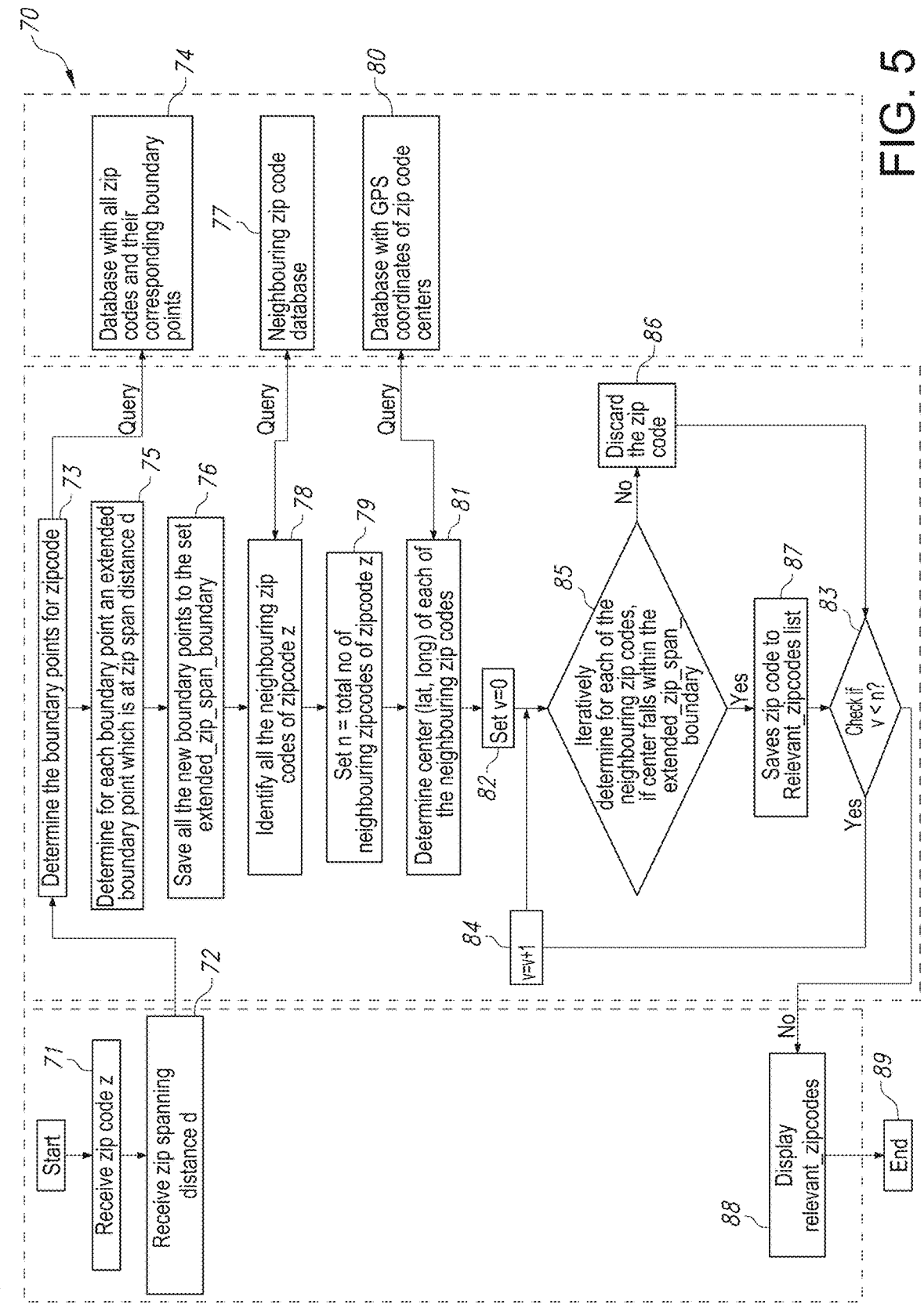
FIG. 5 is a flowchart illustrating the zip spanning process associated with determining a zip span region that defines a discrete geographical region and an extended zip span boundary line, in accordance with an embodiment of the disclosed system and method.

FIG. 5 provides an example embodiment of the determination of an extended zip span region 61 and the respective inclusion or exclusion of certain neighboring zip codes (v) in the final zip span region. The overall method 70 begins with the system receiving a zip code of interest, original zip code z in step 71. Next, the system receives the zip span distance d in miles, meters, kilometers or other unit of length or distance in step 72.

In the shown example of FIG. 5, the zip span distance d is 5 miles. Next, in step 73, the system iteratively determines the (x,y,z) coordinate boundary points for original zip code z of interest. The system may query a database storing all zip codes and their corresponding boundary points as shown in step 74. Next, the system identifies all corresponding boundary points of zip code z (for example, as (x,y,z) coordinate points) such that any geographical characteristics such as the respective geo-location point (x,y) coordinate point) and any geographical altitude (for example, mountainous regions) or lower than sea level location, for example, a valley location (or Western Europe's two lowest points are split between two areas in Denmark and the Netherlands respectively, each 23 feet below sea level (−7 meters)); Lake Eyre Basin in South Australia; The Salton Sea is 234 feet (71.3 meters) below sea level; Death Valley, Calif. which is 282 feet (86 meters) below sea level; the Qattara Depression in Egypt's Libyan Desert, which is Africa's second lowest point, which is a huge area covering over 7,000 square miles of land, below sea level, averaging close to 200 feet below sea level (−70 meters) is identifiable using its respective z-coordinate point.

Next, the system transmits the respective (x,y,z) boundary points for original zip code z and proceeds to step 75 for processing thereof. Accordingly, for each of the respective boundary points (lat, long), the system determines or calculates a new extended boundary point which is determined to be at a zip span distance d (lat+d, long+d) from the boundary points (lat, long). The altitude coordinate value z may also be implemented configured as well, in certain embodiments to identify areas of altitude or lower than sea level points.

Figure 6:
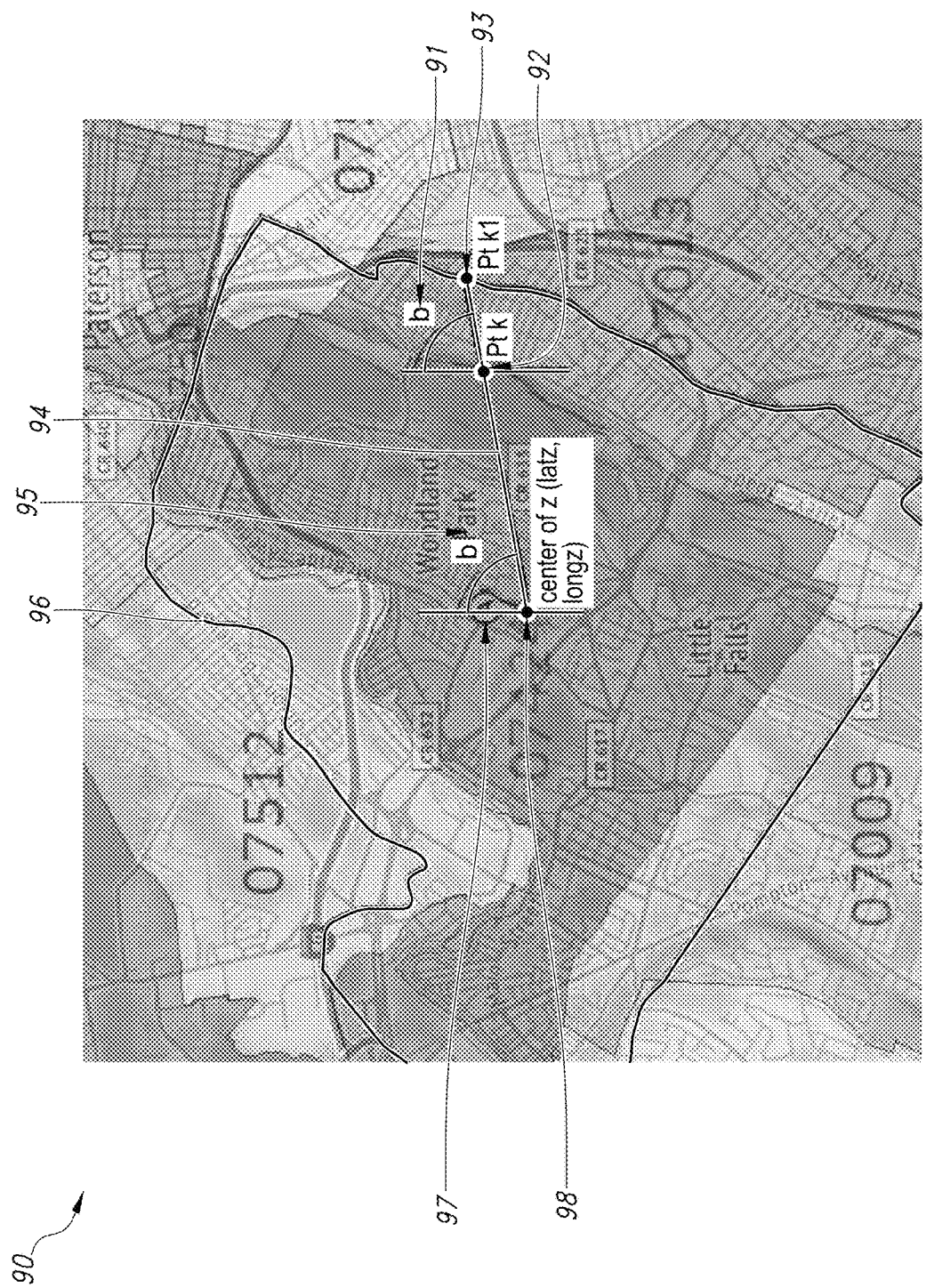
FIG. 6 is a diagram illustrating an example zip span geographical region polygon associated with a point of origination and respective expansion of the zip span region polygon boundary points, as related to a zip span distance, bearing values and related zip span polygon, in accordance with an embodiment of the disclosed system and method.

As shown in FIG. 6, for a value of the bearing b located between the center of z (lat$_z$, long$_z$) 98 and the first boundary point k (lat$_k$, long$_k$) 92 (with k being defined as a value of 1 for the first boundary point), the value of bearing b 91 is calculated by the following formula defined as Equation (5) herein below:

$$\theta = a\tan2(\sin\Delta\lambda\cdot\cos\varphi2, \cos\varphi1\cdot\sin\varphi2 - \sin\varphi1\cdot\cos\varphi2\cdot\cos\Delta\lambda) \quad \text{Equation (5)}$$

where φ1,λ1 (latitude, longitude) is the start point; φ2,λ2 (latitude, longitude); and the endpoint (Δλ is the difference in longitude).

Bearing b 95 is the compass direction from the center of z 98 to the point k 92. Point k1 93 will be at the same bearing from Point k 92. Next, the newly extended boundary point k1 (lat$_{k1}$, long$_{k1}$) 93 shown at a distance of zip span d 95 and bearing b 91 is calculated by the following formula defined as Equations (5) and (6) herein below.

$$\varphi2 = a\sin(\sin\varphi1\cdot\cos\delta + \cos\varphi1\cdot\sin\delta\cdot\cos b) \quad \text{Equation (6);}$$

$$\lambda2 = \lambda1 + a\tan2(\sin b\cdot\sin\delta\cdot\cos\varphi1, \cos\delta - \sin\varphi1\cdot\sin\varphi2) \quad \text{Equation (7);}$$

wherein φ is latitude; λ is longitude; b is the bearing (clockwise from north); δ is the angular distance d/R; d is defined as the zip span distance, and R is defined as the earth's radius. It is noted that in certain embodiments bearing b 95 or b1 (133) equals bearing b 91 or b2 (134) with point k (92, 136) being a reference point of the zip code boundary to calculate the new zip code boundary at a particular zip span distance. However, in certain embodiments, since the earth is indeed spherical in shape, the final bearing (for example, bearing b2 (134) in FIG. 9) may differ in value from the initial measured bearing b1 133 over a larger distance there from.

All the new points are determined in step 75 based on an extension of the original boundary point, which is at a zip span distance d 94, as described hereinabove. In step 76 of FIG. 5, all the new boundary points are integrated with and saved in the set of extended_zip_span_boundary. The disclosed zip span system, then next queries for all the neighboring zip codes of original zip code z in step 78. The neighboring zip codes may be identified from a database of neighboring zip codes in step 77 on the zip span system server.

In step 79, the system sets n=total number of neighboring zipcodes (or alternatively referred to herein, as "zip codes") of z that have been identified. The system next proceeds to step 81, at which for each of the neighboring zip codes of z, the system determines center coordinates. This step 81 may be accomplished by querying a database including zip codes and their centers (for example, stored as GPS coordinates associated with particular zip code centers, in the system application server) as shown for example, as step 80.

Next in step 81, the system determines for each neighboring zip code, whether the the center coordinate points intersect or lie within the newly extrapolated boundary, defined by extended_zip_span_boundary. This process may be accomplished using an example ray-casting algorithm described in connection with FIGS. 14-16 which calculate the boundary points falling within the square or extended zip code boundary. FIG. 14 describes the methodology of the ray-casting algorithm to determine if a point lies inside or outside a polygon. In the example, the zip span processor determines in step 85 if the zip code center lies inside or outside the extended_zip_span_boundary and the region defined by such boundary points. The system initially sets the counter v=0 in step 82 at which point it undergoes an iterative loop of processing based on incrementing the counter v in step 84.

Hence, in step 85, the system iteratively determines for each of the neighboring zip does, if the center point (lat, long) of the neighboring zip code falls within the region defined by the extended_zip_span_boundary. If center point (lat, long) of the neighboring zip code v, does not intersect or fall with the region defined by the extended_zip_span_boundary, then the neighboring zip code v is discarded in step 86.

If the center point indeed falls within or intersects the region associated with the extended_zip_span_boundary (for example shown as boundary 96 in FIG. 6), the neighboring zip code is saved to the relevant_zipcodes list in step 87. This process is repeated for all neighboring zip codes. The system next checks if v<n in step 83 and if so, proceeds to increment the counter v, and determine for the next neighboring zip code v+1 in step 84, whether the respective center point falls within the extended_zip_span_boundary region. If v is not less than n, then the system proceeds to transmit, display or otherwise process the identified relevant_zipcodes in step 88.

Hence, in step 89, the relevant set of zip codes, relevant_zipcodes is generated and can be displayed to the user as an extended zip span region 41 or set of relevant_zipcodes for subsequent searching of relevant information and/or distribution of particularized digital content associated with such extended, expanded and/or otherwise refined zip span region 41. The discrete process 70 as shown in FIG. 5 ends at step 89.

An exemplary set of pseudocode instructions is provided herein below. The exemplary set of instructions provides an example set of instructions that accomplish the determination of the extended_zip_span boundary described in FIG. 5 and determination of relevant neighboring zip codes for implementation and/or distribution by the digital content distribution system and/or the zip span processor of tailored digital content segments based on predetermined time epochs as associated with commerce, digital content distribution platform or system and/or other similar implementations.

The instructions are defined as follows:

```
initialize content_location_zip_code to zero
initialize zip_spanning_radius to zero
input the content_location_zip_code
input the zip_spanning_radius
SELECT center_lat and center_lon for the content_location_zip_code from the
DATABASE
SELECT boundary_points (lat, lon) for the content_location_zip_code from the
DATABASE
initialize extended_zip_span_boundary to empty array
loop through the each lat, lon set in the boundary_points
compute the bearing b between the center of the zipcode
(content_location_zip_code) and
the current boundary point
Call compute bearing(arguments: center_lat, center_lon, current_lat, current_lon)
compute the extended boundary point at a distance zip_spanning_radius of zip span
(content_location_zip_code) and bearing (bearing)
EX : compute_bearing(57.13089,–170.27203,57.126766,–170.287655)
244.07327109055018
set φ1 = Call to_radians(arguments: center_lat)
set λ1 = Call to_radians(arguments: center_lon)
set R as the earth's radius
set new_lat = Math.asin( Math.sin(φ1)*Math.cos(zip_spanning_radius/R) +
Math.cos(φ1)*Math.sin(zip_spanning_radius/R)*Math.cos(bearing))
set new_lon = λ1 +
Math.atan2(Math.sin(bearing)*Math.sin(zip_spanning_radius/R)*Math.cos(φ1),Math.cos
```

```
(zip_spanning_radius/R)–Math.sin(φ1)*Math.sin(φ2))
perform Push(new_lat, extended_zip_span_boundary)
perform Push(new_lon, extended_zip_span_boundary)
end loop
draw the new extended boundary
SELECT all zip codes from the neighboring DATABASE
initialize extended_zipcodes to an empty array
loop through each zip in the zip code list
SELECT center_lat and center_lon for the current zip codes from the neighboring
DATABASE
Call if_point_is_inside_polygon(arguments: center_lat ,center_lon)
if if_point_is_inside_polygon
perform Push(current zip code, extended_zipcodes)
end loop
Print the extended_zipcodes
```

Exemplary Common Functions for the Instructions Provided Hereinabove are:

A) Method to Check-if-Lat-Long-Point-is-within-a-Set-of-Polygons.

```
if_point_is_inside_polygon(parameters:lat,lng)
set crossings = 0
loop through each lat,lon set of the extended_zip_span_boundary
    set a = current lat,lon
    set b = next lat,lon point
    if current point is equal to last point then
        set b = first lat,lon point
    set px = lng,py = lat,ax = a.lng( ),ay = a.lat( ),bx = b.lng( ),by = b.lat( )
    if (ay > by)
        ax = b.lng( ),ay = b.lat( ),bx = a.lng( ),by = a.lat( )
    // alter longitude to cater for 180 degree crossings//
    if (px < 0) px += 360
    if (ax < 0) ax += 360
    if (bx < 0) bx += 360
    if (py == ay || py == by) py += 0.00000001
    if ((py > by || py < ay) || (px > Math.max(ax, bx))) start the loop
    with next
iteration
    if (px < Math.min(ax, bx))
        set crossings = crossings+1 , start the loop with next iteration
    set red = (ax != bx) ? ((by – ay) / (bx – ax)) : Infinity
    set blue = (ax != px) ? ((py – ay) / (px – ax)) : Infinity
    if (blue >= red)
        set crossings = crossings+1, start the loop with next iteration
end loop
if (crossings % 2 == 1) return true else return false
```

B) Method to Convert Numeric Degrees to Radians.
to_radians(parameters:value)
return value*Math.PI/180

C) Method to Convert Radians to Numeric (Signed) Degrees.
to_degrees(parameters:value)
return value*180/Math.PI D) Method to Calculate the Initial Bearing for Two Lat and Lon Points.
compute_bearing(parameters: center_lat, center_lon, current_lat,current_lon)
set φ1=Call to_radians(center_lat), φ2=Call to_radians(current_lat)
set Δλ=Call to_radians((current_lon-center_lon))
set y=Math.sin(Δλ)*Math.cos(φ2)
set x=Math.cos(φ1)*Math.sin(φ2)–Math.sin(φ1)*Math.cos(φ2)*Math.cos(Δλ)
var θ=Math.a tan 2(y, x)
return (Call to_degrees(θ)+360) % 360

Figure 7:
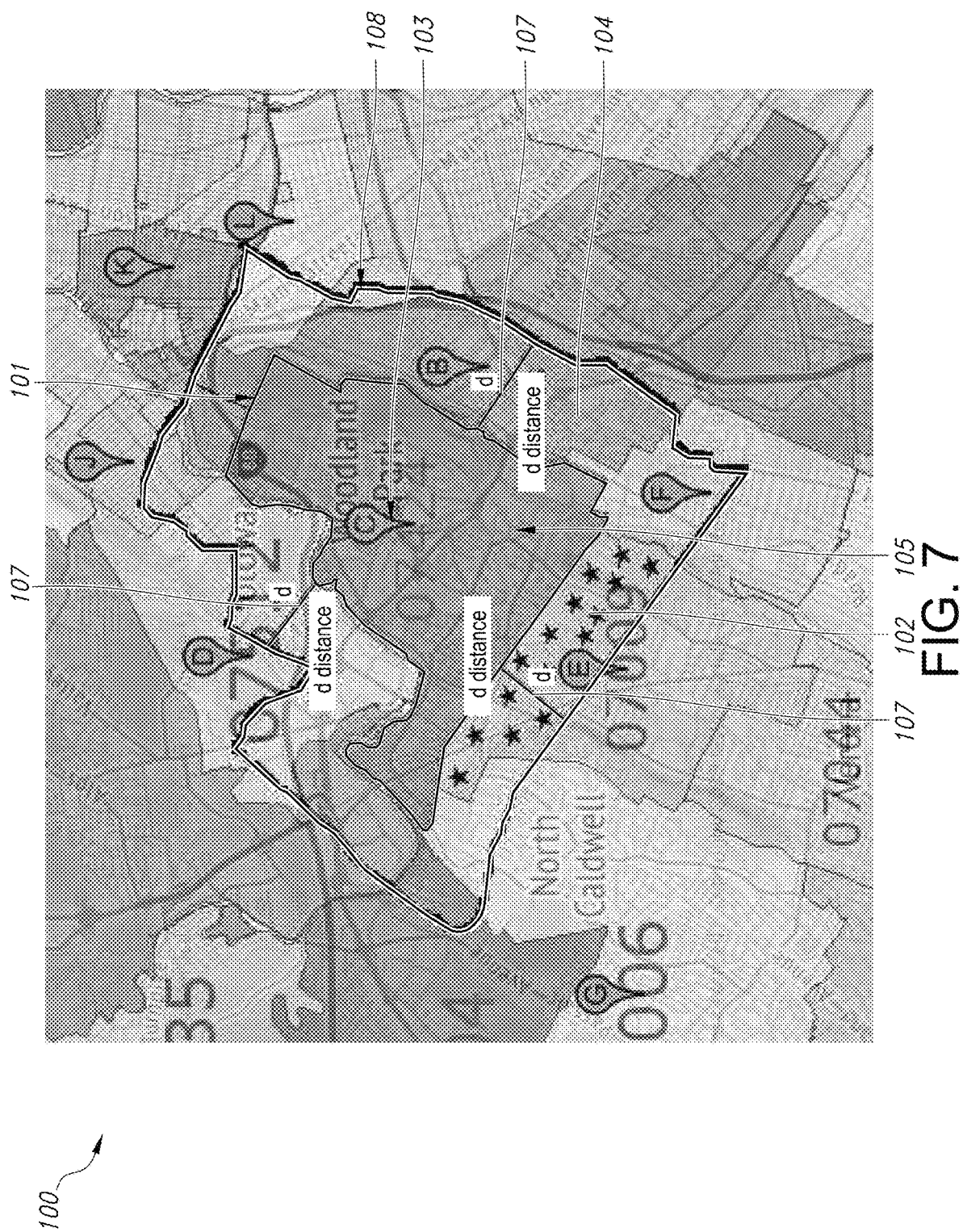
FIG. 7 is a diagram illustrating the zip spanning process associated with determining a zip span region that defines a discrete geographical region and an extended zip span boundary line, based on a threshold value analysis for inclusion in the extended zip span boundary, in accordance with an embodiment of the disclosed system and method.

In FIG. 7, the zip span processor receives zip code and a zip span distance value d in for example, a unit of distance such as miles, meters, or other measure, during the digital content campaign creation process. In the example, if the user has entered a zip code 07424 with center point C 103 shown in FIG. 7 as the zip code of interest and zip span distance d 107 is identified by the system as 5 miles. Point C 103 is the center point of zip code 07424 and points D, J, L, B, F, E, and K are the centers of some of the zip codes in the vicinity of 07424 and considered neighboring zip codes thereof (as they adjoin or are near the boundary 101 of zip code 07424). The GPS coordinates of the boundary points of the zip codes may be received from a database stored in the application server. Similarly, the GPS coordinates of the centers of the zip codes may also be stored in a database in the system server.

The zip span processor next determines a new boundary for the zip code 07424. This new or extended boundary line of the extended zip span polygon region 108 will be located at zip span distance 107 from the original zip code boundary line 101. In this example in FIG. 7, the zip span distance 107 is 5 miles from each boundary coordinate point that forms the original boundary of 07424. A visual representation would be an extrapolated zip code 07424 as shown for example in FIGS. 4 and 7, represented by thicker black boundary lines defining the extended zip span polygon regions 61, 108, respectively.

The zip span processor next determines all neighboring zip codes that intersect and/or are bounded by the region defined by the extended boundary line defining the extended zip span polygon region 108.

In particular, for each of the identified neighboring zip codes, the disclosed embodiment of the zip span system and method, calculates the total area of the neighboring zip code and the partial area that falls inside the newly extended boundary. Next, it determines a ratio of this partial area to the total area. If the ratio is greater than a threshold value either predetermined or system received value, then the zip code is integrated with and included in the extended or expanded zip span region that bounds a geographical region of interest.

In the above example shown in FIG. 7, part of zip code 07009 shown as starred region 102, falls inside the new extended or expanded boundary line defining the zip span polygon region 108. The partial area that falls inside the new boundary is represented by the starred region 102. The area of this starred region 102 is compared to the total area of the geographical zip code 07009. If the system determines that the ratio is greater than the threshold value, then the entire region associated with zip code 07009 is incorporated into the extended or expanded zip span region.

This process associated with FIG. 7 (and described herein below with respect to FIG. 8) is iteratively determined for all the identified neighboring zip codes of 07424 that fall within or are bounded by the boundary lines of the newly extended or expanded zip span region.

Figure 8:
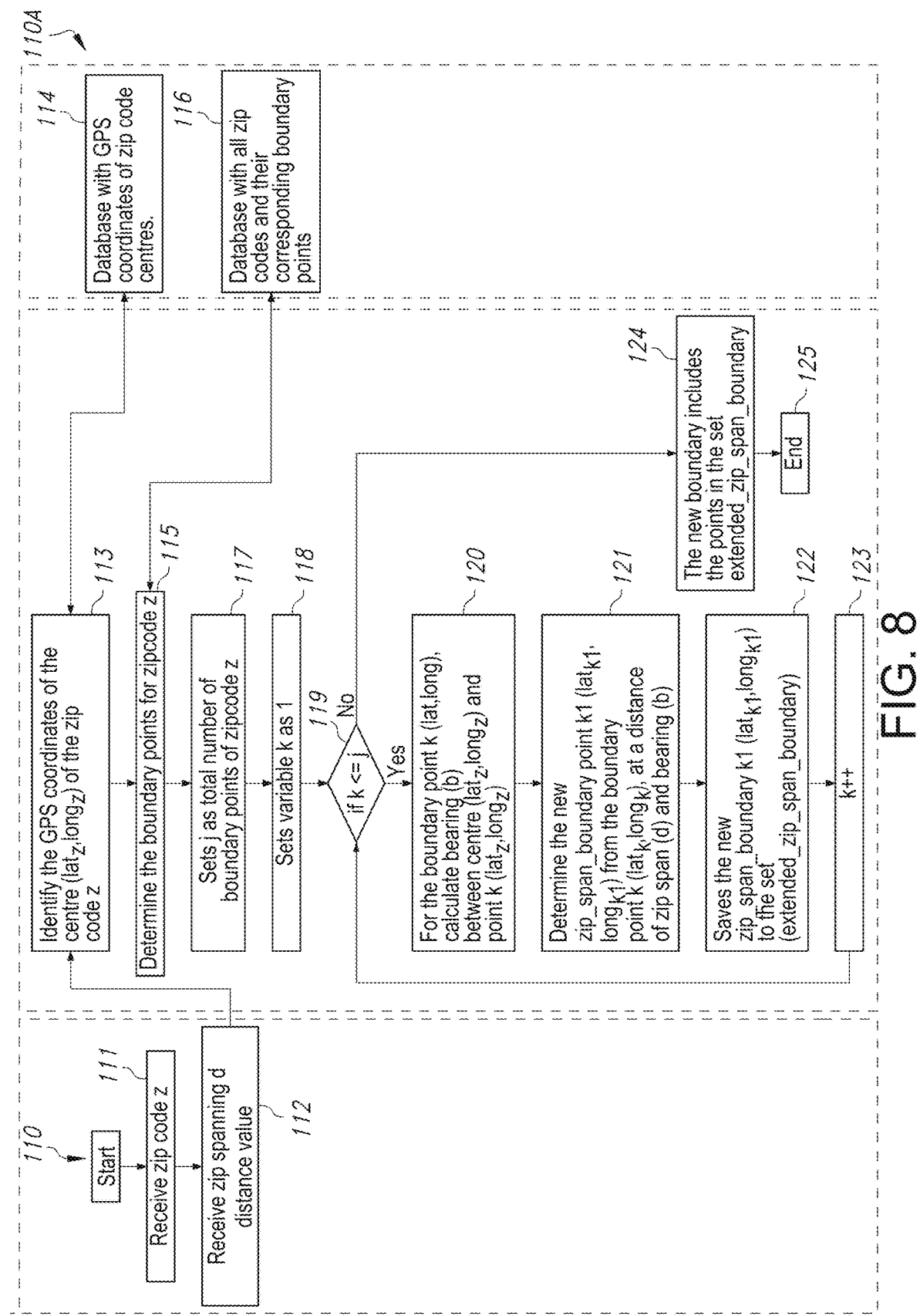
FIG. 8 is a flowchart illustrating the zip spanning process associated with determining a zip span region that defines a discrete geographical region and an extended zip span boundary line based at least on respective bearing values, and zip span boundary points, in accordance with an embodiment of the disclosed system and method.
Figure 9:
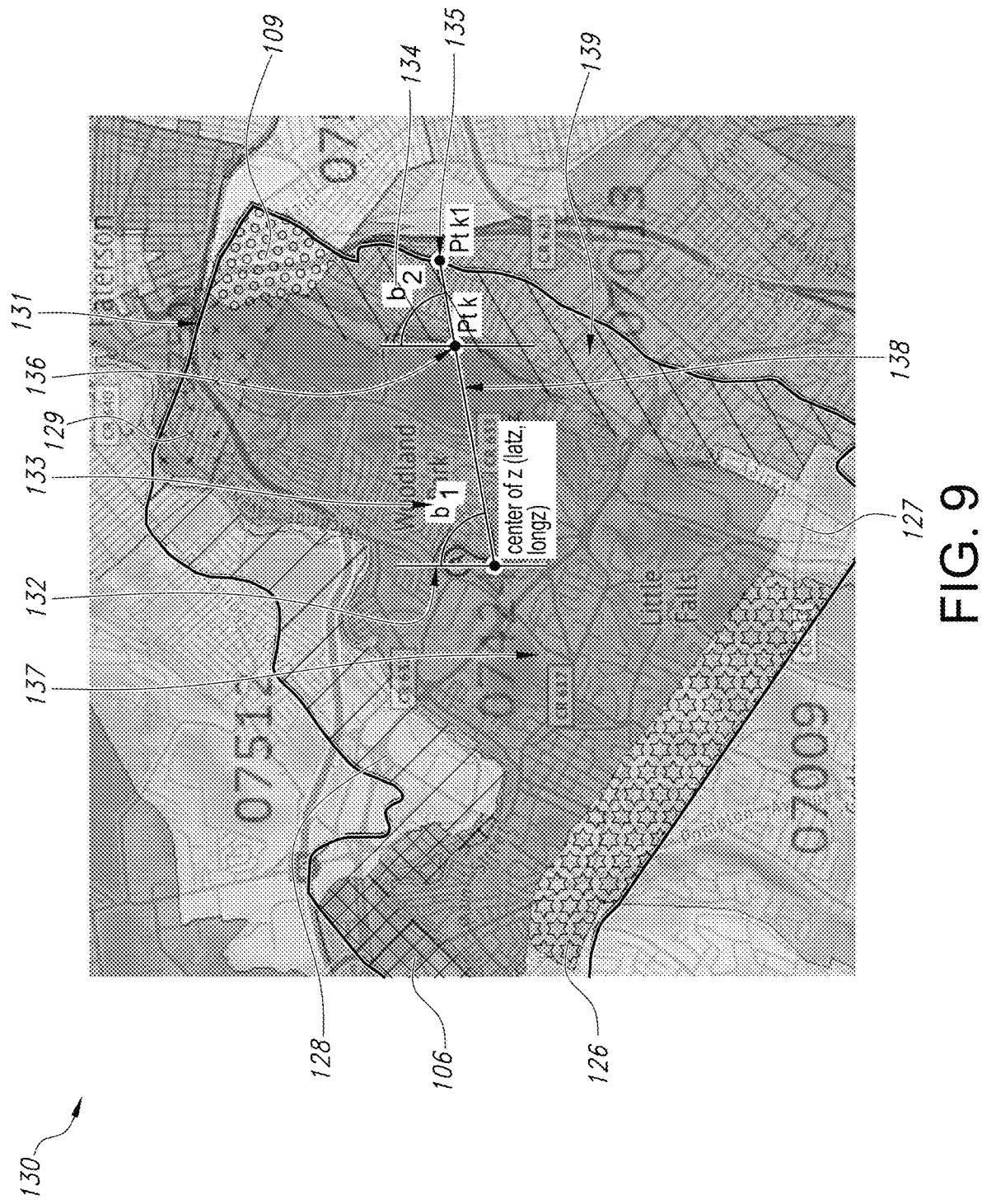
FIG. 9 is a diagram illustrating an example zip span geographical region polygon associated with a point of origination and respective expansion of the zip span region polygon boundary points, as related to a zip span distance from respective zip code, bearing values and related zip span polygon, in accordance with an embodiment of the disclosed system and method.

An overview of the workflow shown in FIG. 8 describes an example system and method to determine the extended zip code boundary in accordance with the values determined as shown for example, in FIG. 6 and FIG. 9. The extended or expanded zip code boundary line of the extended or expanded zip span polygon region 108 at zip span distance 107 is determined. Next, the zip codes included within the region bounded by the extended boundary, are identified. The most relevant neighboring zip codes are identified by the system based on the determination of neighboring zip codes that intersect and/or are included, even if partially within the region defined by the extended or expanded boundary. In certain embodiments, other factors may also be considered as to whether a neighboring zip code is most relevant or germane based on data parameter(s) for example that define relevant market data associated with a certain zip code region and/or personal preference data associated with an end user. The final extended boundary is determined by calculating the area 102 against the entire area of the neighboring zip code (for example, U.S. postal zip code 07009). Hence, the system determines if the neighboring zip code 07009 should be included in the relevant zip span, and whether the final boundary line will be further extended to include the entire portion of the neighboring zip code 07009 or not. It is noted that the neighboring zip codes may be contiguous to the original zip code of interest. There are instances where the zip code may be non-contiguous zip codes with respect to the boundary of zip code defined by a center point C (63) as shown for example, in FIG. 4 as non-contiguous zip code sub-region 67 or non-contiguous zip code sub-region 109 as shown in FIG. 9. Those non-contiguous areas 67, 109 may be considered to be incorporated into and/or at least partially define the final extended boundary of the zip span polygon region, based on an area analysis of the sub-region as compared to the total area (as described for example, in connection with embodiments shown in FIG. 8 and FIG. 11.

The overall method 110A as shown in FIG. 8, begins at step 110. The system receives zip code z 111, and further receives the zip spanning distance value d in step 112. Next the system identifies the GPS coordinates of the center (lat$_z$, long$_z$) (coordinate points) of the original zip code z of interest in step 113. The system may retrieve the GPS coordinates of the center of the zip code (z) by querying a database of zip codes and their centers stored in the server in step 114.

The system identifies the latitude and longitude (lat$_z$, long$_z$) values of the center of zip code (z) in step 113. The system in step 115 next determines all the boundary points for the zip code (z) by querying a second database in step 116, also stored in a server. This database includes latitude and longitude values for the boundary points of all the zip codes.

The system receives the respective boundary points for zip code z in step 115. Next, the total number of boundary points available for zip code z is set as j in step 117.

In step 118, a temporary variable k is set as 1 or 0, serving as a counter value. Steps 119-122 are next iteratively processed for each of the boundary points of z by incrementing counter k from 1 to j.

For the first boundary point, the bearing (b) 133 is located between the center of z(lat$_z$, long$_z$) 132 and the first boundary point (lat$_k$, long$_k$) (k 136 is set at 1 for the first point) and is calculated in step 120 of FIG. 8, by using the following formula defined as Equation (8) herein below:

$$\theta = a\tan 2(\sin \Delta\lambda \cdot \cos \varphi 2, \cos \varphi 1 \cdot \sin \varphi 2 - \sin \varphi 1 \cdot \cos \varphi 2 \cdot \cos \Delta\lambda) \quad \text{Equation (8)};$$

where φ1, λ1 (latitude, longitude) is the start point;
φ2, λ2 (latitude, longitude) the endpoint; and
Δλ is the difference in longitude.

Referring to FIG. 9, shown is center value of zipcode z (lat$_z$, long$_z$) 132 for zip code z 07424 (137). Bearing b1 133 is the compass direction from the center of z to the point k 136. Point k1 135 has the same bearing value b2 134 from Point k 136. However, in certain embodiments, since the earth is spherical, over longer distances between point k1 135 and point k 136, the values of bearing b1 133 and bearing b2 134 may in fact differ due to the inherent shape of the earth's spherical surface.

It is noted that the system in FIG. 8 determines the extended boundary points of the zip span region by checking each boundary point of the zip code z. The new boundary will be extended based on determination of zip span (d) and bearing (b) value in step 121. In the example shown in FIG. 9, the geographical areas or regions shown as shaded areas 106, 126, 128, 129, 109, 139, and 127, form part of the extended zip span polygon region defined by expanded boundary line 131.

In certain embodiments, the system will determine which of the respective regions, zip code sub-region areas 106, 126, 128, 129, 109, 139, and/or 127, actually will be integrated in the extended zip span polygon region. Certain of the zip code sub-region areas 106, 126, 128, 129, 109, 139, and/or 127, may be excluded from the extended zip span polygon region and hence, form a very irregularly shaped boundary of the extended zip span polygon region. Such exclusion may be based on a threshold determination of the area of the zip code sub-region areas 106, 126, 128, 129, 109, 139, and/or 127 as compared to the full area of its zip code. If the comparison forms a ratio that is less than a predetermined threshold value (for example, 5%, 10%, 35%, 50%, 65%, 75%, 80%, 90% or other user-definable value and/or other predetermined threshold value), then the zip code sub-region area 106, 126, 128, 129, 109, 139, and/or 127 may be integrated into the extended zip span polygon region. A partial area analysis as described in connection with FIG. 11 may be used to make this determination and is described in greater detail herein below.

In certain embodiments, the entire zip code of the zip code sub-region area 106, 126, 128, 129, 109, 139, and/or 127 may be integrated into the extended zip span polygon region and considered a germane zip code for processing zip span searches and/or any additional digital content distribution based on such extended zip span polygon region.

Referring back to FIG. 8, next, the newly extended boundary point k1 ($lat_{k1}$, $long_{k1}$) (which intersects the extended boundary line 131) at point k1 (135) is determined in step 121 using the boundary point K ($lat_k$, $long_k$) (136) at a pre-determined zip span distance (for example shown as distance 107 in FIG. 7; shown as distance 138 in FIG. 9), which is further extended by the distance determined between Pt. k 136 and Pt. $k_1$ 135 in FIG. 9. The value of zip span distance d 138 and a bearing ($b_2$) value (134) are used in this determination of the extended boundary point $k_1$ as described further hereinbelow. The newly extended boundary point $k_1$($lat_{k1}$, $long_{k1}$) is determined in the shown example, by using the following formula defined as Equations (9) and (10) provided herein below:

$$\varphi 2 = a \sin(\sin \varphi 1 \cdot \cos \delta + \cos \varphi 1 \cdot \sin \delta \cdot \cos b) \quad \text{Equation (9)}$$

$$\lambda 2 = \lambda 1 + a \tan 2(\sin b \cdot \sin \delta \cdot \cos \varphi 1, \cos \delta - \sin \varphi 1 \cdot \sin \varphi 2) \quad \text{Equation (10)}$$

where $\varphi$ is latitude,
$\lambda$ is longitude,
b is the bearing (clockwise from north),
$\delta$ is the angular distance d/R; d being the zip span distance; and variable R is the earth's radius.

The new extended boundary point $k_1$($lat_{k1}$, $long_{k1}$), which represents a portion of the extended boundary 131 of the extended zip code region is thereby determined, and saved to the dataset, extended_zip_span_boundary in step 122.

The steps 119-123 are iteratively processed/repeated until all the new boundary points are calculated. Once the counter value reaches the total number of boundary points of zip code z, then the system proceeds to step 124, in which the new boundary of the extended boundary now includes each of the points as determined in the dataset, extended_zip_span_boundary. The process ends at step 125.

Hence, the relevant set of points associated with the determined relevant neighboring zip codes, are now integrated in the extended_zip_span_boundary set, and hence, actually extends the boundary points of the expanded zip span region to includes such extended boundary points. This determined set will be displayed to the user as an extended zip span boundary region with extended boundary line(s) 131; an irregularly shaped zip-span polygon region including one or more of example zip code sub-region areas 106, 126, 128, 129, 109, 139, and/or 127 of FIG. 9; an irregularly shaped zip-span polygon region including one or more of the full zip code areas associated with one or more of zip code sub-region areas 106, 126, 128, 129, 109, 139, and/or 127; and/or a set of extended_zip_span_boundary points for subsequent searching of relevant information and/or distribution of particularized digital content in discrete time epochs associated with such final extended zip span region 108. The discrete process shown in FIG. 8 ends at step 125.

Figure 10:
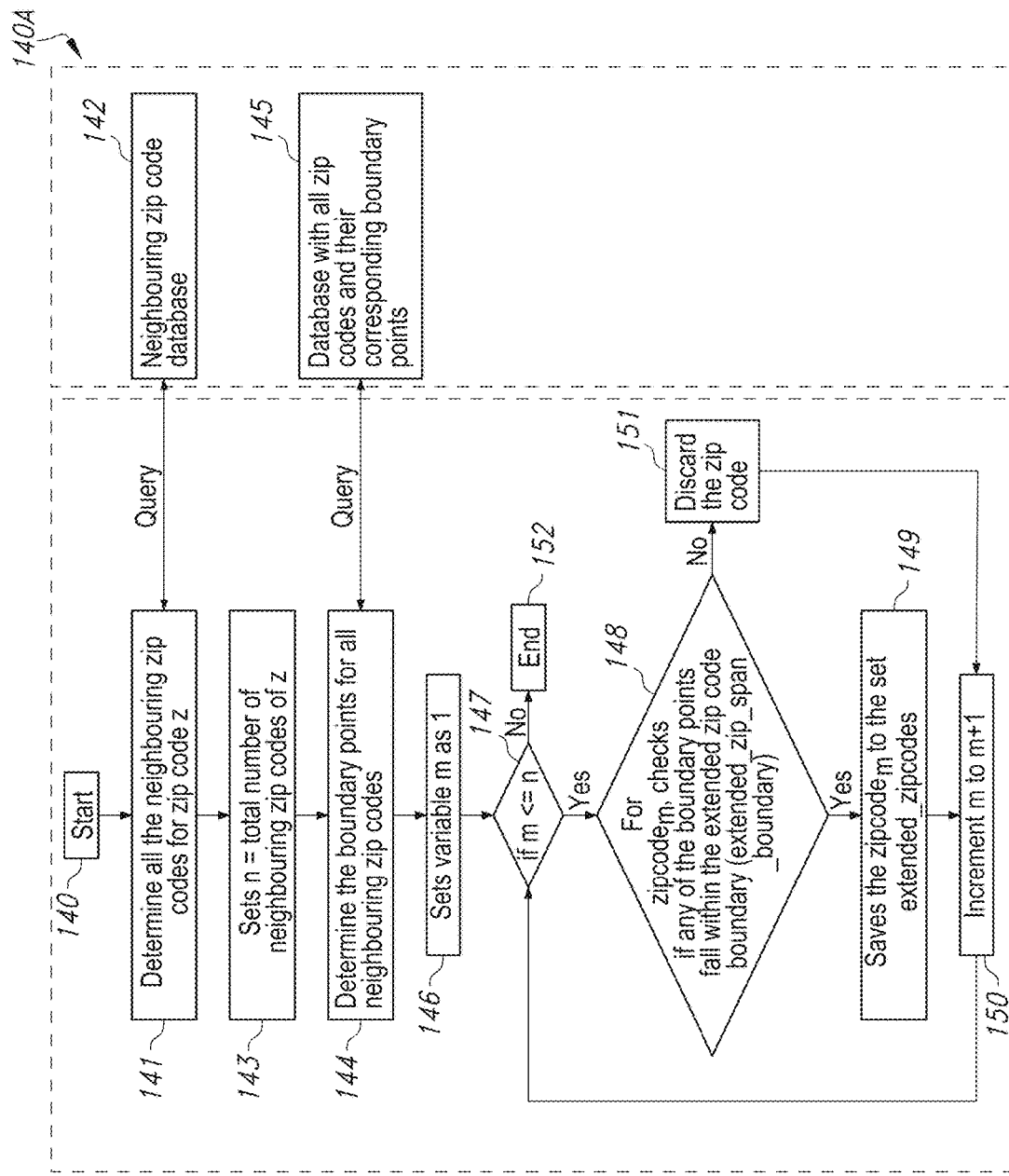
FIG. 10 is a flowchart illustrating the zip spanning process associated with determining a zip span region that defines a discrete geographical region and an extended zip span boundary line based at least on respective bearing values, and zip span boundary points of neighboring zip codes, in accordance with an embodiment of the disclosed system and method.

Shown in FIG. 10, is yet another disclosed embodiment associated with overall process 140A of determining the zip codes that are within the boundaries of the extended boundary zip span region. The method or process 140A begins with step 140. The system proceeds to determine all the zip codes that fall within, intersect and/or are bounded by the new or extended boundary line. In step 141, the system first determines all the neighboring zip codes of z and queries the neighboring zip codes database (or neighboring international postal codes database) in step 142. The neighboring zip codes of zip code z of interest are transmitted for processing in step 141. Next, in step 143, the system sets n as a total number of neighboring zip codes of zip code z. Proceeding to step 144, the system queries a database with all zip codes (including an international postal codes database) and their corresponding boundary points in step 145 to determine and transmit the boundary points of the neighboring zip codes of zip code z in step 144 for respective processing thereof.

The system next sets a temporary counter variable m as 1 (or alternatively as 0) in step 146. The system next iteratively processes steps 147-151 for a determination of all neighboring zip codes of zipcode z (or alternatively referred to herein as zip code z) and whether such zip codes are identified as intersecting and/or being bounded by the extended or new boundary line (for example, extended boundary line(s) 131 in FIG. 9). Steps 147-151 are repeated all the values of m incremented from 1 to n, specifically for all neighboring zip codes.

The system, in processing the first zip code m, checks if any of the boundary points fall within the newly extended boundary (extended_zip_span_boundary). It may accomplish this for example, by using the ray-casting algorithm as described with respect to FIGS. 14-16 herein below, to determine if a point falls inside a polygon. The algorithm is used to calculate the boundary points falling within the square 36 or region defined by the extended zip code boundary. The description herein below connected with FIG. 14 describes the ray-casting algorithm while FIG. 16 describes determining the points falling inside a polygon. FIG. 16 describes an example method of determining the points falling inside a polygon used in connection with the foregoing described zip spanning processes. The result of the example process of FIG. 10, is the set of boundary points that intersect, overlap or fall within the newly extended boundary lines (for example, extended boundary line(s) 131 shown in FIG. 9).

If none of the points fall inside and/or intersect the new or extended boundary line, then that particular zip code m is discarded in step 151. If the condition is true and hence, if the boundary points of zipcode$_m$ do indeed fall within the region defined by the extended zip code boundary line, then the zip code m is saved to the set extended_zipcodes in step 149.

Counter value m is incremented in step 150 and the check is next performed for the next zip code$_m$ in steps 147-149 of FIG. 10. Once all the neighboring zip codes of z are checked, the system returns a set of zip codes (extended_zipcodes) that fall within the new or extended boundary line. The process 140A ends in step 152.

Figure 11:
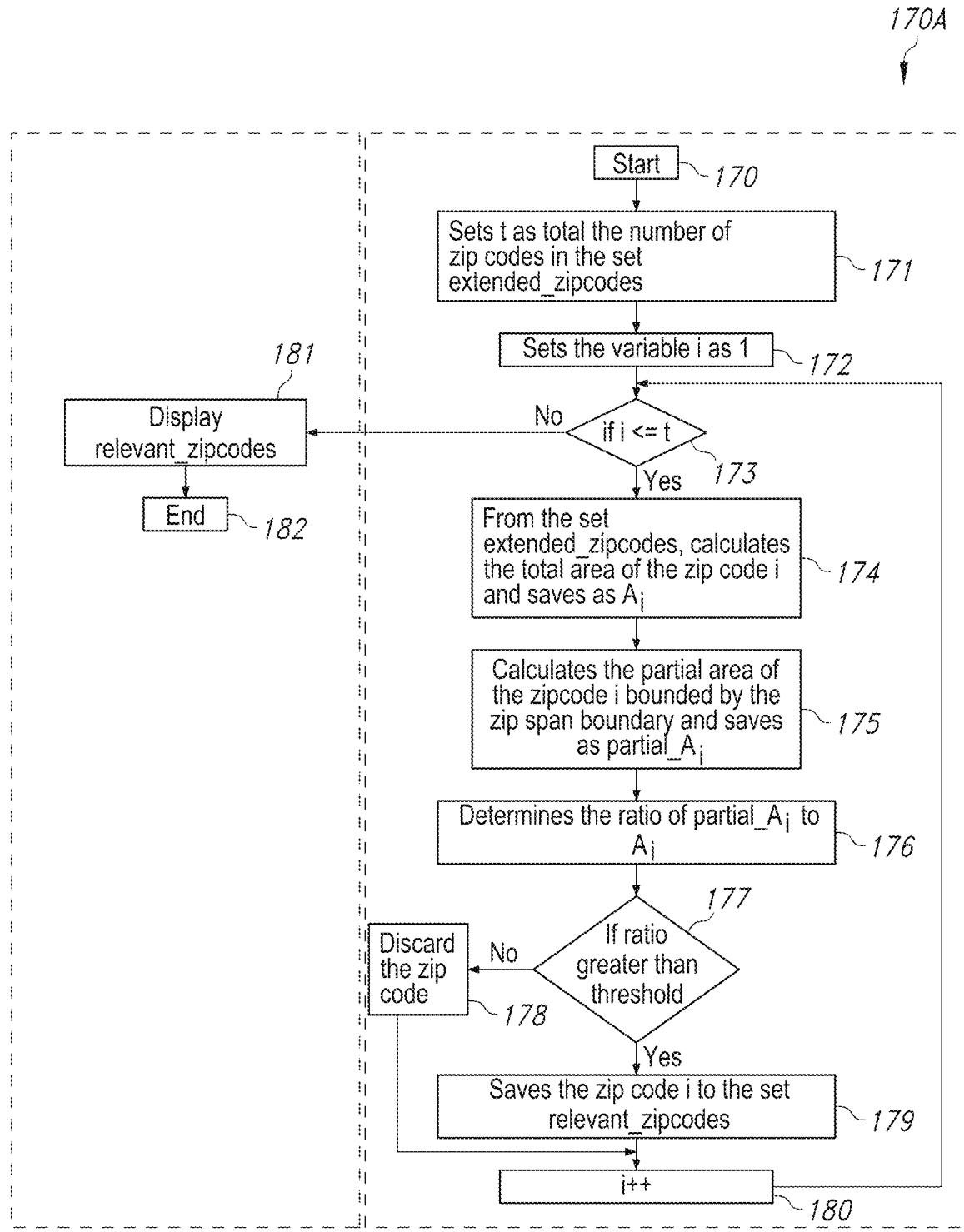
FIG. 11 is a flowchart illustrating the zip spanning process associated with determining a zip span region that defines a discrete geographical region and an extended zip span boundary line based at least on determination of ratio of partial area of respective neighboring zip code(s) as compared to its total area being above a threshold value, in accordance with an embodiment of the disclosed system and method.

In yet another disclosed embodiment, shown in FIG. 11 is an exemplary method of finding the relevant zip codes for zip spanning. The example process 170A begins at step 170, and proceeds to set the variable t as the total number of zip codes in the set extended_zipcodes in step 171. Next, a temporary variable i is set as one (1) (or in certain embodiments, as zero (0)) in step 172. Steps 173-178 are repeated for all the zip codes included in the set extended_zipcodes. That is, for i values from 1 to t, the steps 173-179, are iteratively processed until the last zip code t is finally processed.

The system using the first zip code i (beginning with i=1), calculates the total area $A_i$ in step 174. The area calculation is described in greater detail herein below with respect to FIGS. 12A-13. The boundary points of the zip code i are processed by the system in order to determine the respective area of the zip code i in step 174.

Next, the partial area of the zip code i which is located within the zip span boundary line, is calculated with the boundary points falling inside the extended boundary in step 175. This partial area of the zipcode i that is bounded by the zip span boundary is determined and saved as partial_$A_i$. The area calculation is detailed further herein below, as described in connection with FIGS. 12A-13.

The ratio of this area partial_$A_i$ to the total area $A_i$ for the extended zipcode i is further determined in step 176. The system next determines in step 177, if this ratio of partial_$A_i$ to the total area $A_i$ as determined in step 176, is greater than a predetermined threshold or otherwise, a system received threshold value. If the ratio of partial_$A_i$ to the total area $A_i$ as determined in step 176, is not greater than a predetermined threshold, then the zip code i is discarded in step 178, and the process proceeds to increment counter i in step 180 and proceeds to step 173, to repeat the processing of steps 174-178. If the ratio is greater than the threshold value, then the zip code i is saved to the set relevant_zipcodes in step 179.

Next in step 180, the counter value i is incremented and steps 173-180 are repeated for all the zip codes i included in the set of extended_zipcodes.

Once all iterations are completed of the t number of zip codes being processed in the extended_zipcodes set, the system generates a set of relevant_zipcodes in step 181. This set is the result of the zip spanning algorithm. The process 170A ends at step 182.

Hence, the relevant set of zip codes is displayed to the user in step 181 as a relevant set of zip codes (based on the determination of the partial area to the total area for the particular neighboring zip code i) for subsequent searching of relevant information and/or distribution of particularized digital content (for example digital video, image, broadcast and/or audio content including any other contemplated forms of digital content) in discrete time epochs associated with a final extended zip span polygon region (shown for example in FIG. 7 as the region defined by extended boundary line 108 or in FIG. 9 as the region defined by extended boundary line 131). The discrete example process 170A shown in FIG. 11 ends at step 182.

Shown herein below are example pseudocode instructions for implementation of the exemplary method described in connection with FIG. 11:

```
initialize content_location_zip_code to zero
initialize zip_spanning_radius to zero
input the content_location_zip_code
input the zip_spanning_radius
SELECT center_lat and center_lon for the content_location_zip_code
  from the
DATABASE (of center points)
  SELECT boundary_points (lat,lon) for the content_location_zip_code
  from the
DATABASE (of boundary points)
  initialize extended_zip_span_boundary to empty array
  loop through the each lat, lon set in the boundary_points
  compute the bearing (b) between the center of the zipcode
  (content_location_zip_code) and the current boundary point
  Call compute_bearing(arguments: center_lat, center_lon,
current_lat,current_lon)
    compute the extended boundary point at a distance zip_spanning_radius
      of zip
span (content_location_zip_code) and bearing (bearing)
  EX: compute_bearing(57.13089,−170.27203,57.126766,−170.287655)
  244.07327109055018
  set φ1 = Call to_radians(arguments: center_lat)
  set λ1 = Call to_radians(arguments: center_lon)
  set R the earth's radius
  set new_lat = Math.asin( Math.sin(φ1)*Math.cos(zip_spanning_radius/
    R) +
Math.cos(φ1)*Math.sin(zip_spanning_radius/R)*Math.cos(bearing))
  set new_lon = λ1 +
Math.atan2(Math.sin(bearing)*Math.sin(zip_spanning_radius/
R)*Math.cos(φ1),Math.cos
(zip_spanning_radius/R)−Math.sin(φ1)*Math.sin(φ2))
  perform Push(new_lat, extended_zip_span_boundary)
  perform Push(new_lon, extended_zip_span_boundary)
  end loop
  draw the new extended boundary of zip span region
  SELECT all zip codes from the neighboring DATABASE (containing
neighboring zip codes or neighboring international postal codes)
  initialize extended_zipcodes to an empty array
  loop through each zip code in the zip code list
  SELECT boundary_points (lat,lon) for the current zip codes from the
DATABASE (of boundary points)
    loop through each lat, lon set of the current zip
    Call if_point_is_inside_polygon (arguments: lat,lon)
    if if_point_is_inside_polygon
      perform Push (current zip, extended_zipcodes )
      Exit from the loop
    end loop
  end loop
  initialize relevant_zipcodes to an empty array
  loop through each zip code in the extended_zipcodes list
  SELECT boundary_points (lat,lon) for the current zip codes from the
DATABASE
  //compute the total area of the zip code//
  Call calculate_area(arguments: boundary_points)
  //compute the lat, lon points for the partial area of the zip code which
    intersects
the zip span boundary region//
  partial_area_boundary_points = Call
get_partial_area_boundary_points(arguments:current zip)
  Call calculate_area(arguments: partial_area_boundary_points)
  Set the ratio to the partial_area divided by total zip code area
  if ratio greater than or equal to threshold
    perform Push(current zip, relevant_zipcodes)
  end loop
  Print the relevant_zipcodes.
```

Common Functions Determining the Relevant Zip Codes for Zip Spanning:

A) Method to Convert Numeric Degrees to Radians
to_radians(parameters:value)
return value*Math.PI/180

B) Method to Convert Radians to Numeric (Signed) Degrees
to_degrees(parameters:value)
return value*180/Math.PI C) Method to Calculate the Initial Bearing for Two Lat and Lon Points
compute_bearing(parameters: center_lat, center_lon, current_lat,current_lon)
set φ1=Call to_radians(center_lat), φ2=Call to_radians(current_lat)
set Δλ=Call to_radians((current_lon-center_lon))
set y=Math.sin(Δλ)*Math.cos(φ2)
set x=Math.cos(φ1)*Math.sin(φ2)−Math.sin(φ1)*Math.cos(φ2)*Math.cos(Δλ)
var θ=Math.a tan 2(y, x)
return (Call to degrees(θ)+360) % 360

D) Method to Check if Another Point is Equal to One Point
equals(parameters:point1,point2)
if (point1.lat !=point2.lat) return false;
if (point1.lon !=point2.lon) return false;
return true E) Method to Return Final Bearing Arriving at Destination Point from Point1.
//The final bearing will differ from the initial bearing by varying degrees according to distance and latitude.//
final_bearing_to(parameters:point1,point2)
return (Call compute bearing (arguments: point2.lat, point2.lon, point1.lat, point1.lon)+180) % 360

F) Method to Calculate the Area of a Spherical Polygon where the Sides of the Polygon are Great Circle Arcs Joining the Vertices.

```
calculate_area(parameters:polygon)
  loop through the each lat,lon set of the polygon
  set R the earth's radius
  // close polygon so that last point equals first point //
  set closed = Call equals(arguments: polygon[0],polygon[polygon.
  length−1])
  if (!closed) perform Push(polygon[0], polygon)
  set nVertices = polygon.length − 1
  initialize S to zero
  initialize counter to zero
  while counter is less than or equal to nVertices
    set φ1 = Call to_radians(arguments: polygon[counter].lat)
    set φ2 = Call to_radians(arguments: polygon[counter+1].lat)
    set tmp = polygon[counter[+1].lon − polygon[counter].lon
    set Δλ = Call to_radians(arguments: tmp)
    set E = 2 * Math.atan2(Math.tan(Δλ/2) * (Math.tan(φ1/2)+Math.
    tan(φ2/2)), 1
+Math.tan(φ1/2)*Math.tan(φ2/2))
    set S += E
    add one to counter
  Endwhile
  set A = Math.abs(S * R*R) // area in units of R
  return A.
```

G) Method to Check if Lat-Long Point is within a Set of Polygons.

```
if_point_is_inside_polygon(parameters:lat,lng)
  set crossings = 0
  loop through each lat, lon set of the extended_zip_span_boundary
  set a = current lat, lon
  set b = next lat, lon point
  if current point is equal to last point then
    set b = first lat, lon point
  set px = lng,py = lat,ax = a.lng( ),ay = a.lat( ),bx = b.lng( ),by = b.lat( )
  if (ay > by)
    ax = b.lng( ),ay = b.lat( ),bx = a.lng( ),by = a.lat( )
  // alter longitude to cater for 180 degree crossings
  if (px < 0) px += 360
  if (ax < 0) ax += 360
  if (bx < 0) bx += 360
  if (py == ay || py == by) py += 0.00000001
  if ((py > by || py < ay) || (px > Math.max(ax, bx))) start the loop
    with next
iteration
  if (px < Math.min(ax, bx))
    set crossings = crossings+1, start the loop with next iteration
  set red = (ax != bx) ? ((by − ay) / (bx − ax)) : Infinity
  set blue = (ax != px) ? ((py − ay) / (px − ax)) : Infinity
  if (blue >= red)
    set crossings = crossings+1, start the loop with next iteration
  end loop
  if (crossings % 2 == 1) return true else return false
```

H) Method to Calculate the Partial Area Boundary Points.

```
get_partial_area_boundary_points(parameters:zip code)
  set fall_in_boundary_points as empty array
  SELECT boundary points (lat,lon) for the zip code from the
  DATABASE
  loop through each lat,lon set of the zip code
    Call if_point_is_inside_polygon(arguments: lat,lon)
    if if_point_is_inside_polygon
      perform Push(current lat,lon, fall_in_boundary_points )
  //In some cases, the complete zip code will fall within the radius.//
  If number of points in fall_in_boundary_points equals the total
  number of
boundary_points, then return the fall_in_boundary_points
  else
    Identify the common intersecting points.
    Identify the first and last points in the fall_in_boundary_points
    Draw a polyline from the first point to the nearest point which
    is outside
the radius.
    //Calculate the midpoint of the polyline.//
    Set mid_point = Call get_mid_point(arguments: lat1,lon1,
    lat2,lon2)
    Call if_point_is_inside_polygon(arguments: mid_point.lat,
    mid_point.lon)
    if if_point_is_inside_polygon
    Set this as the first point in the fall_in_boundary_points
    Else
    Set the mid_point as the start point of the polyline
    //Binary search//
    Repeat this step until the if_point_is_inside_polygon returns true
    repeat the above same steps for the last points in the
fall_in_boundary_points
```

I) Method to Find the Midpoint of a Polyline.

```
get_mid_point(parameters:lat1,lon1,lat2,lon2)
  set dLon = to_radians(lon2 − lon1);
  //convert to radians//
  lat1 = to_radians(lat1);
  lat2 = to_radians(lat2);
  lon1 = to_radians(lon1);
  set Bx = Math.cos(lat2) * Math.cos(dLon);
  set By = Math.cos(lat2) * Math.sin(dLon);
  set lat3 = Math.atan2(Math.sin(lat1) + Math.sin(lat2),
  Math.sqrt((Math.cos(lat1) +
Bx) * (Math.cos(lat1) + Bx) + By * By));
  set lon3 = lon1 + Math.atan2(By, Math.cos(lat1) + Bx);
  return {lat: to_degrees(lat3), lng: to_degrees(lon3)}.
```

Referring back to the above-described embodiments in which the zip-spanning algorithm is implemented, for example in disclosed method described in FIGS. 1, 5, 8, 10, and 11, any required determination of the area on the Earth's surface can be performed using an example method proposed by C.F.F. Karney. In this method, the area of a spherical polygon, as shown in FIG. 12A, in which the sides of the polygon are great circle arcs joining the vertices, is calculated by the concept of Spherical Excess.

A spherical polygon is a closed geometric figure on the surface of a sphere, which is formed by the arcs of great circles. The spherical polygon is a generalization of the spherical triangle. A great circle is a circle on the surface of a sphere which lies in a plane passing through the sphere's center. It represents the shortest distance between any two points on a sphere.

Spherical excess is the difference in the sum of angles of a spherical triangle and a regular planar triangle. The sum of angles in a planar triangle is pi or 180 degrees. Shown in FIGS. 12A and 12B is a spherical triangle 185, 187 on the surface of a sphere. The angles of the spherical triangle 187 shown in FIG. 12B are A, B and C.

Figure 12B:
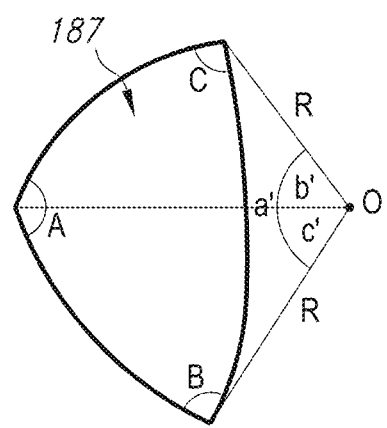
FIG. 12B provides a diagram of an exemplary spherical excess of a spherical triangle used in the determination of the respective area of a zip span polygon region, in accordance with an embodiment of the disclosed system and method.
Figure 13:
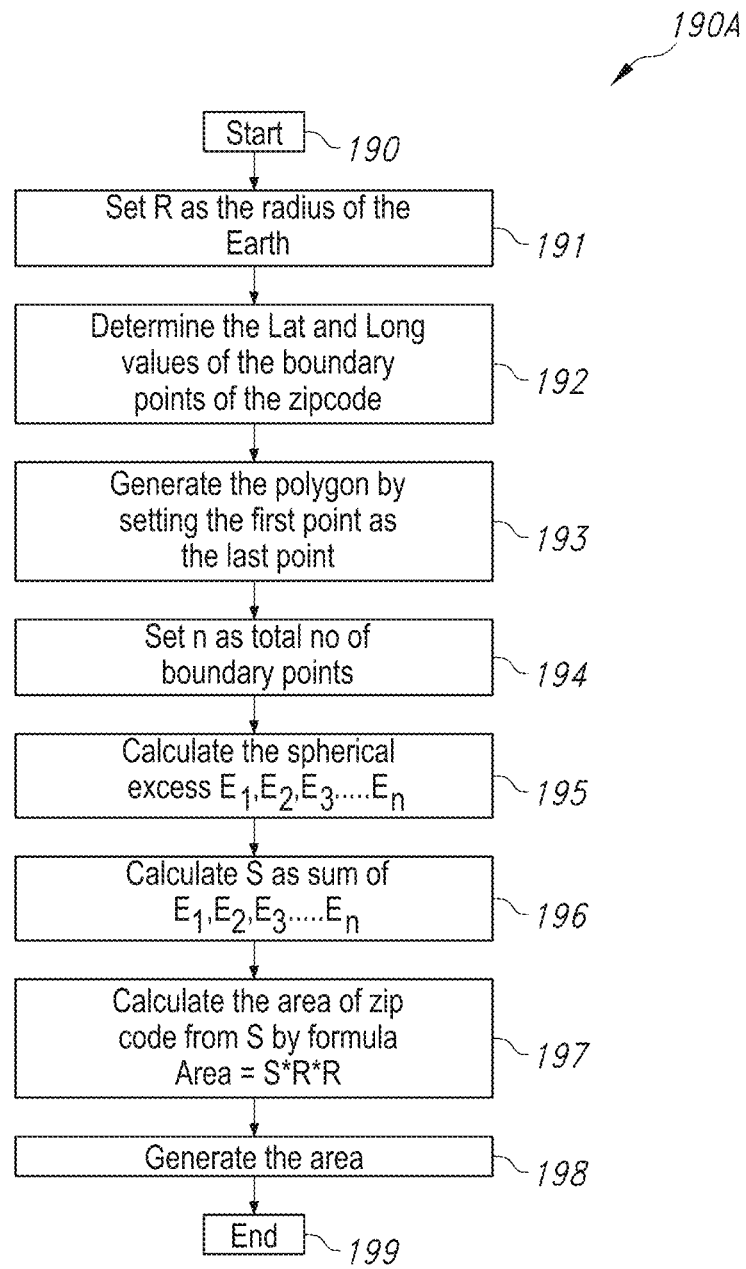
FIG. 13 provides a workflow which implements a spherical excess of a spherical triangle model used in the determination of the respective area of a zip span polygon region, in accordance with an embodiment of the disclosed system and method.

The Spherical Excess as shown in FIG. 12B, is determined using the Equation 11 defined herein below as:

$$E = A + B + C - pi \quad \text{Equation (11)}$$

A spherical polygon can be broken into a number of spherical triangles 186 as shown in FIG. 12A. The area of the polygon can be found out by multiplying the sum of the spherical excess of these triangles with the square of the radius of the sphere. Using the example method, the area calculation used in the above-described methods implementing the zip spanning algorithm is accomplished using the steps described in greater detail herein below in connection with FIG. 13.

The workflow for area calculation is implemented in FIG. 2, steps 12 and 13; and steps 174 and 175 in FIG. 11. The input to the respective workflows is the boundary points for the area to be calculated and the output is the area. If the input is partial boundary points then the output is the partial area.

Referring to the exemplary method shown in FIG. 13, process 190A begins at step 190. The zip span processor sets the variable R with the value for example, (or expressed as for example, 6378e3, 6.3781×10$^6$ m; 3963 mi; or 6378 km) as the value for the radius of the Earth in step 191. It is noted the determination of Earth's radius can have varying values, depending on how it is measured; from its equatorial radius of about 6,378 kilometers (3,963 miles) to its polar radius of about 6,357 kilometers (3,950 miles). Next, in step 192, the system determines the latitude and longitude values of the boundary points of the zip code of interest in an array. The system proceeds to step 193 and generates a zip span polygon by setting the first point as the last point, which essentially creates a closed polygon. The polygon is closed by setting in the array the first point as the last point.

In step 194, the system sets n as the total number of boundary points. In step 195, the spherical excess $E_1$, $E_2$, $E_3$, ... $E_n$ is calculated.

The application then sets n as the total number of boundary points.

The application then calculates the Spherical excess $E_1$ by the formula defined herein below as Equation (12):

$$\tan(E/2) = \tan(\Delta\lambda/2) \cdot (\tan(\varphi\frac{1}{2}) + \tan(\varphi 2/2)) / (1 + \tan(\varphi\frac{1}{2}) \cdot \tan(\varphi 2/2)) \quad \text{Equation(12)}$$

Where E is spherical excess;
($\varphi$1, $\lambda$1) is the first boundary point in radians;
($\varphi$2, $\lambda$2) is the second boundary point in radians; and
$\Delta\lambda$ is the difference between $\lambda$1 and $\lambda$2.

Similarly, the system calculates the values $E_2$, $E_3$ ... $E_n$ in step 195. Next, in step 196, the system determines S as the sum of spherical excess values $E_1$, $E_2$ ... $E_n$. Next, the area of the zip code is calculated in step 197, by multiplying S with the square value of R or R$^2$, which is the radius of the Earth. The area of the extended zip code is next generated in step 198 and the process ends in step 199.

Shown in FIG. 14 is an illustration of a polygon and intersecting rays associated with a ray-casting algorithm used to determine whether boundary points intersect a zip span polygon region, also as further described herein below with respect to FIGS. 15-16, in accordance with an embodiment of the disclosed system and method.

The ray-casting algorithm is used to calculate the boundary points that intersect or fall within the zip span square 36 or extended zip code boundary shown for example as extended boundary line 108 in FIG. 7 or extended boundary line 131 in FIG. 9.

In certain aspects or embodiments, the ray-casting algorithm is implemented to determine if a point falls inside or outside a zip span polygon. According to the ray-casting algorithm, if a horizontal infinitely drawn ray from the point (P1, P2, P3), crosses the edges of the polygon an even number of times, it is deemed outside the polygon. However, if the ray from the point crosses the edges of the polygon, an odd number of times then it is considered inside the polygon.

In the FIG. 14, points 1 and 3 (P1, P3) are outside the polygon because the ray drawn from those respective points, cross the edges twice. Whereas point 2 (P2) is inside the polygon and the ray extending from P2 crosses an edge of the polygon just once. This algorithm is used in certain embodiments do determine if the center of the subject zip code (neighboring or extended zip code) falls within the extended boundary for example, as described in FIG. 5 hereinabove. In FIG. 5, as described hereinabove, in step 85, for each neighboring zip code, the system determines if the center falls with the extended_zip_span_boundary or the zip span polygon region (for example square 36 or extended zip span boundary region).

In certain aspects or embodiments of the disclosed zip spanning method, intersecting polygons 1 and 2 shown in FIG. 15, are used in order to determine whether any of the boundary points of a first zip span region (referred to as polygon 1 region) intersect or fall within the zip span square or extended boundary of a second zip span region (referred to as polygon 2 region). In such embodiment, the system first determines the boundary points of polygon 1 region (points 1 to 13) and polygon 2 region (points A to D). Using each of the points (shown as pts. 1-13) of polygon 1, the system checks if the subject point falls inside or intersects the polygon 2 using the ray-casting algorithm. If it is determined that the subject point does intersect or fall within the boundary of polygon 2, the respective point is saved to a set of points that intersect or fall inside polygon 2. Points 1 to Points 6 are calculated by the above method and deemed to intersect polygon 2 in the shown example provided FIG. 15.

The respective points shown on the border, Pt. X and Pt. Y, are calculated by doing a binary search between Pt. 1 and Pt. 13 and between Pt. 6 and Pt. 7, respectively. In order to accomplish the binary search, the midpoint between Pt. 1 and Pt. 13 is calculated. The system zip span processor next determines if such midpoint falls within polygon 2. If it does not fall or intersect, then a new midpoint between the previous midpoint and Pt. 1 is again calculated. This is done iteratively to find the boundary point Pt. X when the midpoint just falls inside the polygon. The same process is repeated for calculating boundary Point Y between Point 6 and 7. Finally the points X, 1, 2, 3, 4, 5, 6 and Y are returned as partial area points. This algorithm is used to determine the boundary points falling inside the extended boundary as described in connection with example process of FIG. 2, and determining the zip codes that are included in the extended boundary described in FIG. 10, step 148.

FIG. 16 provides a flowchart illustration of the method associated with determining points inside the zip span extended boundary, zip span polygon region (for example, square 36 or including example extended boundary lines (shown for example as extended boundary line 108 in FIG. 7 or extended boundary line 131 in FIG. 9), an extended zip span polygon region; and/or an irregularly shaped zip span polygon region, in accordance with an embodiment of the disclosed system and method. The disclosed method provides exemplary steps undertaken to determine the respective points inside the zip span extended boundary that defines the zip span polygon region or a zip span square polygon region and generates these points as an output to the zip span processor or digital content distribution platform or system.

The exemplary process 200A shown in FIG. 16, begins at step 200. The system zip span processor proceeds to identify the boundary points of polygon 1 in step 201. The disclosed method next identifies the boundary points of polygon 2 in step 202. The points of polygon 1 that fall within or otherwise intersect the boundary line of polygon 2 are iteratively processed in step 203 and once determined, the system checks if all points in polygon 1 were processed and if not, the system proceeds to increment the counter in step 213 for processing the next respective point i+1 at step 213.

Hence, the method proceeds to process iteratively each point i of polygon 1 to determine if it intersects or falls within the boundary points of polygon 2 in step 203. This is accomplished for example, using the ray-casting algorithm as described in connection with FIGS. 14-15 hereinabove. The system determines the number of times an infinite horizontal ray from the point crosses the edges of the polygon. If the number is even then the point is outside the boundary of the polygon. If the number of crossings is odd, then the point is deemed to be inside the polygon.

If the point is determined to be outside the polygon, it is discarded as associated with a non-relevant or non-germane zip code point in step 204. In such case, the system proceeds to determine if all the points of polygon 1 have been processed in step 205. If all the points were processed in step 206, the system proceeds to step 207. If all of the respective points of polygon 1 were not processed, the method proceeds to step 213, to increase the value of i=i+1 which increments the counter value, thereby processing the next point i+1 in step 203. If the point is indeed determined to fall inside the boundary of polygon 2, then that respective point i is saved to the set points_inside_polygon in step 205.

A determination is then made based on whether all the boundary points of the polygon 1 are processed in step 206. Next in step 207, it is determined if the number of points in the set points_inside_polygon is equal to the total number of boundary points of polygon 1 in step 207. If it is determined that the number of points are indeed equal in step 207, then it is concluded by the system in step 208, that the whole of polygon 1 falls inside the boundary of polygon 2. Next, the system proceeds to step 214 to generate the final set of points_inside polygon and the method ends at step 213.

If it is determined that the number of points in the set points_inside_polygon are not equal to the number of boundary points of polygon 1 in step 207, then the points of intersection of both boundaries of polygon 1 and polygon 2 are next determined in steps 209-210. In step 209, the system identifies the first and last points of points_inside_polygon and the points just outside the boundary. The system identifies the boundary points of polygon 1 that lie just outside the border or boundary perimeter line of polygon 2 in step 209.

The system next performs binary searching in step 210 between the two points on either side of the boundary to arrive at the point just inside the boundary. In binary searching the system determines the midpoint between the two points and checks if the midpoint falls inside the boundary. If it does not, the system determines the midpoint between the previous midpoint and the point inside the boundary and checks whether the midpoint falls within the boundary. This determination is done iteratively until the point just falls inside the boundary.

The system then saves the intersecting points to the set points_inside_polygon and generates the final points_inside_polygon set in step 211. The process 200A ends at step 215.

Hence, the above embodiment as described in FIG. 16, essentially determines the boundary point of a zip code (referred to as polygon 1) and whether those points lie, intersect or overlap within the perimeter zip span polygon square or extended boundary of an extended zip span polygon region. Analyzing each of the points of polygon 1, (example, points 1 to 13) as shown in FIG. 15, the system checks if the respective polygon point falls within the boundary of polygon 2. As shown in FIG. 15, points 1-6 fall within polygon 2, and hence, are deemed to be included as part of the zip span region and/or extended zip span region based on the respective analysis implemented for determination of which zip codes will be integrated in the zip span region, such as neighboring zip code analysis, partial area analysis, perfect distance formula, irregular zip span polygon, zip span polygon square, ray-casting analysis, spherical excess area analysis, overlapping polygon analysis, etc.

In certain applications of using the determined zip span polygon region as described with respect to the disclosed embodiments, the digital content/campaign search functionality involves the process of gathering campaigns/digital content when an end user/searcher accesses the application. It also involves how an end user/searcher can retrieve and/or view particular digital content of interest for example, an educational video, video snippets, audio, audio snippets, image data, advertisements, and/or specific content based on the requested search.

In certain embodiments, the end user and/or searcher can search for digital content campaigns on one or more platform(s), by entering a discrete number of zip codes or alternatively, by implementation of the zip span process which identifies a germane region of interest to the end user/searcher by determination of a zip span polygon region and/or use an alternative platform configuration for searching.

Once the platform is selected, the system can receive data associated with user options to enter details such as specific keywords, category and/or zip code related to the campaign or geographical-related information a user may be searching. The user can either enter all the details, a limited number or no details. For example, if no zip code is specified for entry into the system, the system can determine the zip code (or an approximate zip code or international postal code that is geographically desirable) by determination of the user device IP address or application cookies to display digital content, information and/or campaigns associated with a geographical region of interest or otherwise, location-based. The user can enter the following information while searching for a particular kind of campaign. For example, in certain embodiments the user enters a zip code which can be used to search for campaigns. If the user does not enter a zip code there are additional options: the system may retrieve zip code regions from previous implementation by the particular user that can be stored by the system in the form of cookies or other known forms of artificial intelligence or user-machine learning patterns. Alternatively, the system may determine the zip code by identifying the IP address of the user device. This can be accomplished for example, using an insular system database, which stores a list of IP addresses and the locations of the IP addresses.

In addition, a user may enter information based on which campaigns are sorted and which results are displayed. For example, a merchant, educational institution, other commercial business owner or otherwise, a customer or client thereof, has the option of selecting a category as a search criteria. If a category is not selected, then system collects all the campaigns or digital content associated with a particular zip code and any of the zip-spanning zip codes associated with a zip span region or extended zip span region are identified. A zip code (or postal code) of interest that generates discrete digital content based thereon, is the zip code (or postal code) in the campaign address entered by a content creator, content provider or other user (for example, a merchant, educational institution, service provider, medical institution, business owner or otherwise an other digital content owner/provider) during the campaign creation process. Zip-spanning zip codes are the zip codes or postal codes determined by the zip spanning algorithm to be included in the particular zip span region.

In certain aspects or embodiment, campaigns are then sorted according to the proximity of the user device/searcher to origin of content location of the campaigns. In addition, other defining feature(s) may factor into the sorting process, such as length of content, relevancy of content to user's search request, interest-level of content or other defining feature (such as for example, based on one or more market data parameter(s) associated with the particular zip span region, personal preference data, relevant geographical features and/or other characteristics of the zip span region that would factor into filtering such search results). The system then displays a first set of discrete number of campaigns on for example, the application home page. If a category is selected by the user, the filtered search results are displayed on the gallery page. There can be listings, such as main list and a recommended list. The Main List displays all the campaigns whose zip-spanning zip code and merchant-related or digital content owner-related zip code matches user entered or identified zip code. A recommended listing includes a display of all the campaigns whose zip-spanning zip codes matches the identified or user device entered zip code(s). These campaigns are sorted according to the distance between the center (or other defining zip span boundary line) of user entered zip code and the center (or other defining zip span boundary line) of the zip span zip code. The campaigns may be displayed in the order of the proximity to the user location or zip span region of interest, closest first and farthest last or vice-versa.

Figure 17:
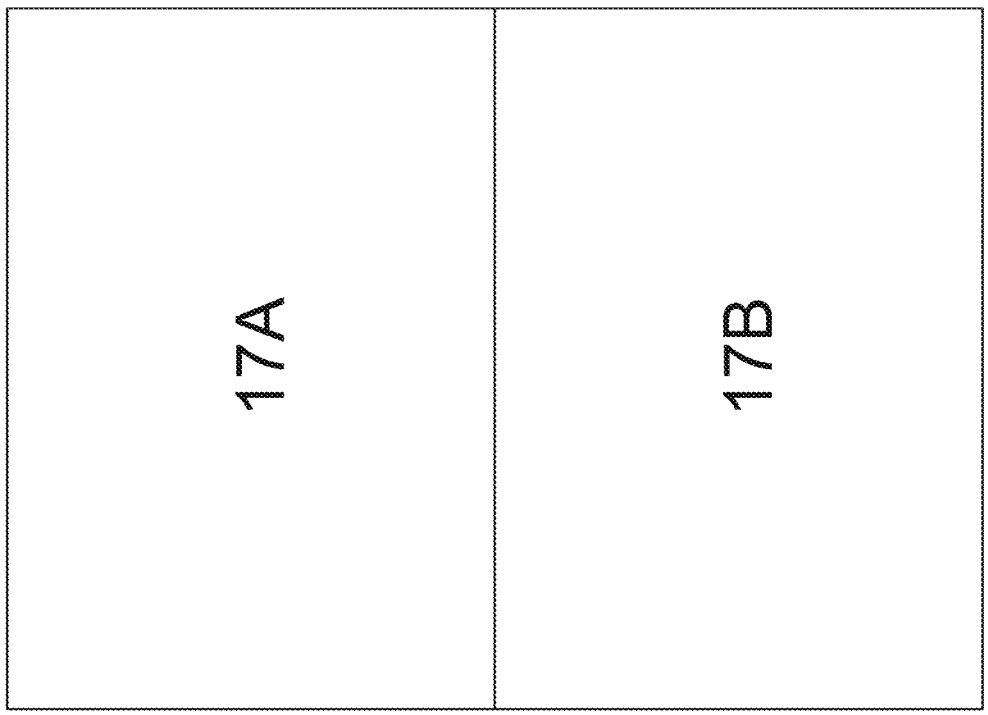
FIG. 17 (presented as contiguous flowcharts in FIGS. 17A & 17B) provides an overview of the digital content searching process that implements the zip spanning method, in accordance with any embodiment of the disclosed system and method.

FIG. 17 (presented as contiguous flowcharts in FIGS. 17A & 17B) provides an overview of the digital content searching process which implements the zip spanning method, in accordance with an embodiment of the disclosed system and method.

Figure 17A:
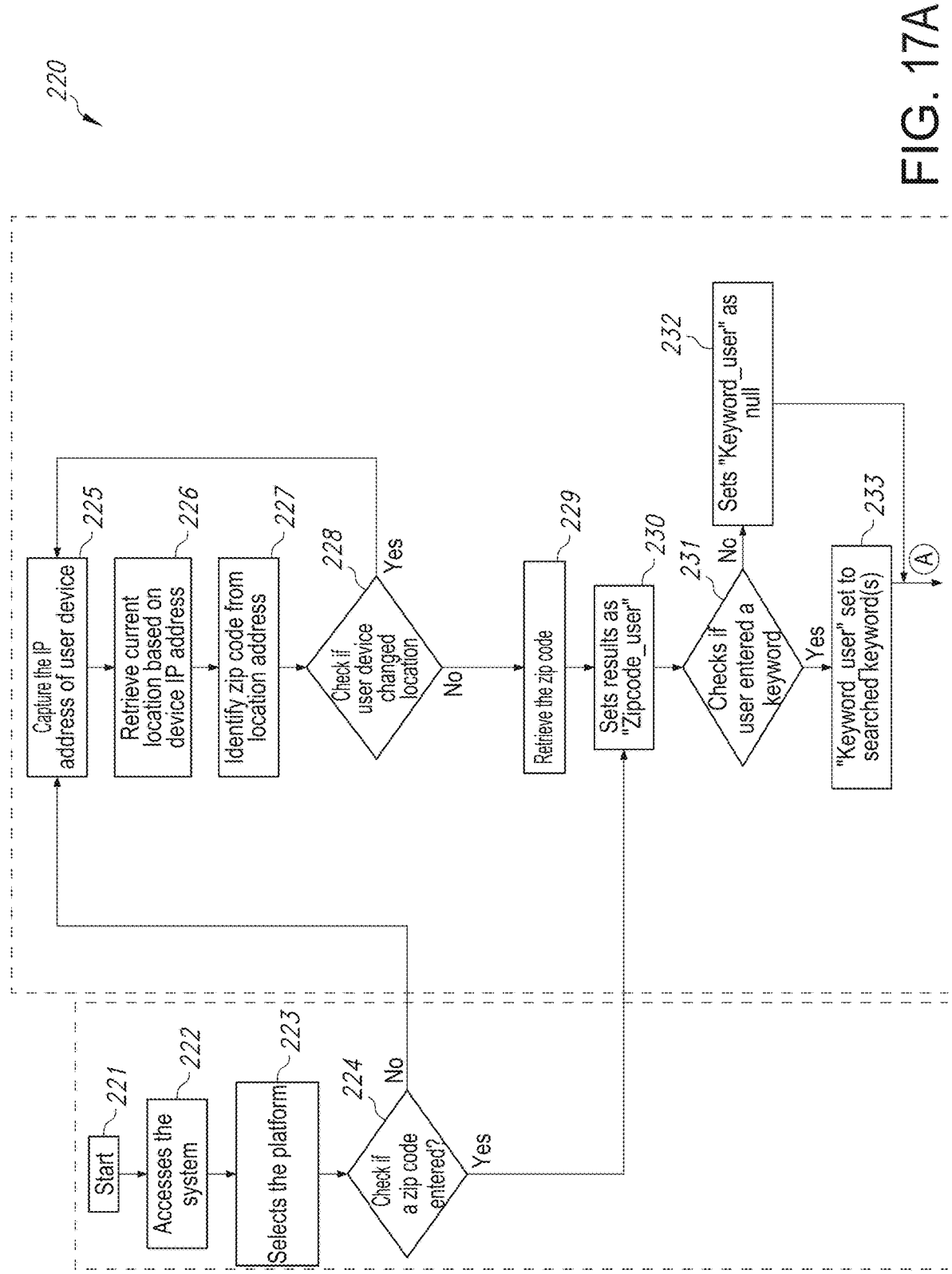
Figure 17B:
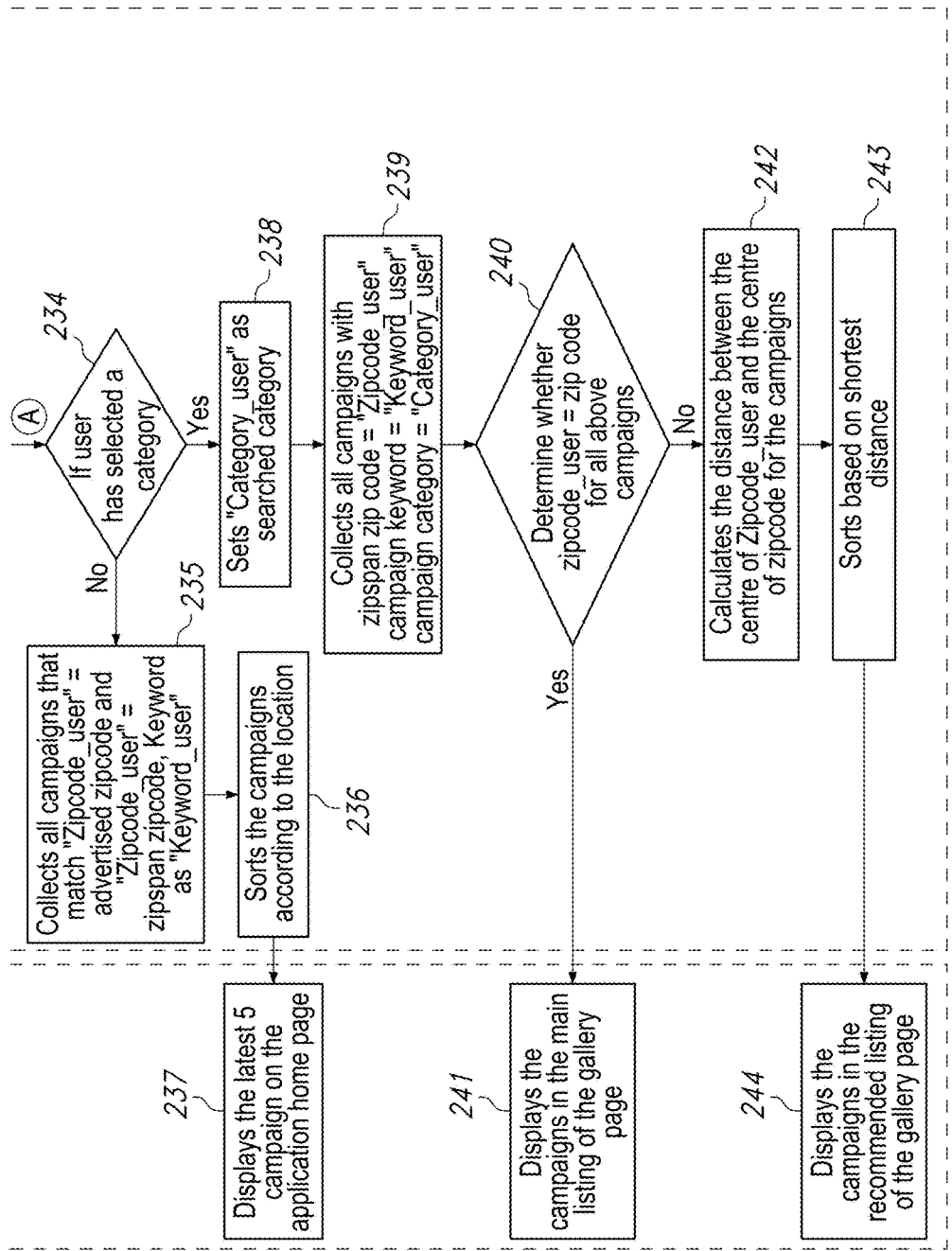

The disclosed system and method begins implementation of the overall searching process 220 beginning at step 221 in FIG. 17A portion of FIG. 17 contiguous flowchart comprising FIGS. 17A & 17 B). The user device accesses the system in step 222. The user device next selects the platform in step 223 for the search to be based on for example, a discrete number of user-selected zip codes. Otherwise, the system implements the zip span process using the zip span platform which defines a zip-span polygon region or extended zip span polygon region for determination of digital content for distribution or dissemination that is germane or relevant to the calculated zip-span polygon region.

Next, in step 224 the system checks if a zip code was entered or not via the user device. If the user has not entered a zip code in step 224, the system proceeds to determine in step 225 the IP address associated with the user device. Hence, the system captures the IP address of the user device in step 225 and transmits the IP address to for example, a database such as the a system-based insular database that maps IP addresses to geolocation information so that the location information can be retrieved in step 226.

In certain embodiments, a geolocation-based database containing a list of IP addresses and their respective location information, may be used in step 226. Other contemplated databases or sources of list of IP addresses and related location information may be implemented and stored on the zip span system server and/or databases in step 226. The system next determines and identifies in step 227, the zip code from the determined location address and returns such information to the system. Next, once the system determines and identifies the zip code in step 227 based on the generated location information in step 226, the system next determines if the location of the user device has changed in step 228. If not, the system proceeds to step 229 to retrieve the generated zip code and set the results of zipcode_user to the retrieved zip code in step 230. However, if the location of the user device has indeed changed location in step 228, the system proceeds back to step 225 to capture the IP address and/or network address of the user device and then proceeds onward to steps 226-228.

In certain embodiments, the system may check following step 224, whether a search for the particular zip was performed previously by the user device, the process would retrieve the zip code based on stored cookies. Hence, the system processor retrieves the zip code from prior visits using for example, system or other contemplated tracking data structures, such as for example, application cookies following step 224 and would proceed to step 229, to set the zip code as previously associated with the IP address of the user device.

Nonetheless, the system proceeds to set Zipcode_user based on the zip code obtained from either direct user entry in step 224, (whether implementing a geolocation-based database or other contemplated method for obtaining associated location of the user device) in step 230 or other calculated methods. The system next determines whether a keyword had been received by user device entry in step 231. If not, the system proceeds to set "Keyword_user" as null in step 232. Alternatively, if the system has indeed received a keyword via the user device in step 231, the system proceeds to step 233 to set "keyword_user" as the received keywords.

Next (following step 232 or alternatively step 233, as applicable), the system proceeds to step 234 (in FIG. 17B portion of contiguous flowcharts of FIG. 17) following the determination whether the system received a keyword as a search criteria via user device entry. If the system has not entered any keyword, Keyword_user is set as null in step 232. Alternatively if the system received a user device entered keyword, the application sets it as Keyword_user in step 233.

If no category is selected in step 234, then the system proceeds to step 235 and collects all campaigns that match the value of Zipcode_user with the content creator's/content provider's zip code and/or related zip-spanning zip codes, and Keyword_user associated with keywords of the campaign or distribution of digital content. For example, a particular zip code is the zip code of the published campaign location address of the content creator/content provider, which is entered by the content creator/content provider during campaign creation process. Zip-spanning zip codes are the result of the zip spanning polygon region algorithm during campaign creation.

Next, in step 236 the system sorts these video and/or digital content campaigns according to the distance and/or proximity to the user location, with the closest being first in the list of results. The system proceeds to display the first five campaigns, for example, on the homepage of the application in step 237. The end user/searcher may view and/or yield additional results at their convenience.

If the end user/searcher has selected a category then the system sets Category_user as the selected category in step 238. Next the system processor collects all campaigns in step 239, which match the criteria zip-spanning zip code="Zipcode_user" and campaign keyword="Keyword_user" and campaign category="Category_user". In step 240, it is next determined in the collection of the campaigns collected in step 239, whether the Zipcode_user matches the content created zip code associated with the collected campaigns in step 240. The result of step 240 generates all campaigns associated with Zipcode_user (in certain embodiments, there may be multiple zip code values stored for zipcode_user) that match the one or more zip code(s) associated with the content creator's/content provider's published campaign location address(es), and can be transmitted to the system and/or displayed as the main listing in the gallery page in step 241.

In step 242, if the zipcode_user is not equal to any of the content creator's/content provider's zip code(s) for the foregoing campaigns determined in step 239, the system next proceeds to calculate the distance between the centers of the zipcode_user and the zip-spanning zip code. The distance is calculated by the equation defined herein below as Equation (13):

$$\text{Distance} = (((a\ \cos(\sin((user\_zip\_latitude.`*pi(\ )/180))*\sin((zipspanning\_zip\_code\_latitude*pi(\ )/180)) + \cos((user\_zip\_latitude.`*pi(\ )/180))*\cos((zipspanning\_zip\_code\_latitude*pi(\ )/180))*\cos(((user\_zip\_longitude - zip\_spanning\_zip\_code\_longitude)*pi(\ )/180))))*180/pi(\ )*60*1.1515)\quad \text{Equation(13)}$$

Where center of Zipcode_user is expressed in terms of GPS coordinates (user_zip_latitude, user_zip_longitude) and center of zipspanning zip code is (zipspanning_zip_code_latitude, zipspanning_zip_code_longitude).

The above determined campaigns are then sorted according to the distance, with the nearest being first and the farthest being last in step 243. The sorted campaigns are then displayed as the recommended listing in the gallery page in step 244.

Figure 18:
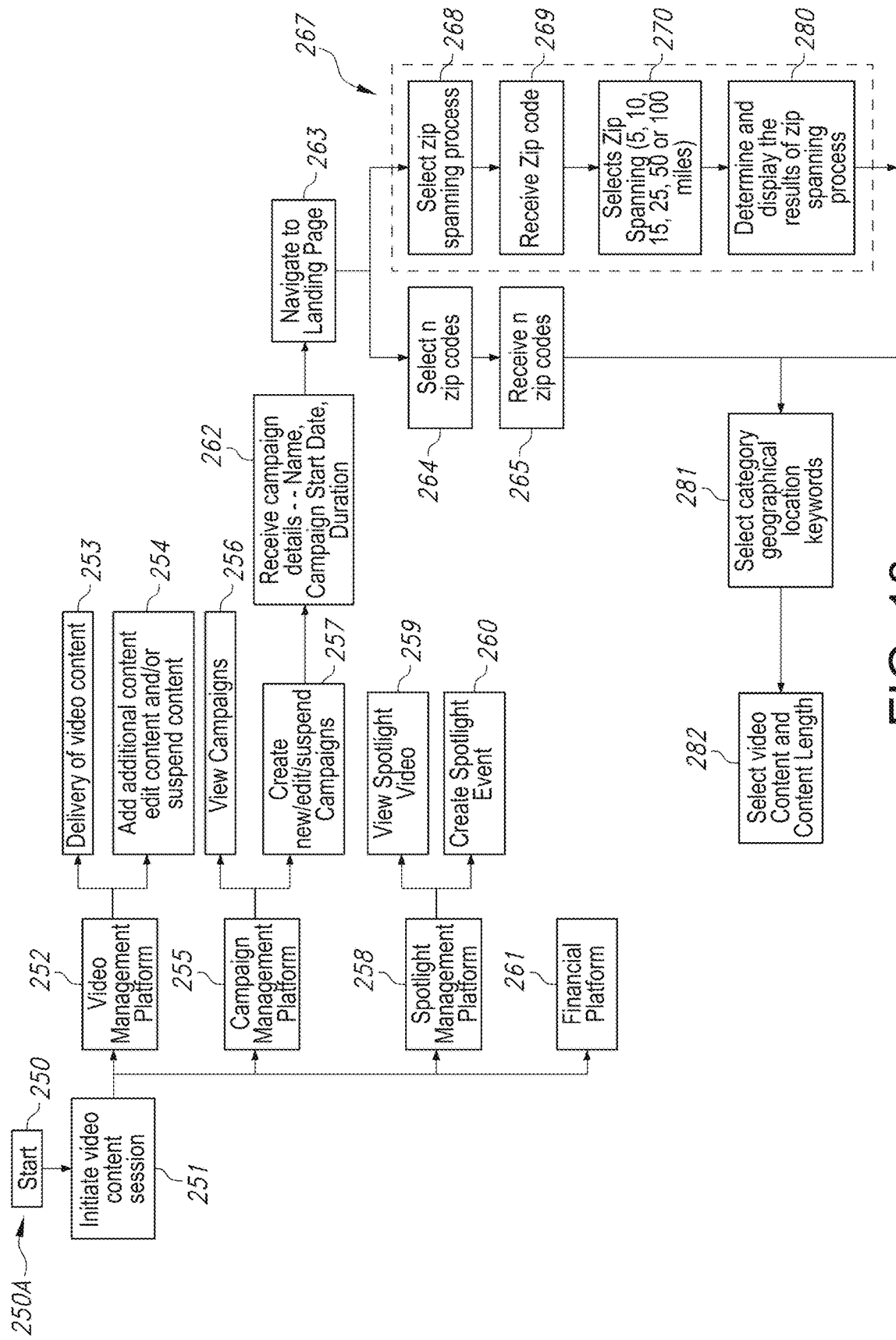
FIG. 18 is a block diagram providing an overview of the components of the digital content distribution platform and related insular searching platform that implements zip spanning process, in accordance with an embodiment of the disclosed system and method.

FIG. 18 illustrates process 250A, which provides an overview of the zip-spanning system sub-processes, and as implemented in a specific practical application, for example generating, editing, or suspending digital content campaigns, spotlight(s) (i.e. featured discrete segments/epochs of digital content), digital content and/or other video content, in discrete time epochs as associated with a germane zip span polygon region, in accordance with an embodiment of the disclosed system and method. In particular, FIG. 18 is a block diagram providing an overview of the components of the insular digital content distribution platform and related insular searching platform that implements the zip spanning process in the determination of a germane zip span polygon region.

The system begins the process at step 250. The content creator/content provider is able to initiate a digital content session in step 251. Next, the system proceeds to video management platform 252, campaign management platform 255, spotlight management platform 258 and/or financial platform 261 which are each associated with a practical real-world application of the zip span polygon region determination. During implementation of the video management platform 252, the system generates the delivery of discrete epochs of tailored digital video content, or other content in step 253 and/or adds additional content in step 254. During step 254, the system content creator/content provider can add additional content, edit content and/or even suspend previous content. During implementation of the campaign management platform selected in step 255, the system delivers previously created campaigns (for example, tailored epochs of digital/video/audio/image content and/or other contemplated content associated with a determined zip span polygon region) for viewing in 256, and/or creates new campaigns in step 257. Alternatively, the system selects spotlight management platform 258 and views spotlight video or digital content 259 and/or creates spotlight video/digital content event in step 260. The spotlight digital content and/or respective user interface for delivery thereof, can include featured discrete epochs or segments of digital content.

Referring back to the campaign creation in step 257, the system receives digital content campaign details via entry for example by content creator or content provider, such as name, campaign start date, duration of the campaign in step 262. The system next navigates to a landing page in step 263 to launch a campaign associated with a content creator's/content provider's targeted areas of interest, for example, a set of selected zip codes of interest 264 and/or otherwise proceeds to implement the zip span process in step 267. More particularly, in step 257, the content creator/content provider, may create campaigns either by adding new campaigns, editing and/or suspending certain previously created campaigns. More particularly, following step 263, the user device selects n number of zip codes (or international postal codes and/or other defining information associated with geographical boundary related to a city, town or other geographical region) in step 264. The system receives the n number of zip codes (or international postal codes and/or other defining information associated with geographical boundary related to a city, town or other geographical region) in step 265 and processes selection of a category, a geographical location and other user defining keywords in step 281. Next, the system selects a discrete segment(s) or epoch(s) of digital content and the respective length of the digital content segment(s) (for example, the length of time for delivery of tailored epochs of digital/video/audio/image content and/or other contemplated content) in step 282.

Alternatively, the system proceeds to perform the zip spanning process in step 267. The zip spanning process is selected in step 268. Next the zip code is received in step 269. The system selects a zip span distance (for example, 5, 10, 15, 25, 35 or 100 miles) in step 270. The system next determines and displays the results of the zip spanning process in step 280 by implementation of any of the above-described processes for determination of the zip span polygon region for example, as described hereinabove in connection with FIGS. 1, 2, 5, 8, 10 and/or 11 (and/or any other related sub-processes described in connection therewith as described for example, in connections with FIGS. 12A-16).

The above-described processes and/or methodologies associated with FIGS. 1-18 for the disclosed digital content distribution platform associated with determination of a zip span polygon region (including irregular, extended and/or expanded zip span polygon region) and any related system and/or method, are contemplated to be performed in certain embodiments, by the computing system (300) described herein below, and in greater detail with reference to FIG. 19.

In addition, as described in greater detail below in connection with FIGS. 19-23, an example digital content distribution system and/or related insular search system, as associated with the disclosed zip-span polygon region system and method, may embody, include, or may otherwise be communicatively coupled to, a computing system, such as for example, computing system 300, electronic device 330, computing system 365, computing system 370, or computing system 400.

Figure 19:
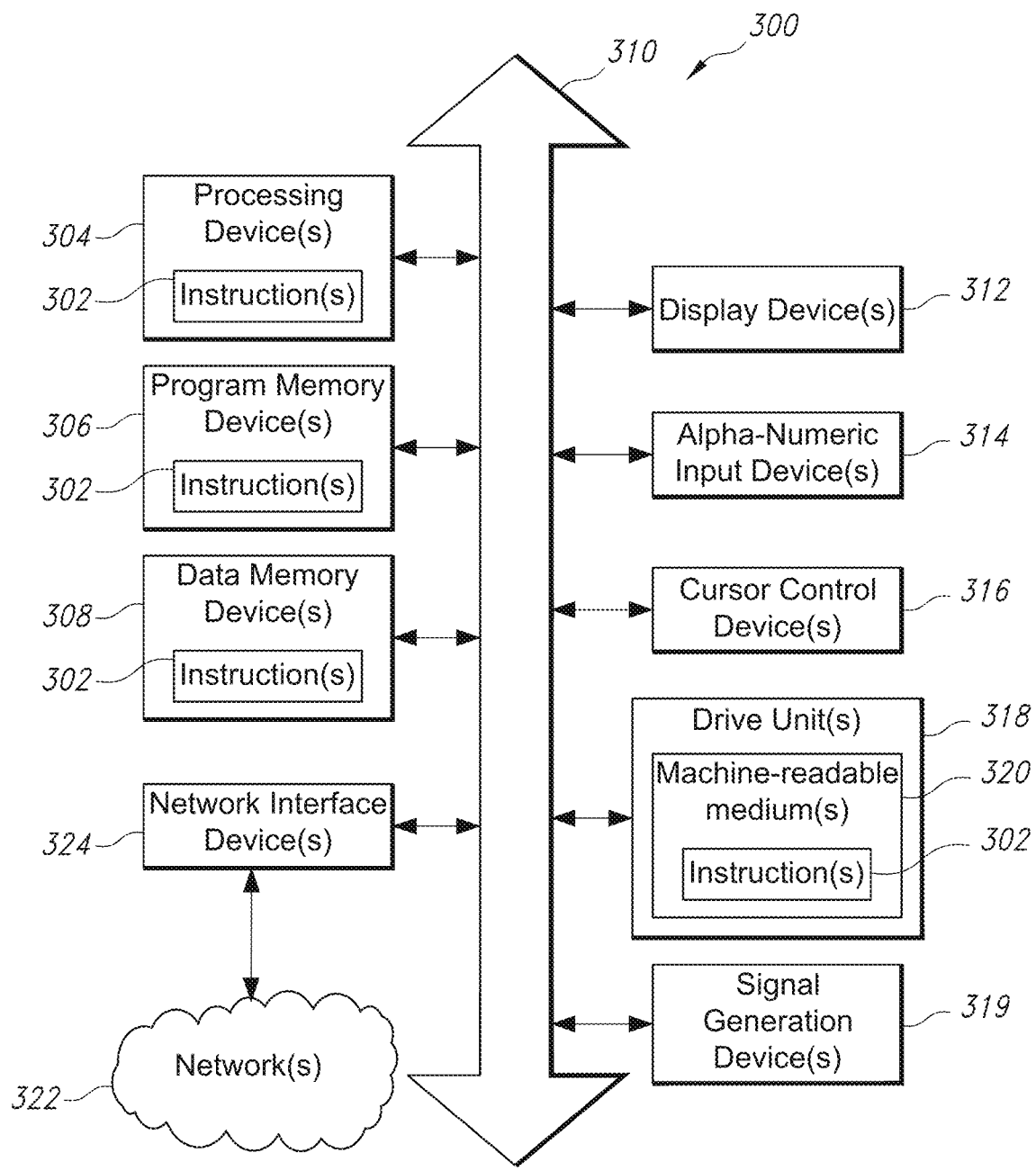
FIG. 19 is a block diagram showing a portion of an exemplary machine in the form of a computing system that performs methods according to one or more embodiments.

FIG. 19 is a block diagram of an illustrative embodiment of a general computing system 300. The computing system 300 can include a set of instructions that can be executed to cause the computing system 300 to perform any one or more of the methods or computer based functions disclosed herein. The computing system 300, or any portion thereof, may operate as a standalone device or may be connected, e.g., using a network 322 or other connection, to other computing systems or peripheral devices.

The computing system 300 may also be implemented as or incorporated into various devices, such as a personal computer (PC), a tablet PC, a personal digital assistant (PDA), a mobile device, a palmtop computer, digital smart watch, heads-up display/device and/or other virtual/augmented reality display devices, a laptop computer, a desktop computer, a communications device, a control system, a web appliance, or any other machine capable of executing a set of instructions (sequentially or otherwise) that specify actions to be taken by that machine. Further, while a single computing system 300 is illustrated, the term "system" shall also be taken to include any collection of systems or sub-systems that individually or jointly execute a set, or multiple sets, of instructions to perform one or more computer functions.

As illustrated in FIG. 19, the computing system 300 may include a processor 304, e.g., a central processing unit (CPU), a graphics-processing unit (GPU), or both. Moreover, the computing system 300 may include a main memory and/or program memory 306 and a static memory, neural network storage, and/or data memory 308 that can communicate with each other via a bus 310. As shown, the computing system 300 may further include a video display unit 312, such as a liquid crystal display (LCD), an organic light emitting diode (OLED), a flat panel display, a solid state display, or a cathode ray tube (CRT). Additionally, the computing system 300 may include an input device 314, such as a keyboard, and a cursor control device 316, such as a mouse and/or any other device or method that implements or simulates touch input. The computing system 300 can also include a disk drive unit 318 and/or other storage devices are contemplated, a signal generation device 319, such as a speaker or remote control, and/or a network interface device 324.

In a particular embodiment or aspect, as depicted in FIG. 19, the disk drive unit 318 or neural network storage may include a machine-readable or computer-readable medium 320 in which one or more sets of instructions 302, e.g., software, can be embedded, encoded or stored. Further, the instructions 302 may embody one or more of the methods or logic as described herein. In a particular embodiment or aspect, the instructions 302 may reside completely, or at least partially, within the main memory 306, the static memory 308, and/or within the processor 304 during execution by the computing system 300. The main memory 306 and the processor 304 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 302 or receives and executes instructions 302 responsive to a propagated signal, so that a device connected to a network 322 can communicate audio, voice, video or data over the network 322. Further, the instructions 302 may be transmitted or received over the network 322 via the network interface device 324.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a flash memory, memory card or other package, which houses one or more non-volatile read-only memories and/or volatile memory. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. In certain embodiments, a digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, neural network, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Figure 20:
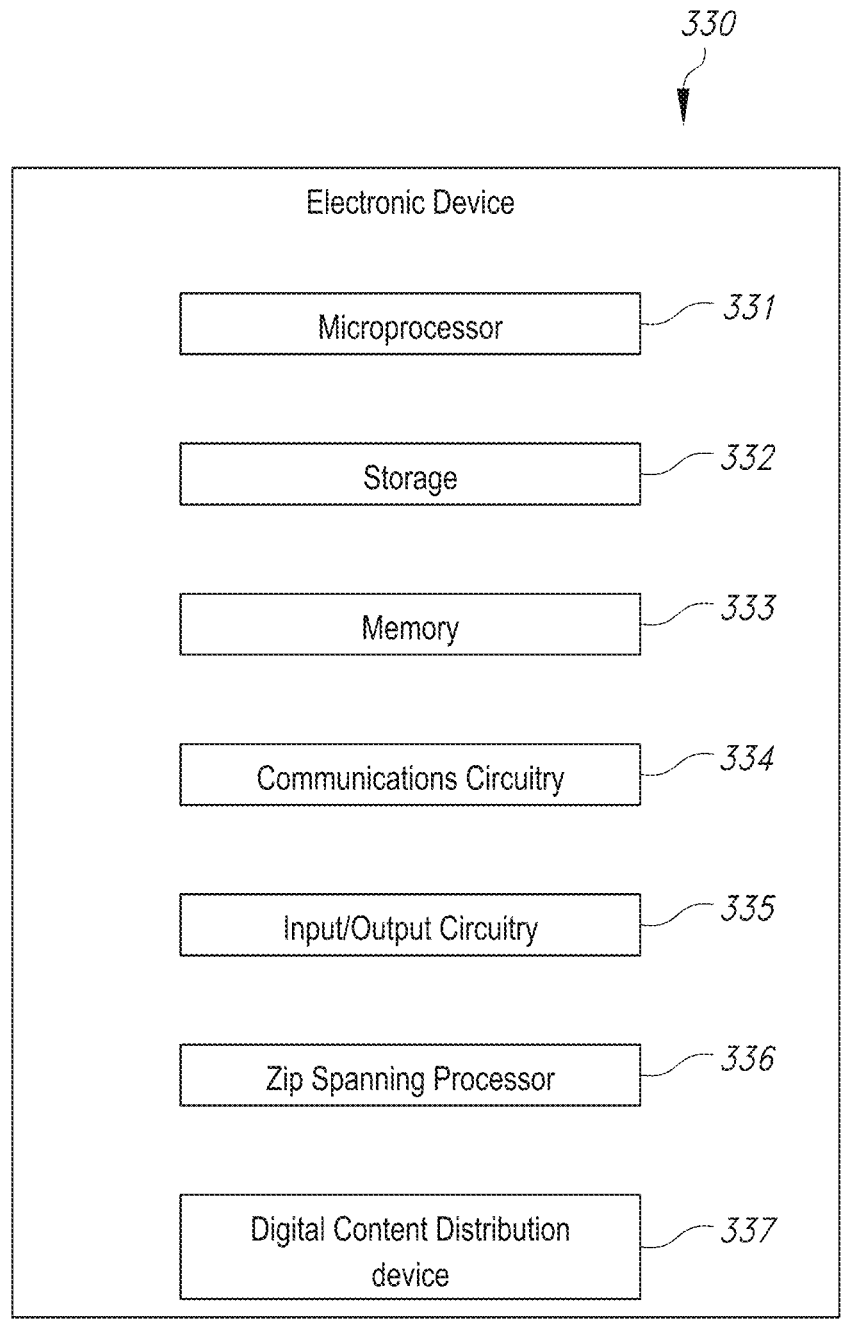
FIG. 20 illustrates a block diagram of an illustrative electronic device including constituent components and associated with the digital content distribution system that implements a zip spanning analysis, in accordance with an embodiment of the disclosed system and method.

FIG. 20 is a schematic view of an illustrative electronic device for use with a digital content distribution system associated with determination of a zip span polygon region to deliver discrete epochs of germane audio/image/video/digital content (and/or other contemplated content) in accordance with an embodiment of the disclosed system and method. Electronic device 330 may include processor 331, storage 332, memory 333, communications circuitry 334, input/output circuitry 335, zip spanning processor, microprocessor, related circuitry and/or device 336, digital content distribution device, system, and/or related circuitry 337 and power supply. In some embodiments, one or more of electronic device components 330 may be combined or omitted (e.g., combine storage 332 and memory 333). In some embodiments, electronic device 330 may include other components not combined or included in those shown in FIG. 20 (e.g., a display, bus, or input mechanism), or several instances of the components shown in FIG. 20. For the sake of simplicity, only one of each of the components is shown in FIG. 20.

Processor and/or microprocessor 331 may include any processing circuitry operative to control the operations and performance of electronic device 330. For example, processor 331 may be used to run operating system applications, firmware applications, media playback applications, media editing applications, or any other application. In some embodiments, a processor may drive a display and process inputs received from a user interface.

Storage 332 may include, for example, one or more storage mediums including a hard-drive, solid state drive, flash memory, permanent memory such as ROM, any other suitable type of storage component, or any combination thereof. Storage 332 may store, for example, media data (e.g., audio, music and/or video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information and/or credit card transaction information), wireless connection information data (e.g., information that may enable electronic device 330 to establish a wireless connection), subscription information data (e.g., information that keeps track of podcasts or television shows or other media a user subscribes to), contact information data (e.g., telephone numbers, physical addresses, and email addresses), calendar information data, and any other suitable data or any combination thereof.

Memory 333 can include cache memory, volatile, non-volatile and/or semi-permanent memory such as RAM, and/or one or more different types of memory used for temporarily storing data. In some embodiments, memory 333 can also be used for storing data used to operate electronic device applications, or any other type of data that may be stored in storage 332. In some embodiments, memory 333 and storage 332 may be combined as a single storage medium.

Communications circuitry 334 can permit device 330 to communicate with one or more servers or other devices using any suitable communications protocol. Electronic device 330 may include one more instance of communications circuitry 334 for simultaneously performing several communications operations using different communications networks, although only one is shown in FIG. 20 to avoid overcomplicating the drawing. For example, communications circuitry 334 may support Wi-Fi (e.g., an 802.11 protocol), Ethernet, Bluetooth® (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, microwave, satellite, TCP/IP (e.g., any of the protocols used in each of the TCP/IP layers), HTTP, BitTorrent, FTP, RTP, RTSP, SSH, Voice over IP (VOIP), any other communications protocol/transmission medium, or any combination thereof.

Input/output circuitry 335 may be operative to convert (and encode/decode, if necessary) analog signals and other signals into digital data. In some embodiments, input/output circuitry can also convert digital data into any other type of signal, and vice-versa. For example, input/output circuitry 335 may receive and convert physical contact inputs (e.g., from a multi-touch screen), physical movements (e.g., from a mouse or sensor), analog audio signals (e.g., from a microphone), or any other input. The digital data can be provided to and received from processor 331, storage 332, memory 333, or any other component of electronic device 330. Although input/output circuitry 335 is illustrated in FIG. 20 as a single component of electronic device 330, several instances of input/output circuitry can be included in electronic device 330.

Electronic device 330 may include any suitable mechanism or component for allowing a user to provide inputs to input/output circuitry 335. For example, electronic device 330 may include any suitable input mechanism, such as for example, a button, keypad, dial, a click wheel, visual cues, accessibility-related interfaces and/or a touch screen. In some embodiments, electronic device 330 may include a capacitive sensing mechanism, motion sensor, multi-touch capacitive sensing mechanism and/or other motion/tactile sensing mechanism.

In some embodiments, the electronic device 330 can include specialized output circuitry associated with output devices such as, for example, one or more audio outputs. The audio output may include one or more speakers (e.g., mono or stereo speakers) built into electronic device 330, or an audio component that is remotely coupled to electronic device 330 (e.g., a headset, headphones or earbuds that may be coupled to communications device with a wire or wirelessly, for example Bluetooth®, infrared (IR) or other wireless or non-wired transmission method or medium).

In some embodiments, I/O circuitry 335 may include display circuitry (e.g., a screen or projection system) for providing a display visible to the user. For example, the display circuitry may include a screen (e.g., an LCD screen) that is incorporated in electronics device 330. As another example, the display circuitry may include a movable display or a projecting system for providing a display of content on a surface remote from electronic device 330 (e.g., a video projector). In some embodiments, the display circuitry can include a coder/decoder (Codec) to convert digital media data into analog signals. For example, the display circuitry (or other appropriate circuitry within electronic device 330) may include video Codecs, audio Codecs, or any other suitable type of Codec.

The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 331.

Zip spanning processor or microprocessor (and any related hardware components and/or circuitry) 336 and/or digital content distribution device (including video/audio/image and/or other contemplated content distribution), system or engine 337 (which may be integrated as one discrete component, or alternatively as shown, as discrete segregated components of the electric device 330) may include any suitable system or sensor operative to receive or detect an input identifying the user of device 330. For example, zip spanning processor 336 may include sensing mechanism, such as a GPS system, altimeter, accelerometer, barometric and/or radar devices etc., that are used for detecting location and/or coordinates associated with a zip span polygon region, related geographical boundary information and/or other related geographical features associated with a geographical region defined by boundary information, in order to identify and generate an extended zip span polygon region that is germane to a user's search or other implementation of the system thereof. As another example, the digital content distribution device 337 (including video/audio/image and/or other contemplated content distribution), may be operative to receive secret or confidential entries identifying and/or authenticating the user (e.g., gestures on the device, fingerprint, iris or retina biometrics, and/or touching a particular pattern or type of objects or colors on a display/device). Yet another example, zip spanning processor 336 may be operative to detect particular movements or vibrations of the device caused by the user in order to effect certain operations relating to the zip span processor 336 and/or digital content distribution device 337 (including video/audio/image and/or other contemplated content). Zip spanning processor or engine 336 may be combined or embedded in any other element of electronic device 330 (e.g., smart phone, a display or a camera), or use events detected by various sensors of the electronic device (e.g., a GPS component or other geographical/location sensor or other location-based sensing device). In some embodiments, several types of authentication systems for encryption and/or security features may be combined or implemented in the electronic device.

Digital content distribution device 337 (including video/audio/image and/or other contemplated content distribution), may be configured to detect and receive GPS signals as emitted or reflected from the geographical location of the user device and/or related location based signals as generated from input/output circuitry 335 such as a location sensor of the electronic device 330. Such location based signals are operative in component can determine the user device's latitude and longitude as well as for example, a physical street address. In some embodiments, lights, radio waves, magnetic fields, acoustic signals, or other sensory information may be collected by the electronic device 330 and used in the determination of relevant zip spanning information and/or geolocation information.

In some embodiments, electronic device 330 may include a bus operative to provide a data transfer path for transferring data to, from, or between control processor 331, storage 332, memory 333, communications circuitry 334, input/output circuitry 335 zip spanning processor or engine 336, digital content distribution device (including video/audio/image and/or other contemplated content distribution), circuitry system or engine 337, and any other component included in the electronic device 330.

In order to prevent unauthorized access to data or information stored in memory or storage, the electronic device may direct an authentication system to identify the user and authorize access to requested resources. The electronic device may require authorization prior to providing access to any electronic device resource. In some embodiments, the electronic device may require different levels of authorization before providing access to different applications or different data, configurations, or files associated with different applications. For example, the electronic device may require a user to satisfy one or more authentication systems or methods, prior to providing access to an application or data (e.g., a secondary authentication, for example using biometrics, in addition to a first or initial authentication, for example a pass code used to unlock the device, image based authentication, and other contemplated configurations that perform authentication).

Figure 21:
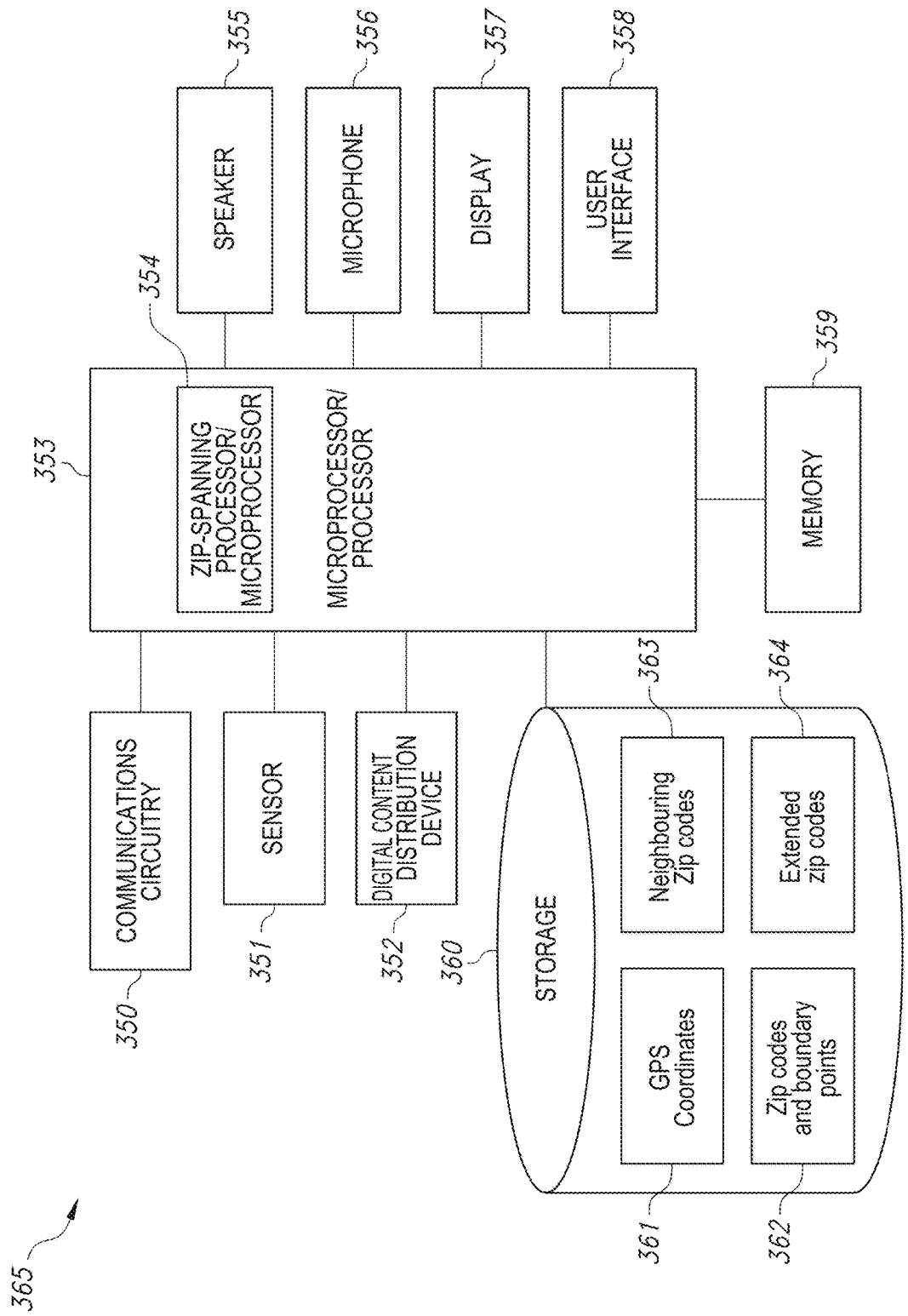
FIG. 21 illustrates a system block diagram including constituent components of an example mobile or other computing device, in accordance with an embodiment of the zip-span system, including an example computing system.

FIG. 21 illustrates a system block diagram including constituent components of an example mobile device, a hand held/wearable device, or other computing device, in accordance with an embodiment of the digital content distribution system (including video/audio/image and/or other contemplated content) associated with determination of a germane zip span polygon region, including an example computing system.

The device 365 in FIG. 21 includes a main processor 353 that interacts with a motion sensor 351, a video and/or digital content distribution device (including audio/image/video/digital content and/or other contemplated content distribution) whether in the form of camera/audio circuitry or other content distribution circuitry 352, storage 360, memory 359, display 357, and user interface 358. The device 365 may also interact with communications circuitry 350, a speaker 355, and a microphone 356. The various components of the device 365 may be digitally interconnected and used or managed by a software stack being executed by the main processor 353. Many of the components shown or described here may be implemented as one or more dedicated hardware units and/or a programmed processor (software being executed by a processor, e.g., the main processor 353).

The main processor 353 controls the overall operation of the device 365 by performing some or all of the operations of one or more applications implemented on the device 365, by executing instructions for it (software code and data) that may be found in the storage 360. The processor may, for example, drive the display 357 and receive user inputs through the user interface 358 (which may be integrated with the display 357 as part of a single, touch sensitive display panel, e.g., display panel on the front face of a mobile device 365 or other mobile computing system. The main processor 353 may also control the location-based functions of the device 365.

Storage 360 provides a relatively large amount of "persistent" or "permanent" data storage, using nonvolatile solid state memory (e.g., flash storage) and/or a kinetic nonvolatile storage device (e.g., rotating magnetic disk drive). Storage 360 may include both local storage and storage space on a remote server. Storage 360 may store data, such as GPS coordinates 361, neighboring zip codes 363, zip codes and boundary points 362 and/or extended zip codes 364 associated with a zip span polygon region and/or extended or otherwise, refined zip-span polygon region, and software components that control and manage, at a higher level, the different functions of the device 365. For instance, there may be a location detection application that implements the GPS coordinates 361 or other related geographical based information or data implemented by the device 365.

In addition to storage 360, there may be memory 359, also referred to as main memory or program memory, which provides relatively fast access to stored code and data that is being executed by the main processor 353 and/or zip-spanning processor, microprocessor and/or engine 354. Memory 359 may include solid state random access memory (RAM), e.g., static RAM or dynamic RAM. There may be one or more processors, e.g., main processor 353 and/or echo-signature processor 354, that run or execute various software programs, modules, or sets of instructions (e.g., applications) that, while stored permanently in the storage 360, have been transferred to the memory 359 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The device 365 may include communications circuitry 350. Communications circuitry 350 may include components used for wired or wireless communications, such as two-way conversations and data transfers. For example, communications circuitry 350 may include RF communications circuitry that is coupled to an antenna, so that the user of the device 365 can implement the zip-span processor and/or digital content distribution platform through a wireless communications network. The RF communications circuitry may include a RF transceiver and a cellular baseband processor to enable the call or data transfer through a cellular or other wireless communications network. In another embodiment, communications circuitry 350 may include Wi-Fi communications circuitry so that the user of the device 365 may place or initiate a call using voice over Internet Protocol (VOIP) connection, or otherwise communicate/exchange data via an internet protocol (IP) session or other method, through for example, a wireless or other network(s), that may be used in initiating a session with the digital content distribution platform or system.

The device 365 may include a motion sensor 351, also referred to as an inertial sensor, that may be used to detect movement of the device 365. The motion sensor 351 may include a position, orientation, or movement (POM) sensor, such as an accelerometer, a gyroscope, altimeter, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RP detector, an RF or acoustic doppler detector, a compass, a magnetometer, location-based or other like sensor. For example, the sensor 351 may be a light sensor that detects movement or absence of movement of the device 365, by detecting the intensity of ambient light or a sudden change in the intensity of ambient light, with the ability to track the location of the user device 365. The sensor 351 generates a signal based on at least one of a position, orientation, geographical location and/or related movement of the device 365 relative to a change in geographical location. The signal may include the character of the motion, such as acceleration, velocity, direction, elevation, directional change, duration, amplitude, frequency, or any other characterization of movement. The processor 353 receives the sensor signal and controls one or more operations, e.g., the initiation of a digital content distribution content session (including video/audio/image and/or other contemplated content distribution session) described below, of the device 365 based in part on the location-based detection sensor signal.

The device 365 may also include camera circuitry for example, as part of the digital content distribution device 352 (including video/audio/image and/or other contemplated content distribution), that implements any of the digital camera functionality of the device 365. In certain embodiments, one or more solid-state image sensors 351 (or alternatively, solid state organic sensor, bionic sensor, bio-engineered human tissue sensor and/or similar sensor(s)/device(s)) may be built into the device 365 and/or device 352, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 360. If present, camera circuitry or other image device(s)/sensor(s), may be used to capture the images of the geographical region that are analyzed by the processor 353 and/or zip-span processor 354 in the determination of the location of the user device 365 in order to implement related determination of the zip span polygon region for implementation in the digital content distribution platform or system (including video/audio/image and/or other contemplated content distribution platform or system).

Figure 22:
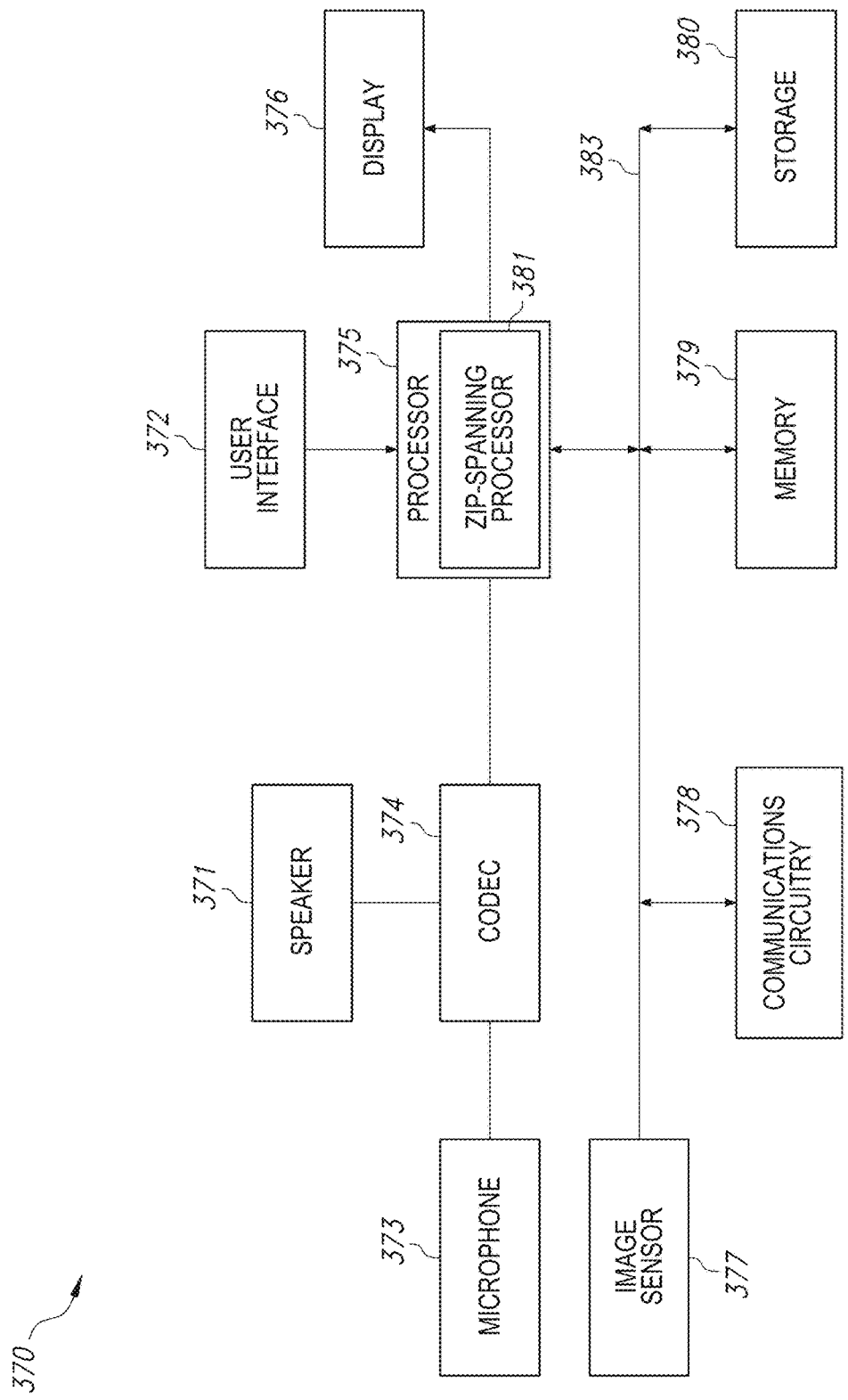
FIG. 22 illustrates a system block diagram including constituent components of an example computing device, in accordance with an embodiment of the zip-span system, including an example computing system.

FIG. 22 illustrates a system block diagram including constituent components of an example mobile device, in accordance with an embodiment of the insular-based video and/or digital content distribution platform or system and related insular searching platform, including an example computing system.

More particularly, shown in FIG. 22 is a personal computing device 370 according to an illustrative embodiment of the invention. The block diagram provides a generalized block diagram of a computer system such as may be employed, without limitation, by the personal computing device 370. The personal computing device 370 may include a processor 375 and/or zip-span processor 381 integrated with processor 375 and/or as a segregated discrete component or module 381, storage device 380, user interface 372, display 376, CODEC 374, bus 383, memory 379, communications circuitry 378, a speaker or transducer 371, a microphone 373, and an image sensor 377. Processor 375 and/or zip-span processor or micro-processor 381, may control the operation of many functions and other circuitry included in personal computing device 370. Processor 375, 381 may drive display 376 and may receive user inputs from the user interface 372.

Storage device 380 may store media (e.g., audio, music, digital content, and/or video files, or any combination thereof), software (e.g., for implanting functions on device 370), preference information (e.g., media playback preferences), lifestyle information (e.g., food preferences), personal information (e.g., information obtained by use of the digital content distribution platform or system), transaction information (e.g., information such as credit card and/or transaction information), word processing information, personal productivity information, wireless connection information (e.g., information that may enable a media device to establish wireless communication with another device), subscription information (e.g., information that keeps track of podcasts or television shows or other media a user subscribes to and/or usage of the searching platform and/or digital content distribution platform or system associated with determination of the zip-span polygon region), and any other suitable data. It is noted that digital content or media can include one or more of software, digital images, digital video, video game, web pages and/or websites, including social media, data and databases, digital audio, such as MP3 and electronic books. A content creator may be the origin and/or producer of such digital content. Storage device 380 may include one more storage mediums, including, for example, a hard-drive, permanent memory such as ROM, semi-permanent memory such as RAM, or cache.

Memory 379 may include one or more different types of memory, which may be used for performing device functions. For example, memory 379 may include cache, ROM, and/or RAM. Bus 383 may provide a data transfer path for transferring data to, from, or between at least storage device 380, memory 379, and processor 375, 381. Coder/decoder (CODEC) 374 may be included to convert digital audio signals into analog signals for driving the speaker 371 to produce sound including voice, music, and other like audio. The CODEC 374 may also convert audio inputs from the microphone 373 into digital audio signals. The CODEC 374 may include a video CODEC for processing digital and/or analog video signals.

User interface 372 may allow a user to interact with the personal computing device 370. For example, the user input device 372 can take a variety of forms, such as a button, keypad, dial, a click wheel, or a touch screen. Communications circuitry 378 may include circuitry for wireless communication (e.g., short-range and/or long-range communication). For example, the wireless communication circuitry may be WI-FI enabling circuitry that permits wireless communication according to one of the 802.11 standards. Other wireless network protocol standards could also be used, either in alternative to the identified protocols or in addition to the identified protocols. Other network standards may include Bluetooth, the Global System for Mobile Communications (GSM), and code division multiple access (CDMA) based wireless protocols. Communications circuitry 378 may also include circuitry that enables device 300 to be electrically coupled to another device (e.g., a computer or an accessory device) and communicate with that other device.

In one embodiment, the personal computing device 370 may be a portable computing device dedicated to processing media such as audio and video. For example, the personal computing device 370 may be a media device such as media player (e.g., MP3 player, heads up display or other VR/augmented reality devices, digital/smart watches, handheld device and/or wearable devices), a game player, a remote controller, a portable communication device, a remote ordering interface, an audio player, or other suitable personal device. The personal computing device 370 may be battery-operated and highly portable so as to allow a user to view, upload and/or retrieve digital/video/image/audio content and/or other contemplated content associated with the digital content distribution platform or system (and related zip-span feature and/or insular searching platform or system), listen to music, play games or video, record video or take pictures, communicate with others, and/or control other devices. In addition, the personal computing device 370 may be sized so that it is easily carried or fits relatively easily into a pocket, the hand of the user, on a wrist or otherwise worn by the user. By being handheld, the personal computing device 370 (or electronic device 330 shown in FIG. 20) is relatively small and easily handled and utilized by its user and thus may be taken practically anywhere the user travels.

As discussed previously, the relatively small form factor of certain types of personal computing devices 370, (e.g., personal media devices, digital/smart watches or wearable devices) enables a user to easily manipulate the device's position, orientation, and movement. Accordingly, the personal computing device 370 may provide for improved techniques of sensing such changes in position, geographical location of the user relative to a GPS coordinate system and/or zip code system, orientation, and movement to enable a user to interface with or control the device 370 by affecting such changes. Further, the device 370 may include a vibration source, under the control of processor 375, 381, for example, to facilitate sending acoustic signals, motion, vibration, movement and/or location information related to an operation of the device 370 including for zip-span processing and related searching. The personal computing device 370 may also include an image sensor 377 that enables the device 370 to capture an image or series of images of the environment (e.g., video) continuously, periodically, at select times, and/or under select conditions in order to detect the geographical location of the user device 370, even in certain embodiments with respect to land-marked locations of the user device 370 can capture audio from microphone 373.

Figure 23:
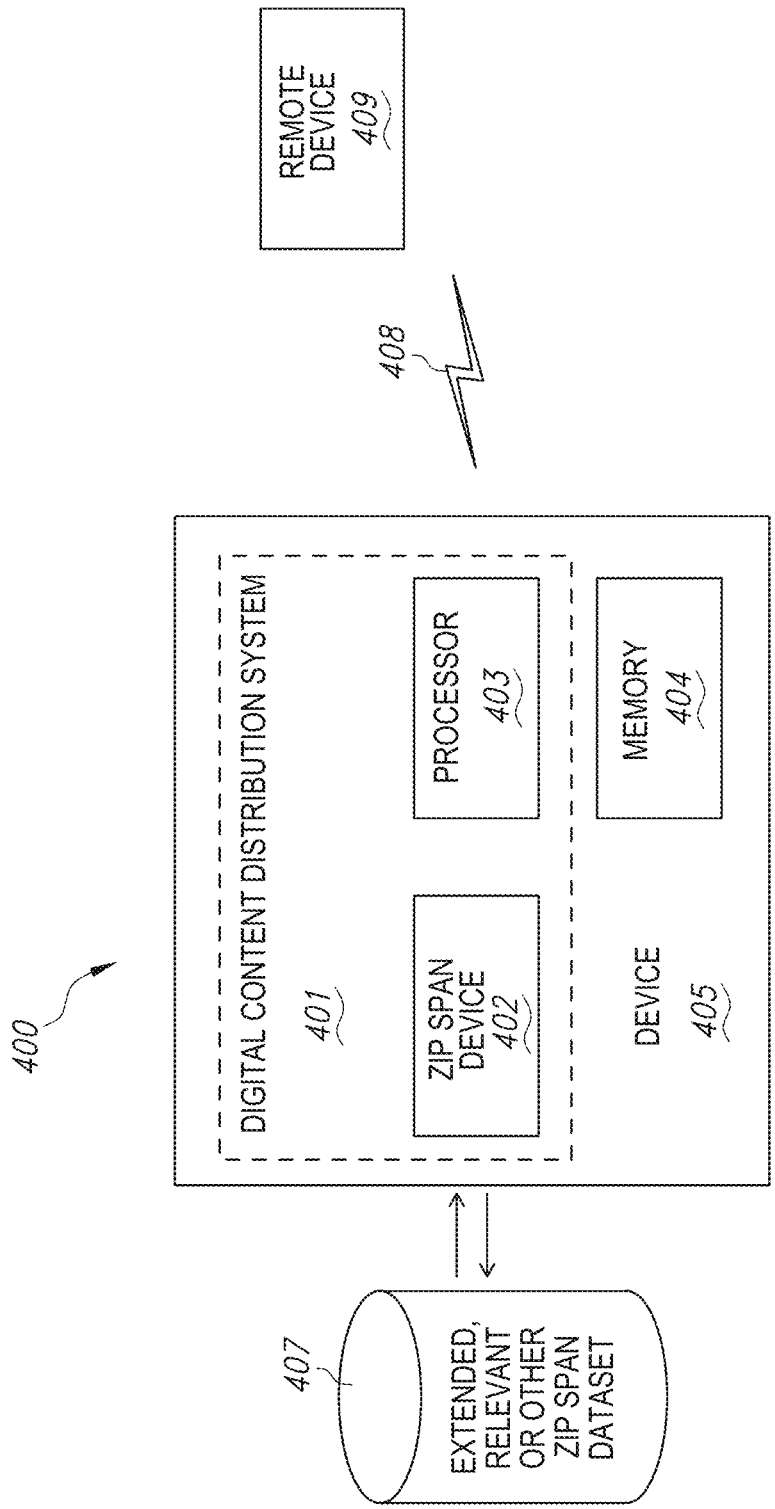
FIG. 23 illustrates a system block diagram including an example including a computer network infrastructure, in accordance with an embodiment of the disclosed digital content distribution system.

FIG. 23 is a simplified block diagram illustrating example components of an example computing system 400, according to an exemplary embodiment. One or both of the devices 405 and the remote device 409 of FIG. 23, may take the form of computing system 350 shown in FIG. 25. In particular, FIG. 23 illustrates a simplified block diagram illustrating an example computer network infrastructure, according to an exemplary embodiment. In system 400, a device 405 communicates using a communication link 408 (e.g., a wired or wireless connection) to a remote device 409. The device 405 may be any type of device that can receive data and display information corresponding to or associated with the data. For example, the device 405 may be a user computing device, a display or a main digital content distribution system or server that communicates with the digital content distribution system 401 (and zip span device 402).

Thus, the device 405 may include a digital content distribution system 401 comprising a processor 403, a zip span device 402, and a display/device, remote device 409 or other device 405 that interfaces with stored extended, relevant or other zip span data sets 407. The display/device may be, for example, a heads up, holographic, virtual and/or augmented reality display/device, an optical see-through display/device, an optical see-around display/device, or a video see-through display/device. The processor 403 may receive data from the remote device 409 and configure the data for display on the display device. The processor 403 may be any type of processor, such as a micro-processor or a digital signal processor, for example.

The device 405 may further include on-board data storage, such as memory 404 coupled to the processor 403. The memory 404 may store software that can be accessed and executed by the processor 403, for example.

The remote device 409 may be any type of computing system or transmitter including a laptop computer, a mobile communication device, smartphone, digital/smartwatch or other wearable device, or tablet computing system, etc., that is capable of or configured to transmit data to the device 405. The remote device 409 and the device 405 may contain hardware to enable the communication link 408, such as processors, transmitters, receivers, antennas, etc.

In FIG. 23, the communication link 408 is illustrated as a wireless connection; however, wired connections may also be used. For example, the communication link 408 may be a wired serial bus such as a universal serial bus or a parallel bus, among other connections. The communication link 408 may also be a wireless connection using, e.g., Bluetooth®, radio technology, communication protocols described in IEEE 802.11 (including any IEEE 802.11 revisions), Cellular technology (such as GSM, CDMA, UMTS, EV-DO, WiMAX, LTE, 5G or other advanced communications network), and/or Zigbee, among other possibilities. Either of such a wired and/or wireless connection may be a proprietary connection as well. The remote device 408 may be accessible via the Internet and may include a computing cluster associated with a particular web service (e.g., social-networking, photo sharing, address book, etc.).

Thus, a system and method to define and implement various zip-span polygon queries related to determination of a germane zip span polygon region of interest for distribution of relevant and/or germane digital and/or video content in the insular platform or system and conduct related searching, that is memory based, on-demand and user-definable with respect to location of a user device, and other categorical keyword input of the user device, and can operate on large-scale prodigious data including 3D data and other image data, has been described herein. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Those skilled in the relevant art will appreciate that aspects of the invention can be practiced with other computer system configurations, including Internet appliances, cellular or mobile phones, smartphones, tablets, mobile communication devices, digital/smart watches, a heads up, holographic, virtual and/or augmented reality display/device, handheld devices and/or wearable devices, multiprocessor systems, microprocessor-based or programmable consumer electronics, network PCs, or client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" or "computing device" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable, handheld and/or mobile computing device and/or a fixed-location computing device. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A digital content distribution system for disseminating discrete epochs of digital content based at least on creation of a zip span polygon region, the system comprising:
   a zip span polygon engine including a processing device that performs the following operations:
      receiving geographically-based code information associated with a bounded geographical region of interest;
      receiving a zip spanning distance related to the bounded geographical region of interest;
      determining longitude information values and latitude information values associated with coordinate boundary values of a portion of the geographically-based code information based on the zip spanning distance;
      determining at least one neighboring geographical region contiguous with the bounded geographical region of interest using the longitude and latitude information values; and creating the zip span polygon region that includes at least a portion of an initial zip span region associated with the bounded geographical region of interest using boundary point information of the at least one neighboring geographical region and disseminating the discrete epochs of the digital content in the digital content distribution system.

2. The system as recited in claim 1, wherein the processing device is further configured to create an expanded zip span polygon region based at least on the zip spanning distance along a perimeter of the initial zip span region.

3. The system as recited in claim 2, wherein the expanded zip span polygon region further comprises one or more of an entirety of a geographically-based code region associated with the at least one neighboring geographical region.

4. The system as recited in claim 2, wherein the expanded zip span polygon region further comprises one or more of at least a portion of a geographically-based code region associated with the at least one neighboring geographical region.

5. The system as recited in claim 2, wherein creating the zip span polygon region further comprises iteratively identifying boundary point information associated with the at least one neighboring geographical region.

6. The system as recited in claim 5, wherein creating the zip span polygon region further comprises iteratively determining whether the boundary point information of the at least one neighboring geographical region intersects a boundary point of the initial zip span polygon region.

7. The system as recited in claim 4, wherein creating the zip span polygon region further comprises determining whether the at least one neighboring geographical region is incorporated in the expanded zip span polygon region based on a partial area analysis of the at least one neighboring geographical region being above the threshold value.

8. The system as recited in claim 2, which further comprises the processing device generating discrete epochs of digital content based at least on the expanded zip span polygon region.

9. The system as recited in claim 1, which further comprises the zip span polygon region being expanded to create an extended zip span polygon region.

10. The system as recited in claim 1, wherein the processing device is further configured to generate discrete epochs of germane digital content based on categorical entry of germane data of interest.

11. The system as recited in claim 1, wherein creating the zip span polygon region is further based on comparison of a total area of the at least one neighboring geographical region with respect to an intersecting partial area of the at least one neighboring geographical region being above a threshold value.

12. The system as recited in claim 11, wherein the threshold value is greater than or equal to a 20% value.

13. The system as recited in claim 2, wherein the expanded zip span polygon region is based on determination of boundary point information and bearing information associated with the at least one neighboring geographical region.

14. The system as recited in claim 1, wherein creating the zip span polygon region is further based on determination of an area of a spherical polygon region using spherical excess information.

15. The system as recited in claim 1, wherein determining the zip span polygon region is further based on boundary point analysis of at least two geographical polygon regions.

16. The system as recited in claim 1, further comprising an insular search engine platform that performs searches based on the created zip span polygon region.

17. The system as recited in claim 2, wherein the processing device further performs the following operations:
identifying at least one neighboring geographical region that is non-contiguous with the initial zip span polygon region; and
expanding the boundary of the zip span polygon region to subsume the at least one neighboring geographical region based on a partial area analysis of the non-contiguous region.

18. A method of disseminating discrete epochs of digital content in a digital content distribution platform based at least on creation of a zip span polygon region, the method comprising:
a zip span polygon engine including a processing device that performs the following operations:
receiving geographically-based code information associated with a bounded geographical region of interest;
receiving a zip spanning distance related to the bounded geographical region of interest;
determining longitude information values and latitude information values associated with coordinate boundary values of a portion of the geographically-based code information based on the zip spanning distance;
determining at least one neighboring geographical region contiguous with the bounded geographical region of interest using the longitude and latitude information values; and
creating a zip span polygon region that includes at least a portion of an initial zip span region associated with the bounded geographical region of interest using boundary point information of the at least one neighboring geographical region and disseminating the discrete epochs of the digital content in the digital content distribution platform.

19. The method as recited in claim 18, which further comprises creating an expanded zip span polygon region based at least on the zip spanning distance along a perimeter of the initial zip span region.

20. The method as recited in claim 19, wherein the expanded zip span polygon region further comprises one or more of an entirety of a geographically-based code region associated with the at least one neighboring geographical region.

21. The method as recited in claim 19, wherein the expanded zip span polygon region further comprises one or more of at least a portion of a geographically-based code region associated with the at least one neighboring geographical region.

22. The method as recited in claim 19, wherein creating the zip span polygon region further comprises iteratively identifying boundary point information associated with the at least one neighboring geographical region.

23. The method as recited in claim 22, wherein creating the zip span polygon region further comprises iteratively determining whether the boundary point information of the at least one neighboring geographical region intersects a boundary point of the initial zip span polygon region.

24. The method as recited in claim 21, wherein creating the zip span polygon region further comprises determining whether the at least one neighboring geographical region is incorporated in the expanded zip span polygon region based on a partial area analysis of the at least one neighboring geographical region being above the threshold value.

25. The method as recited in claim 19, which further comprises the processing device generating discrete epochs of digital content based at least on the expanded zip span polygon region.

26. The method as recited in claim 18, which further comprises expanding the zip span polygon region to create an extended zip span polygon region.

27. The method as recited in claim 18, which further comprises generating discrete epochs of germane digital content based on categorical entry of germane data of interest.

28. The method as recited in claim 18, wherein creating the zip span polygon region is further based on comparing a total area of the at least one neighboring geographical region with respect to an intersecting partial area of the at least one neighboring geographical region being above a threshold value.

29. The method as recited in claim 28, wherein the threshold value is greater than or equal to a 20% value.

30. The method as recited in claim 19, wherein the expanded zip span polygon region is based on determination of boundary point information and bearing information associated with the at least one neighboring geographical region.

31. The method as recited in claim 18, wherein creating the zip span polygon region is further based on determination of an area of a spherical polygon region using spherical excess information.

32. The method as recited in claim 18, wherein determining the zip span polygon region is further based on boundary point analysis of at least two geographical polygon regions.

33. The method as recited in claim 18, further comprising an insular search engine platform that performs searches based on the created zip span polygon region.

34. The method as recited in claim 19, which further comprises:
    identifying at least one neighboring geographical region that is non-contiguous with the initial zip span polygon region; and
    expanding the boundary of the zip span polygon region to subsume the at least one neighboring geographical region based on a partial area analysis of the non-contiguous region.

35. A computer-readable device storing instructions that, when executed by a processing device, performs operations comprising:

receiving geographically-based code information associated with a bounded geographical region of interest;

receiving a zip spanning distance related to the bounded geographical region of interest;

determining longitude information values and latitude information values associated with coordinate boundary values of a portion of the geographically-based code information based on the zip spanning distance;

determining at least one neighboring geographical region contiguous with the bounded geographical region of interest using the longitude and latitude information values; and creating a zip span polygon region that includes at least a portion of an initial zip span region associated with the bounded geographical region of interest using boundary point information of the at least one neighboring geographical region and disseminating discrete epochs of digital content in a digital content distribution platform.

36. A method for using a digital content distribution platform that disseminates discrete epochs of digital content based at least on creation of a zip span polygon region, the method comprising:

a zip span polygon engine including a computing device that performs the following operations:

receiving geographically-based code information associated with a bounded geographical region of interest;

receiving a zip spanning distance related to the bounded geographical region of interest;

determining longitude information values and latitude information values associated with coordinate boundary values of a portion of the geographically-based code information based on the zip spanning distance;

determining at least one neighboring geographical region contiguous with the bounded geographical region of interest using the longitude and latitude information values; and creating a zip span polygon region that includes at least a portion of an initial zip span region associated with the bounded geographical region of interest and disseminating the discrete epochs of the digital content in the digital content distribution platform.

* * * * *